US012761131B2

(12) United States Patent
Sosnovski et al.

(10) Patent No.: US 12,761,131 B2
(45) Date of Patent: Oct. 13, 2026

(54) SYSTEMS, METHODS AND DEVICES FOR MONITORING FLUID CONDITION

(71) Applicant: Gastops Ltd., Ottawa (CA)

(72) Inventors: Oleg Sosnovski, Ottawa (CA); Timothy Mack, Ottawa (CA); Marianna Marx Vieira, Ottawa (CA); Alexander E. Dudelzak, Ottawa (CA)

(73) Assignee: Gastops Ltd., Ottawa (CA)

( * ) Notice: Subject to any disclaimer, the term of this patent is extended or adjusted under 35 U.S.C. 154(b) by 0 days.

(21) Appl. No.: 19/375,391

(22) Filed: Oct. 31, 2025

(65) Prior Publication Data

US 2026/0139616 A1 May 21, 2026

Related U.S. Application Data

(60) Provisional application No. 63/722,420, filed on Nov. 19, 2024.

(51) Int. Cl.

| | |
|---|---|
| ***F01M 11/10*** | (2006.01) |
| ***G01N 21/64*** | (2006.01) |
| ***G01N 21/85*** | (2006.01) |

(52) U.S. Cl.

CPC ........... *F01M 11/10* (2013.01); *G01N 21/645* (2013.01); *G01N 21/8507* (2013.01); *G01N 2021/6417* (2013.01); *G01N 2021/6484* (2013.01)

(58) Field of Classification Search

CPC .. G01N 21/552; G01N 21/3577; G01N 21/85; G01N 21/64; G01N 21/8507;

(Continued)

(56) References Cited

U.S. PATENT DOCUMENTS

| | | | |
|---|---|---|---|
| 6,707,043 | B2 | 3/2004 | Coates et al. |
| 7,015,484 | B2 | 3/2006 | Gillispie et al. |

(Continued)

FOREIGN PATENT DOCUMENTS

| | | | |
|---|---|---|---|
| CN | 106568691 | B | 3/2019 |
| DE | 102010027130 | A1 | 1/2012 |

(Continued)

OTHER PUBLICATIONS

Rahmanian, M. et al. "A micropillar array-based microfluidic chip for label-free separation of circulating tumor cells: The best micropillar geometry?", Journal of Advanced Research 47 (2023), pp. 105-121.

(Continued)

*Primary Examiner* — Michael P Stafira

(57) ABSTRACT

Various methods and systems for monitoring one or more characteristics of a fluid in a mechanical device are disclosed herein. In at least one embodiment, the system includes an optical sensor including an excitation light aperture and an emission light aperture. The excitation light aperture transmits an excitation light to the fluid and the emission light aperture receives an emission light from the fluid. The system may further include an inductive sensor including a printed circuit board including a first field coil trace, a second field coil trace, and a sense coil trace. The methods disclosed include transmitting the excitation light to the fluid; receiving the emission light from the fluid; and operating a processor to obtain one or more fluorescence spectra based on the received emission light; and determine a fluid condition indicator and/or a remaining useful life of the fluid based on the one or more fluorescence spectra.

20 Claims, 45 Drawing Sheets

(58) Field of Classification Search

CPC ........ G01N 21/31; G01N 1/00; G01N 15/082; G01N 21/65; G01N 2021/855; G01N 21/359; G01N 2021/3595; G01N 29/036; G01N 15/00; G01N 21/643; G01N 33/2888; G01N 2021/8528; G01N 21/15; G01N 21/27; G01N 21/645; G01N 2291/0427; G01N 33/2823; G01N 1/10; G01N 15/06; G01N 15/0656; G01N 15/075; G01N 15/1404; G01N 2015/003; G01N 2015/0053; G01N 2015/0662; G01N 2015/0687; G01N 2021/6417; G01N 2021/8411; G01N 2035/00881; G01N 21/94; G01N 33/2858; G01N 33/2876; G01N 35/00871; G01N 29/022; G01N 29/46; G01N 21/09; G01N 21/25; G01N 2291/018; G01N 27/026; G01N 29/028; G01N 2291/2636; G01N 29/4481; G01N 21/3563; G01N 21/55; G01N 2201/129; G01N 2201/1293; G01N 2291/014; G01N 33/02; G01N 2021/8466; G01N 21/274; G01N 21/9508; G01N 2201/0221; G01N 1/2035; G01N 11/10; G01N 11/16; G01N 2021/6484; G01N 2021/656; G01N 2021/8416; G01N 21/17; G01N 2201/1296; G01N 2291/02818; G01N 2500/10; G01N 27/44721; G01N 27/44747; G01N 27/44782; G01N 29/02; G01N 29/024; G01N 29/222; G01N 29/24; G01N 29/2437; G01N 33/28; G01N 33/2805; G01N 33/2847; G01N 33/566; G01N 33/582; G01N 9/002; G01N 2021/151; G01N 2021/8438; G01N 21/35; G01N 21/3504; G01N 21/45; G01N 21/4738; G01N 21/8422; G01N 21/8806; G01N 2201/128; G01N 2333/916; G01N 2500/04; F01M 11/10; F01M 2011/144; F01M 2011/1446; F01M 2011/1466; F01M 2011/1473; F01M 2011/148; F01M 2011/1493

See application file for complete search history.

(56) References Cited

U.S. PATENT DOCUMENTS

| | | | | |
|---|---|---|---|---|
| 7,391,035 | B2 * | 6/2008 | Kong | G01N 21/6408 250/461.1 |
| 7,564,562 | B2 * | 7/2009 | Choi | G01B 9/02083 356/454 |
| 8,155,891 | B2 | 4/2012 | Kong et al. | |
| 9,063,075 | B2 | 6/2015 | Gorritxategi et al. | |
| 9,322,773 | B2 | 4/2016 | Coates et al. | |
| 9,488,617 | B2 | 11/2016 | Jirgal | |
| 10,060,899 | B2 | 8/2018 | Hegazi et al. | |
| 10,254,210 | B2 | 4/2019 | Weiser | |
| 10,281,448 | B2 * | 5/2019 | Hegazi | G01N 11/00 |
| 10,330,497 | B1 | 6/2019 | Moore et al. | |
| 10,974,241 | B2 | 4/2021 | Haeberle et al. | |
| 11,061,010 | B2 | 7/2021 | Wang et al. | |
| 11,300,106 | B2 | 4/2022 | Redding et al. | |
| 11,674,838 | B2 | 6/2023 | Brewer et al. | |
| 11,709,121 | B2 | 7/2023 | Sipperley et al. | |
| 2006/0117839 | A1 | 6/2006 | Fortin et al. | |
| 2014/0226149 | A1 * | 8/2014 | Coates | G01N 21/31 356/51 |
| 2016/0103089 | A1 * | 4/2016 | Boyette | G01N 27/08 356/72 |
| 2018/0017541 | A1 | 1/2018 | Kinard | |
| 2018/0299375 | A1 * | 10/2018 | Young | G01N 1/10 |
| 2018/0313755 | A1 * | 11/2018 | Hatch | G01N 33/2888 |
| 2021/0139040 | A1 | 5/2021 | Ganiger et al. | |
| 2022/0072456 | A1 | 3/2022 | Pelkey et al. | |
| 2023/0358675 | A1 * | 11/2023 | Maikov | G01N 21/532 |

FOREIGN PATENT DOCUMENTS

| | | | | | |
|---|---|---|---|---|---|
| EP | 2755004 | A2 | * | 7/2014 | G01K 11/32 |
| EP | 4375639 | A1 | | 5/2024 | |
| ES | 2455465 | A2 | | 4/2024 | |
| KR | 20050040250 | A | * | 5/2005 | G01N 21/643 |
| KR | 20110080307 | A | * | 7/2011 | G01N 33/2847 |
| WO | WO-0042418 | A1 | * | 7/2000 | G01N 21/7703 |
| WO | WO-2014071016 | A1 | * | 5/2014 | G01J 5/602 |
| WO | WO-2016184792 | A1 | * | 11/2016 | G01N 21/8507 |
| WO | WO-2018223147 | A1 | * | 12/2018 | G01N 21/65 |
| WO | WO-2020218345 | A1 | * | 10/2020 | G01N 21/65 |
| WO | WO-2020247553 | A1 | * | 12/2020 | G02B 6/03622 |
| WO | WO-2021189057 | A1 | * | 9/2021 | B01L 3/502761 |
| WO | WO-2022043997 | A1 | * | 3/2022 | G01N 21/85 |

OTHER PUBLICATIONS

Gayrard et al., "Engine Oil Condition Monitoring With FPS2800 Oil Property Sensor / White Paper", TE Connectivity, retrieved at https://www.te.com/content/dam/te-com/documents/sensors/global/fps2800-white-paper.pdf (24 pages).

"Tandelta Oil Condition Monitoring—Oil Quality Sensor & Associated Accessories User Guide", Tan Delta Systems plc, retrieved at https://www.te.com/content/dam/te-com/documents/sensors/global/fps2800-white-paper.pdf, (137 pages).

* cited by examiner

2400

Table 1 : Advisory / mandatory action limits for used oil analyses

| Property | Method | Advisory | Mandatory |
|---|---|---|---|
| Viscosity 40 °C | ISO 3104 | -20% / +25% | -25% / +30% |
| Viscosity 100 °C | ISO 3104 | -20% / +20% | -25% / +25% |
| Flash point, PMCC, °C | ISO 2719 | < 190 | < 180 |
| Total insolubles, %m # | IP 316 | 2.0 - 3.0 | > 3.0 |
| BN, mg KOH/g | ISO 3771 | < 60% of fresh oil | < 50% of fresh oil |
| TAN, mg KOH/g | ASTM D 664 | > new oil + 1.5 | > new oil + 3 |
| Water, %v/v | ISO 3733 | > 0.2 | > 0.3 |
| Oxidation, abs/cm | FTIR | > 15 | > 25 |
| Nitration, abs/cm | FTIR | > 15 | > 25 |
| Wear elements [mg/kg] | ASTM D 5185 (ICP-PES) | OEM to advise on elements and limits | OEM to advise on elements and limits |

Alternative test methods are also often employed *(Reference 1)*

FIG. 24

SYSTEMS, METHODS AND DEVICES FOR MONITORING FLUID CONDITION

CROSS-REFERENCE TO RELATED APPLICATIONS

This application claims priority from U.S. provisional application No. 63/722,420, filed Nov. 19, 2024, the contents of which are hereby incorporated herein by reference.

FIELD

The embodiments described herein generally relate to monitoring fluid, and in particular to monitoring machinery and fluid condition by monitoring fluid for debris, contaminants, additives, and/or other indicators of machinery or machinery fluid health.

BACKGROUND

The following is not an admission that anything discussed below is part of the prior art or part of the common general knowledge of a person skilled in the art.

Machinery can include various fluid systems. For example, machinery can include lubrication systems that enable the machinery to operate efficiently and durably. However, over time, machinery components can wear and release debris particles into the lubrication system. Furthermore, seals within the lubrication system can become damaged and/or faulty, which can result in leakage of contaminants, such as fuel and/or water and/or coolant, into the lubrication system. Changes to the composition of a machine's fluid system can significantly impact the machine's performance and risk critical damage to the mechanical components of the machinery.

Fluid monitoring systems can be used to detect fluid health, debris and contaminants within machinery fluid systems. However, some existing solutions are limited to offline applications (e.g., requiring a fluid sample to be analyzed in an external laboratory). Although some existing solutions provide online applications (e.g., the fluid is monitored in-situ), these solutions generally measure macroscopic properties of the fluid. For example, existing solutions generally are unable to distinguish which components within a fluid mixture contributed to various portions of a measured signal. Accordingly, the usefulness of existing solutions can be limited.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document.

In accordance with one aspect of this disclosure, there is provided at least one embodiment of a system for monitoring one or more properties of a fluid in a mechanical device. The system includes an optical sensor including an excitation light aperture and an emission light aperture. The excitation light aperture transmits an excitation light to the fluid and the emission light aperture receives an emission light from the fluid.

In accordance with another aspect of this disclosure, there is provided a method for monitoring one or more properties of a fluid in a mechanical device using the various embodiments of the system disclosed herein.

In accordance with a further aspect of this disclosure, there is provided an optical sensing system for monitoring one or more properties of a fluid in a mechanical device, the optical sensing system comprising: a light source system configured to transmit excitation light toward the fluid; a detector configured to receive light emitted from the fluid; and a window disposed between the light source system and the fluid, the window comprising an optically transparent material configured to allow transmission of the excitation light and the emitted light, wherein the optical sensing system is configured to determine at least one characteristic of the fluid based on the received light.

In accordance with another aspect of this disclosure, there is provided a method for monitoring one or more properties of a fluid in a mechanical device using the various embodiments of the optical sensing system disclosed herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 24 is an example table of action limits for oil analysis in accordance with an embodiment;

Figure 1:
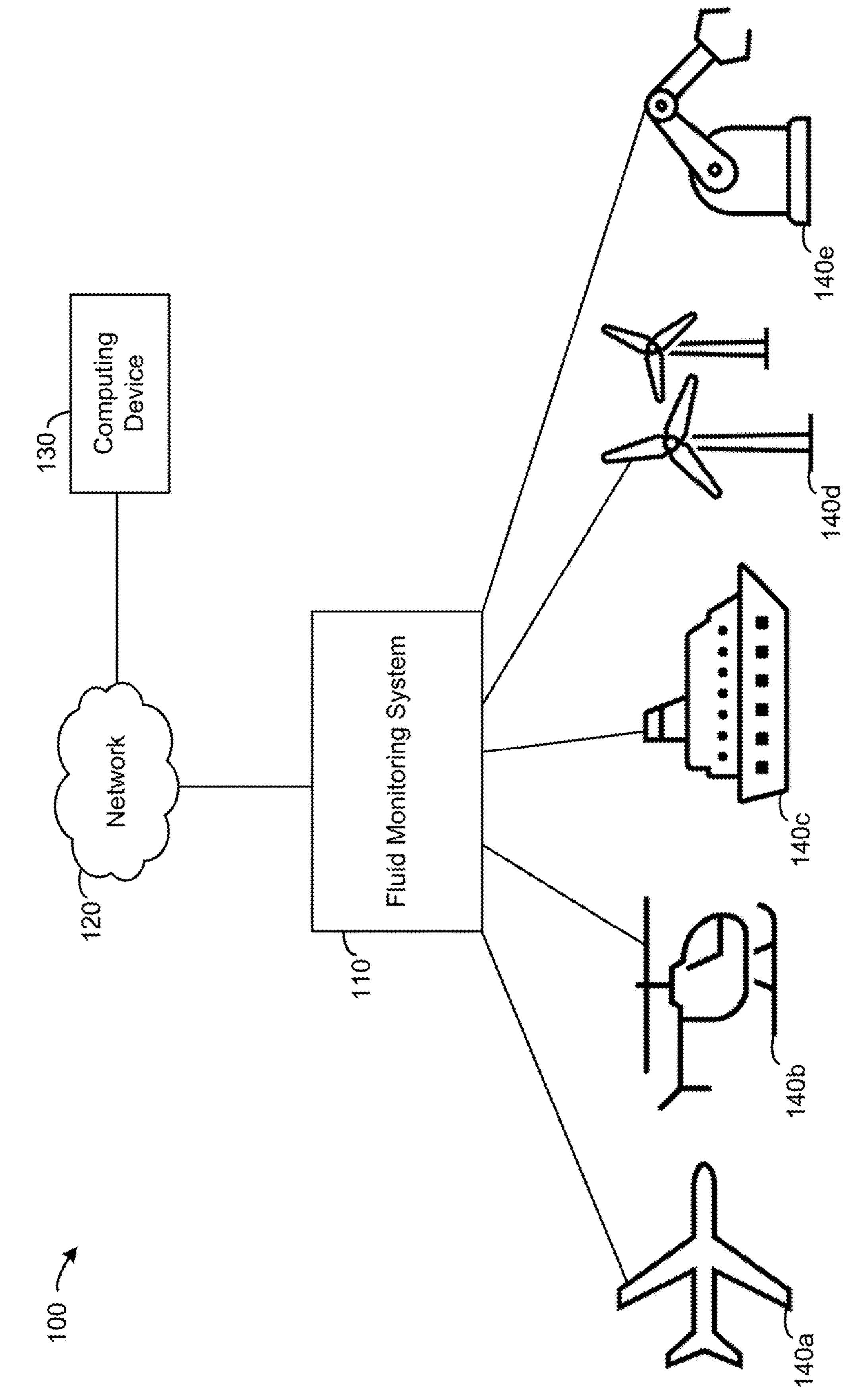
FIG. 1 is a block diagram of an example fluid monitoring system in accordance with an embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Mechanical devices, such as machinery, generally require fluids to operate efficiently and maintain healthy components. Such fluids include lubricating oils, hydraulic fluids, thermal transfer fluids such as coolants, greases, fuel, and other tribological fluids etc. As machinery operates, the machinery components undergo wear and tear over time. Such wear and tear can produce debris and other contaminants that can enter the machinery fluids.

Even small changes to machinery fluid composition can significantly impact machinery performance and increase the risk of damage to mechanical components of the machinery. This is because even small changes to the composition of machinery fluids can cause changes to the fluid viscosity, increase the fluid acidity, increase the risk of corrosion, cause deposition of sludge and/or varnish, and/or other common machinery fluid degradation issues.

The fluid monitoring system disclosed herein can measure properties of the machinery fluid, including characterization of additives and/or contaminants within the machinery fluid.

In some cases, it can be helpful to perform the analysis for diagnostic purposes. For example, when a seal within the machinery is faulty (i.e., leaky) due to damage and/or a defect, machinery fluid, such as lubricant oil, can become contaminated with other fluids from the machinery, such as fuel and/or coolant. In such scenarios, it is helpful to be able to measure the lubricant oil to detect and identify the contaminant fuel and/or coolant, which can further help diagnose a leaky seal or other sources of leaks within the machinery. As another example, as machinery operates over time, components of the machinery can deteriorate and release debris, such as metallic particles, in the machinery fluid system. The diagnostics can be qualitative (e.g., fuel contamination present in lubricant oil) and/or quantitative (e.g., fuel contamination is 1.1 wt %).

In other cases, it can be helpful to perform the analysis for prognostic purposes. For example, the fluid monitoring system can determine, based on the measurements of the machinery fluid over time, when the debris and/or contaminants within the fuel will reach a critical level that would likely lead to damage and/or critical failure of the machinery. This can include determining the remaining useful lifetime of a machinery fluid before it requires replacement or treatment. A maintenance recommendation could be determined based on these prognostics, such as a recommendation to "drain and replace the machinery lubricant oil within the next 45 hours", for example. Such prognostics and maintenance recommendations could reduce the costs and/or labor requirements for operating and maintaining the machinery. The prognostics can be quantitative (e.g., based on a current fuel contamination of 1 wt %, and a linear rate of fuel contamination increase of 0.25 wt % per day, there will be 10 days before a critical concentration of 3.5 wt % of fuel contamination in the lubricant oil is reached).

In some cases, it can be useful to screen a fluid before introducing it into machinery. For example, marine bunker fuel can often be contaminated. Accordingly, it can be useful to determine the quality of the fuel received from a supplier before adding it to the machinery.

It can be helpful to analyze the machinery fluid composition based on measurements of certain machinery fluid properties. Several conventional solutions for such analysis exist. Generally, these solutions are performed in an offline manner. That is, a fluid sample is obtained from machinery and is analyzed in an external laboratory off-site. Fluid samples are commonly analyzed on a monthly or quarterly basis. Such approaches are sufficient for slow contamination events or slow deterioration of the machinery fluid. However, such approaches are insufficient for contamination or deterioration that occur at faster rates than fluid samples are obtained and analyzed. Furthermore, offline monitoring requires additional time and labor to collect fluid samples, transport the fluid samples to a laboratory, and analyze the fluid samples at the laboratory.

Accordingly, it can be helpful to analyze the machinery fluid composition in an online manner. That is, obtaining measurements of the machinery fluid properties while the machinery fluid is still within the machinery (i.e., online measurements do not require a fluid sample to be removed from the machinery). This further provides the possibility of automated analysis, such that measurements and analysis can be performed on the machinery fluid in real-time or near real-time to obtain a current health status of the machinery fluid.

Existing (online) solutions generally use electrical methodologies. However, electrical methods generally only measure macroscopic properties of the machinery fluid. That is, various chemical species within the machinery fluid contribute to the electrical measurements that are obtained, and distinguishing the relative contributions from the different chemical species can be challenging.

Some existing solutions use absorptive approaches using wavelengths of light in the infrared, near infrared, visible, or ultraviolet (UV) ranges, with infrared and near infrared ranges being the most commonly employed. Many approaches using light in the visible range are not reliable since many chemical species within the machinery fluid can contribute to visible light absorption within the machinery fluid. Some existing solutions use Raman spectroscopy, which typically requires a high-powered laser source and specialty detection equipment. Another commonly used method is Fourier Transform Infrared (FTIR) spectroscopy which also requires specialty interferometric detection equipment.

Embodiments described herein provide systems, methods and devices for monitoring conditions and/or physiochemical properties of fluid, such as machinery fluid. The systems described herein can include one or more probes having one or more sensors. For example, the one or more probes can include one or more of an optical sensor, an electrical properties sensor, and inductive sensor, and a temperature sensor. In some embodiments, the one or more sensors are in physical contact with the fluid to be monitored. In various embodiments, the systems described herein are implemented in an online manner (i.e., the fluid being monitored is in-situ). In alternative embodiments, the systems described herein can be implemented in an offline manner (i.e., the fluid being monitored is ex-situ).

As discussed above, in various embodiments, the systems, methods and devices disclosed herein detect constituents, debris and/or contaminants within the fluid being monitored. For example, in various embodiments, the systems, methods and devices described herein can detect one or more of water contamination, fuel contamination, additive concentrations (e.g., antioxidants or fluorescent additives), fluorescent antioxidant oxidation products, soot, and/or metal debris. In some embodiments, the systems, methods and devices can further detect additive depletion (e.g., antioxidant depletion) in fuels and degradation of coolants.

In some embodiments, the systems can classify the fluid type and/or quality. For example, such classification can be used to ensure that the correct fluid is being added to a particular machine.

Referring now to FIG. 1, shown therein is a block diagram 100 of a fluid monitoring system 110. As shown in the example of FIG. 1, the fluid monitoring system 110 is connected to a computing device 130 via a network 120.

As further shown in the example of FIG. 1, the fluid monitoring system 110 can monitor fluid conditions in a plurality of applications. For example, the fluid monitoring system 110 monitors fluid conditions (e.g., physiochemical properties of lubricating fluid) in aircraft applications 140*a*, rotorcraft applications 140*b*, watercraft applications 140*c*, wind turbine applications 140*d*, and/or other machinery applications 140*e*. Applications 140*a-e* are provided as examples only, and it should be understood that fluid monitoring system 110 can monitor fluid conditions in other applications.

In some embodiments, fluid monitoring system 110 monitors fluid in an online manner. That is, the fluid monitoring system 110 monitors fluid in-situ, while the machinery in which the monitored fluid is located is in normal operation. In alternative embodiments, fluid monitoring system 110 monitors fluid in an offline manner. That is, the fluid monitoring system 110 monitors fluid ex-situ by analyzing a fluid sample that is obtained from the machinery.

The computing device 130 may be any networked device operable to connect to the network 120. A networked device is a device capable of communicating with other devices through a network such as the network 120. A networked device may couple to the network 120 through a wired or wireless connection. These computing devices 130 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

Although only one computing device 130 is shown in FIG. 1, it will be understood that more than one computing device 130 can communicate with the fluid monitoring system 110 at any one time. In some embodiments, a connection request initiated from the computing device 130 may be initiated from a web browser and directed at the browser-based communications application on the fluid monitoring system 110. In some embodiments, computing device 130 includes separate computing devices for different users interacting with the fluid monitoring system 110.

Although not shown in FIG. 1, in some embodiments, fluid monitoring system 110 may also include a computing device. In some embodiments, system 110 comprises a computing device that may be a microprocessor, laptop, portable computer, small form-factor personal computer, workstation, server, portable computer, mobile device, personal digital assistant, laptop, smart phone, WAP phone, an interactive television, video display terminals, gaming consoles, and portable electronic devices or any combination of these.

The network 120 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the fluid monitoring system 110 and the computing device 130. In various embodiments, the network 120 includes on-vehicle or industrial networks, such as, for example, including but not limited to Aeronautical Radio, Incorporated (ARINC) standard (a communication protocol widely used in avionics or aerospace), Controller Area Network (CAN) bus (a communication protocol widely used in automotive, marine and industrial systems), or Modbus (a communication protocol widely used in marine or industrial systems).

Figure 2:
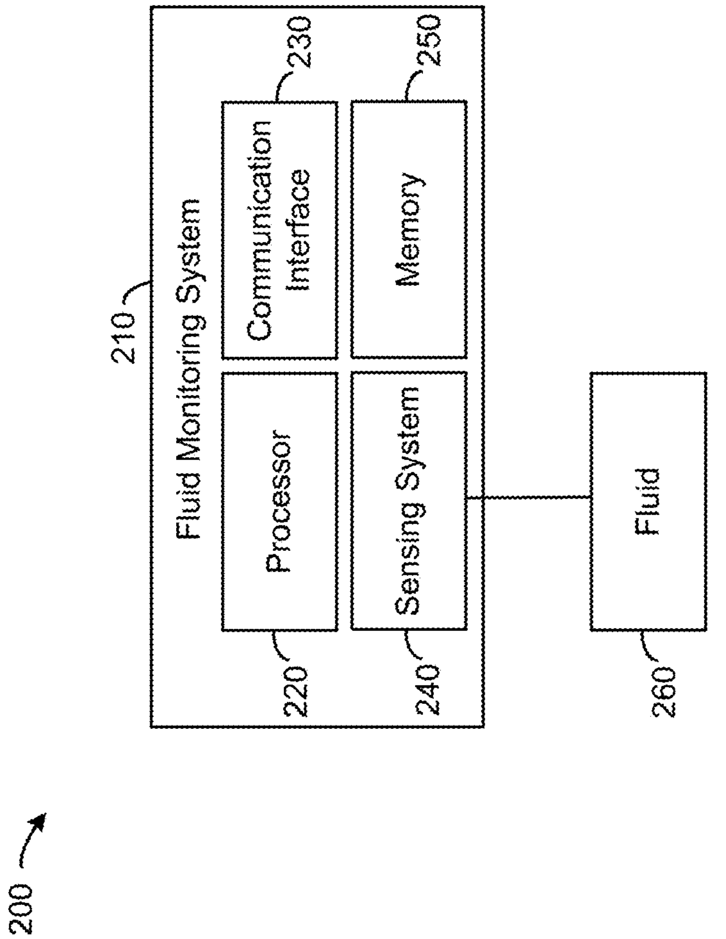
FIG. 2 is a block diagram of another example of a fluid monitoring system in accordance with an embodiment.

Referring now to FIG. 2, shown therein is a block diagram 200 of fluid monitoring system 210 for monitoring properties of the fluid 260. As shown in the example in FIG. 2, fluid monitoring system 210 includes a processor 220, a communication interface 230, a sensing system 240, and a memory 250.

In some other embodiments, the fluid monitoring system 210 only includes a sensing system 240 and a communication interface 230. In such embodiments, some other components, such as, the processor 220 and the memory 250 are located remotely from the fluid monitoring system 210. In some further embodiments, the fluid monitoring system 210 includes a sensing system 240, a communication interface 230 and a memory 250, whereas the processor 220 is located remotely from the fluid monitoring system 210.

The processor 220 may be any suitable processors, controllers, digital signal processors, or application specific circuitry that can provide sufficient processing power depending on the configuration, purposes and requirements of the fluid monitoring system 210. In some embodiments, the processor 220 can include more than one processor with each processor 220 being configured to perform different dedicated tasks. In some cases, the processor 220 may include an on-site processor and an external processor working in collaboration to carry out the functionalities of the processor 220.

The processor 220 can be configured to control the operation of the various components of the fluid monitoring system 210. For example, the processor 220 can control operation of the sensing system 240. The processor 220 can also be configured to control communications between the fluid monitoring system 210 and external devices, such as the computing device 130.

In some examples, the processor 220 may be configured to process measurement data received from the sensing system 240. For example, the measurement data may correspond to unprocessed sensor measurements from one or more sensors included in the sensing system 240 and the processor 220 may be configured to receive and process this data to determine one or more properties of the fluid 260. Alternately or in addition, processor 220 may be configured to calibrate at least a portion of the measurement data based on one or more calibration parameters for the sensing system 240 and/or based on at least another portion of the measurement data. For example, calibration parameters may be stored in memory 250. Processor 220 may use the stored calibration parameters to adjust/calibrate the measurement data based on the specific parameters of the given sensing system 240.

Alternately, processor 220 may not perform any processing on the received measurement data. For example, processor 220 may store and/or transmit the measurement data without any processing and/or adjustments.

In some examples, processor 220 may be configured to store the measurement data received from the sensing system 240 in memory 250. Processor 220 may store the measurement data in memory 250 in an unprocessed form. Alternately or in addition, processor 220 may be configured to store processed measurement data and/or determined fluid properties in memory 250.

In some examples, processor 220 may be configured to transmit the measurement data (whether raw, processed or partially processed) to an external analysis system and/or device, such as computing device 130. Processor 220 may transmit the measurement data to external devices using communication interface 230. Alternately, the processor 220 may simply receive the measurement data and provide the data to the communication interface 230 in an unprocessed form (i.e. without performing any processing on the received measurement data). Alternately or in addition, processor 220 may be configured to provide partially processed measurement data and/or determined fluid properties data to an external analysis system and/or device using communication interface 230.

The communication interface 230 may be any interface that enables the fluid monitoring system 210 to communicate with other devices and systems, such as, but not limited to, a computing device 130 using a network such as the network 120. In some embodiments, the communication interface 230 can include at least one of a serial port, a parallel port or a USB port. The communication interface 230 may also include at least one of an Internet, Local Area Network (LAN), Ethernet, Firewire, modem or digital subscriber line connection. In some embodiments, the communication interface 230 may be a wireless communication interface, which can transmit various data to other devices or systems via Bluetooth, WiFi, or other suitable wireless communication standard. In other embodiments, the communication interface 230 can support industrial and automotive communication protocols, such as, for example, Modbus (e.g., in industrial and marine applications), CAN bus or J1939 (e.g., in automotive and heavy-duty vehicle), and AIRINC (e.g., in aerospace avionics). In some cases, the communication interface 230 may be omitted. For example, where the memory 250 is a removable data storage device, the communication interface 230 may not be needed.

The sensing system 240 includes at least one component that is configured to make physical contact with, or near physical contact with, the fluid 260. The sensing system 240 can include one or more sensors to measure one or more physicochemical properties and/or conditions of fluid 260. The sensing system 240 can be in communication with the processor 220 via a wired and/or wireless connection. For example, the sensing system 240 can be configured to transmit measurement data to the processor 220. Further detail about the sensing system 240 will be provided with reference to FIGS. 3A-D.

The memory 250 may store various data, such as, but not limited to data measured by the sensing system 240. In some cases, the memory 250 may store calibration data specific to the fluid monitoring system 210 that can be used to calibrate the data measured by the sensing system 240. The memory 250 may also store processed data determined by the processor 220. The memory 250 can include RAM, ROM, one or more hard drives, one or more flash drives or some other suitable data storage elements such as disk drives, etc. In some cases, the memory 250 may be removable from the fluid monitoring system 250.

The fluid 260 to be monitored can include any machinery fluid. For example, the fluid 260 can include oil (such as lubricating oil), coolant (such as water or water/glycol mixtures), hydraulic fluid, thermal transfer fluid, fuel, tribological fluid, and/or any other fluid used in machinery and/or mechanical devices. In some embodiments, the fluid 260 includes semi-solid lubricant, such as grease.

In some embodiments, fluid 260 includes one or more contaminants. Some fluids are deemed contaminants when present in machinery fluid, such as lubricating oil. For example, fuel, coolant, and/or water may be considered contaminants when present within machinery fluid. Contaminants may not be present in fluid 260 in substantial quantities immediately after fluid 260 has been changed (e.g., after an oil change when fluid 260 is a lubricating oil) and the concentration of contaminants present in fluid 260 may increase over time. In some embodiments, even small amounts of contaminants relative to the combined mass of fluid 260 (e.g., less than 5% by weight) can negatively impact performance of the machine in which fluid 260 is located.

In various embodiments, the fluid monitoring system 210 is embodied as a probe. The probe is a device or instrument designed to penetrate or interact with a fluid medium, such as fluid 260, to monitor its properties.

Figure 3A:
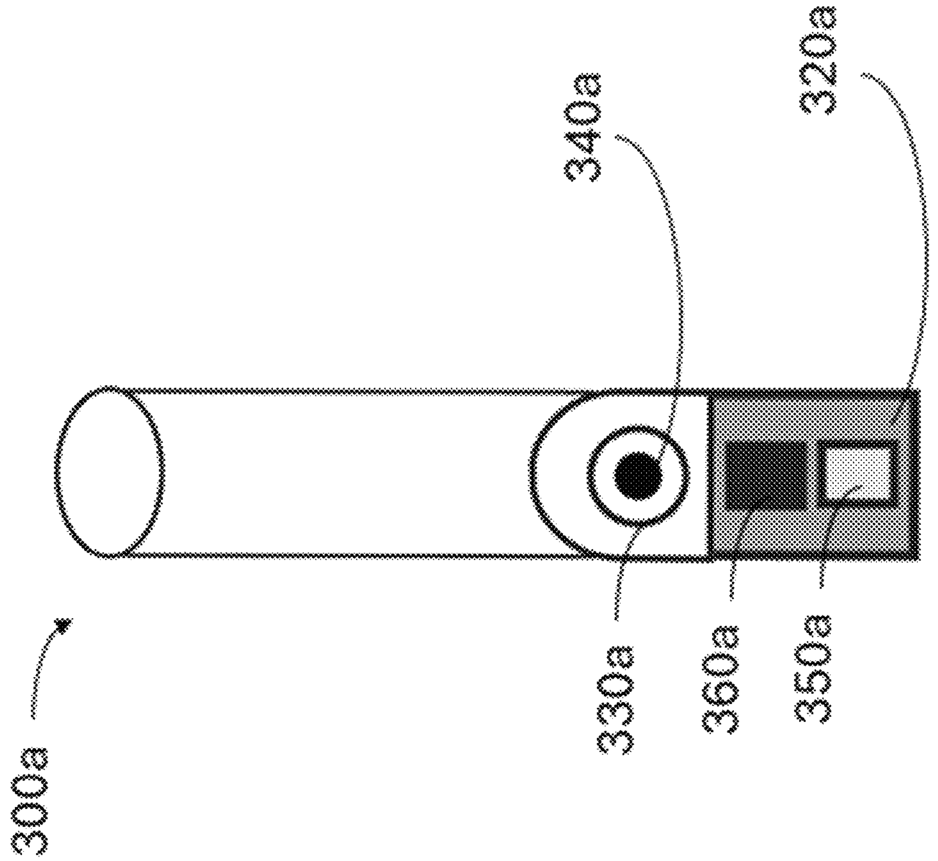
FIG. 3A is an example probe of the example fluid monitoring system shown in FIG. 2 in accordance with an embodiment.

Referring to FIG. 3A, shown therein is an example probe 300*a*. In the example shown in FIG. 3A, probe 300*a* includes an inductive sensor 320*a*, a window 330*a*, an optical sensing system 340*a*, an electrical properties sensor 350*a* and a temperature sensor 360*a*.

As shown in the example in FIG. 3A, at least a portion of the probe 300*a* has a generally cylindrical shape. In alternative embodiments, at least a portion of the probe 300*a* has another shape, such as a generally polygonal shape. In some embodiments, the general width of the probe 300*a* is between approximately 1 millimeter to 1000 millimeters.

The inductive sensor 320*a* can include any suitable inductive sensor. The inductive sensor 320*a* is used to monitor debris within a fluid. Further detail about the inductive sensor 320*a* is provided with reference to FIGS. 8 and 21-35.

The window 330*a* can allow optical sensing system 340*a* to operate without directly contacting the fluid to be monitored, such as fluid 260. That is, the window 330*a* protects the optical sensing system 340*a* from direct exposure to contaminants that may be present in fluid 260, such as solids that could deposit on or near optical sensing system 340*a* (e.g., soot, varnish, and/or sludge) thereby impacting the efficacy of optical sensing system 340*a*.

The window 330*a* can include an optically transparent material that transmits light in the ultraviolet and/or visible wavelength ranges. In various embodiments, the window 330*a* includes an optically transparent material that transmits light in approximately 200-400 nm range (ultraviolet). In various other or additional embodiments, the window 330*a* includes an optically transparent material that transmits light in approximately 400-850 nm range (visible wavelength).

For example, the window 330*a* can transmit excitation light from optical sensing system 340*a* to fluid, such as fluid 260, and/or emitted light from fluid 260 to be received by optical sensing system 340*a*. In some embodiments, the window 330*a* is made of sapphire. In some embodiments, the window 330*a* is made of quartz.

In some embodiments, the window 330*a* includes an optically transparent material that transmits light in the near infrared or infrared wavelength range. In various embodiments, the window 330*a* includes an optically transparent material that transmits light in approximately 780-1400 nm range (near infrared). In various other or additional embodiments, the window 330*a* includes an optically transparent material that transmits light in approximately 1400-100000 nm range (infrared).

The electrical properties sensor 350*a* can include any suitable electrical properties sensor. The electrical properties sensor 350*a* is used to monitor contaminants, such as water and/or soot, within a fluid. Further detail about the electrical properties sensor 350*a* is provided with reference to FIG. 7A.

The temperature sensor 360*a* can include any suitable temperature sensor. The temperature sensor 360*a* can be used to monitor temperature of a fluid. Further detail about the temperature sensor 360*a* is provided with reference to FIGS. 9A-C. In the example shown in FIG. 3A, the entirety of window 330*a* includes an optically transparent material. In alternative embodiments, a portion of window 330*a* includes an optically transparent material while another portion of window 330*a* includes a different material.

In some embodiments, the surface of window 330*a* is angled at approximately 45 degrees. In some embodiments, the surface of window 330*a* is at an angle between 0 degrees and 90 degrees with respect to the longitudinal axis of the probe 300*a*. For example, in some embodiments, the window 330*a* is at an angle between 10 and 80 degrees, 20 and 70 degrees, 30 and 60 degrees, or 40 and 50 degrees.

In some embodiments, the window 330*a* is omitted. In such embodiments, optical sensing system 340*a* is configured to directly contact fluid, such as fluid 260.

The optical sensing system 340*a* can include any suitable optical sensing system for monitoring contaminants within a fluid. The optical sensing system 340*a* can include one or more optical elements such as spectrometer, focusing optics, fiber optics, and/or light sources. In some embodiments, the optical sensing system 340*a* is fluorescence-based system. For example, the optical sensing system 340*a* can operate based on fluorescence spectrometry techniques. In some embodiments, the optical sensing system 340*a* is non-fluorescence based. For example, the optical sensing system 340*a* can operate based on techniques such as optical absorbance (Near Infrared or Infrared), Raman spectroscopy and variants thereof, hyperspectral imaging, surface plasmon resonance, and/or other non-linear optical techniques. Further detail about the optical sensing system 340*a* is provided with reference to FIGS. 10A-20B.

Figure 3B:
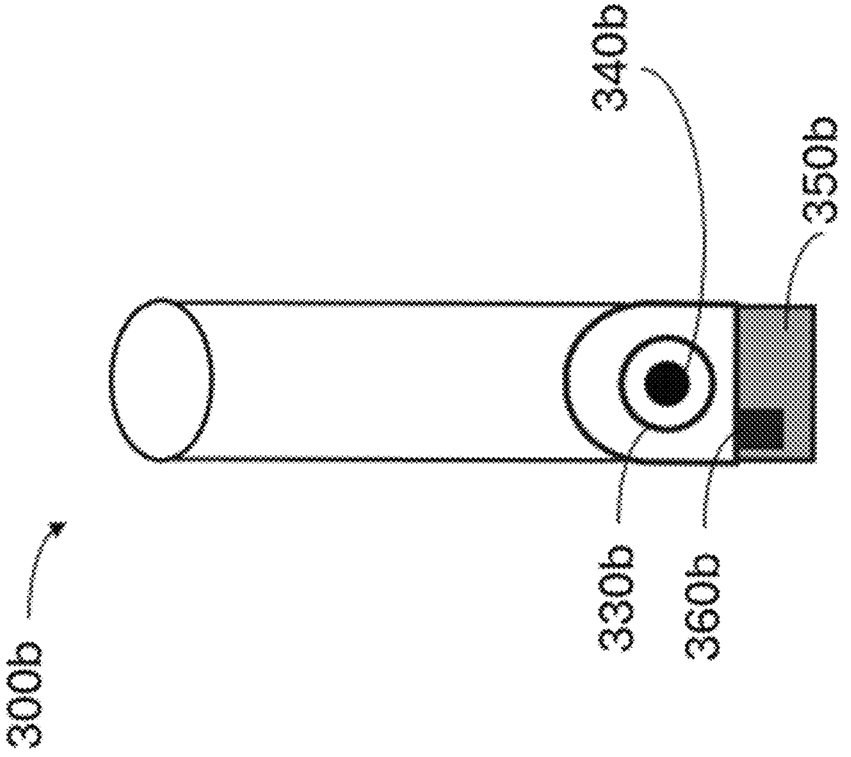
FIG. 3B is another example probe of the example fluid monitoring system shown in FIG. 2 in accordance with an embodiment.

Referring to FIG. 3B, shown therein is an example probe 300*b*. In the example shown in FIG. 3B, probe 300*b* includes a window 330*b*, an optical sensing system 340*b*, an electrical properties sensor 350*b*, and a temperature sensor 360*b*.

The window 330*b* is analogous to window 330*a*. The optical sensing system 340*b* is analogous to optical sensing system 340*a*. The electrical properties sensor 350*b* is analogous to electrical properties sensor 350*a*. The temperature sensor 360*b* is analogous to temperature sensor 360*a*.

Figure 3C:
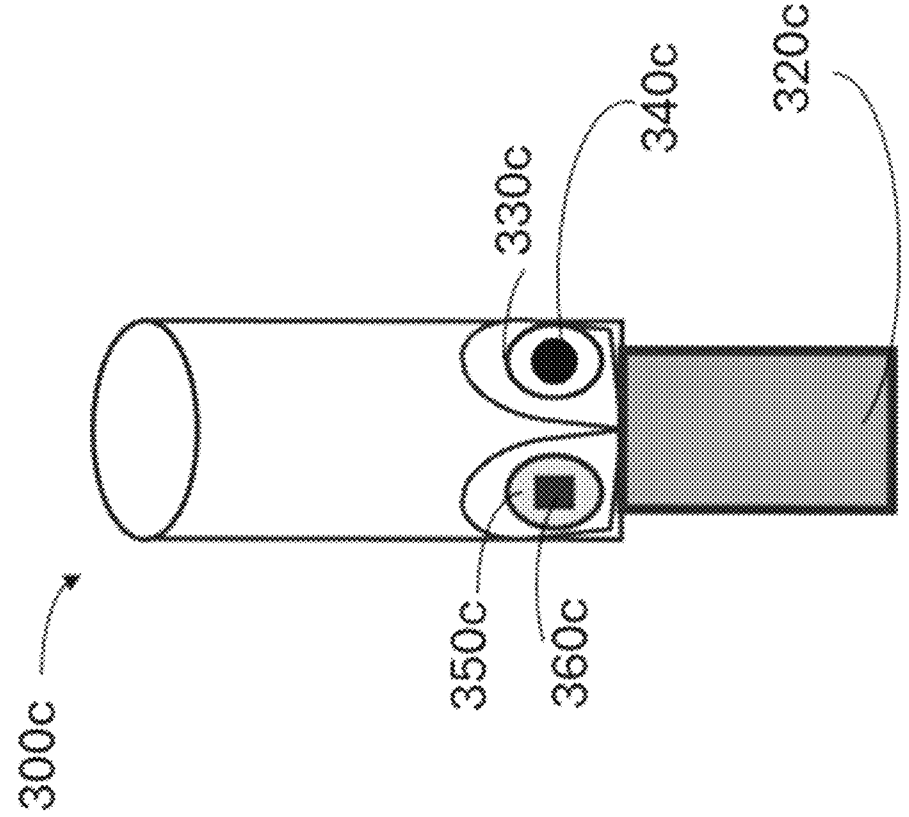
FIG. 3C is another example probe of the example fluid monitoring system shown in FIG. 2 in accordance with an embodiment.

Referring to FIG. 3C, shown therein is an example probe 300*c*. In the example shown in FIG. 3C, probe 300*c* includes an inductive sensor 320*c*, a window 330*c*, an optical sensing system 340*c*, an electrical properties sensor 350*c*, and a temperature sensor 360*c*.

The inductive sensor 320*c* is analogous to inductive sensor 320*a*. The optical sensing system 340*c* is analogous to optical sensing system 340*a*-*b*. As shown in the example of FIG. 3C, probe 300*c* includes a window 330*c* adjacent to optical sensing system 340*c*. In alternative embodiments, probe 300*c* may not include window 330*c*.

The electrical properties capacitive sensor 350*c* is analogous to electrical properties sensor 350*a*-*b*. The temperature sensor 360*c* is analogous to temperature sensor 360*a*-*b*.

Figure 3D:
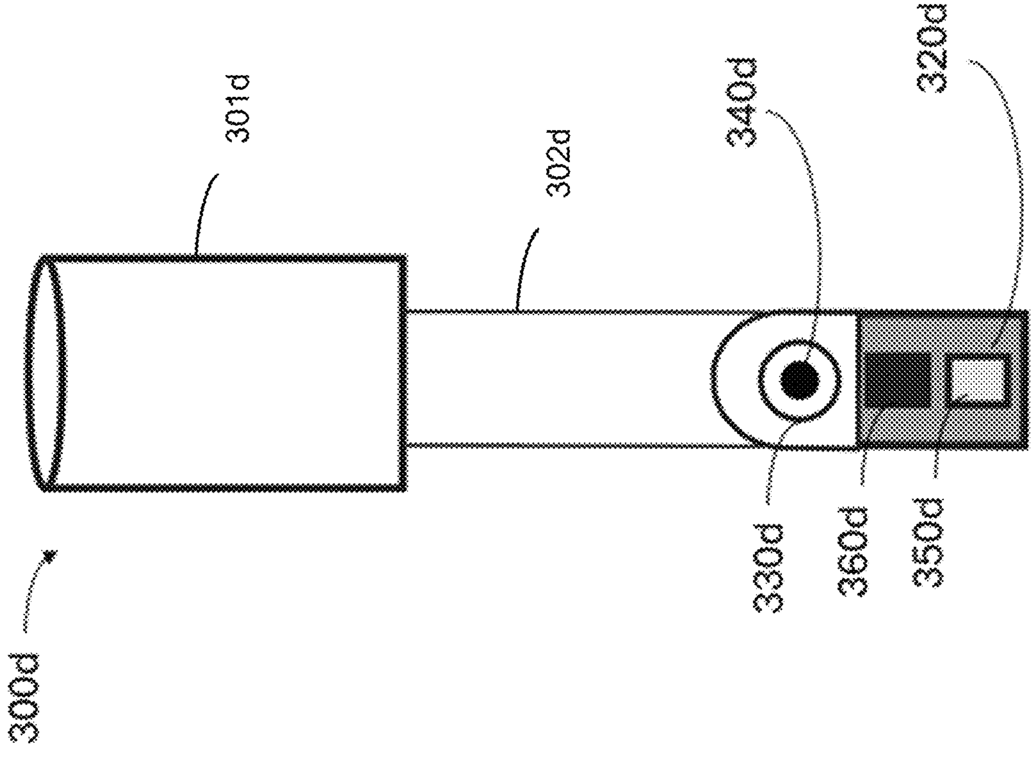
FIG. 3D is another example probe of the example fluid monitoring system shown in FIG. 2 in accordance with an embodiment.

Referring to FIG. 3D, shown therein is an example probe 300*d*. In the example shown in FIG. 3D, probe 300*d* includes an inductive sensor 320*d*, a window 330*d*, an optical sensing system 340*d*, an electrical properties sensor 350*d* and a temperature sensor 360*d*.

The inductive sensor 320*d* is analogous to inductive sensors 320*a* and 320*c*. The window 330*d* is analogous to windows 330*a-c*. The optical sensing system 340*d* is analogous to optical sensing system 340*a-c*. The electrical properties sensor 350*d* is analogous to electrical properties sensor 350*a-c*. The temperature sensor 360*d* is analogous to temperature sensor 360*a-c*.

As shown in the example in FIG. 3D, probe 300*d* can have two concentric portions 301*d* and 302*d*, which are shown as generally cylindrical portions in probe 300*d*. In alternative embodiments, at least a portion of the probe 300*d* has another shape, such as a generally polygonal shape. In some embodiments, the ratio of the width of the first concentric portion 301*d* to the width of the second concentric portion 302*d* is in the range of 1000 to 1.01.

Figure 4A:
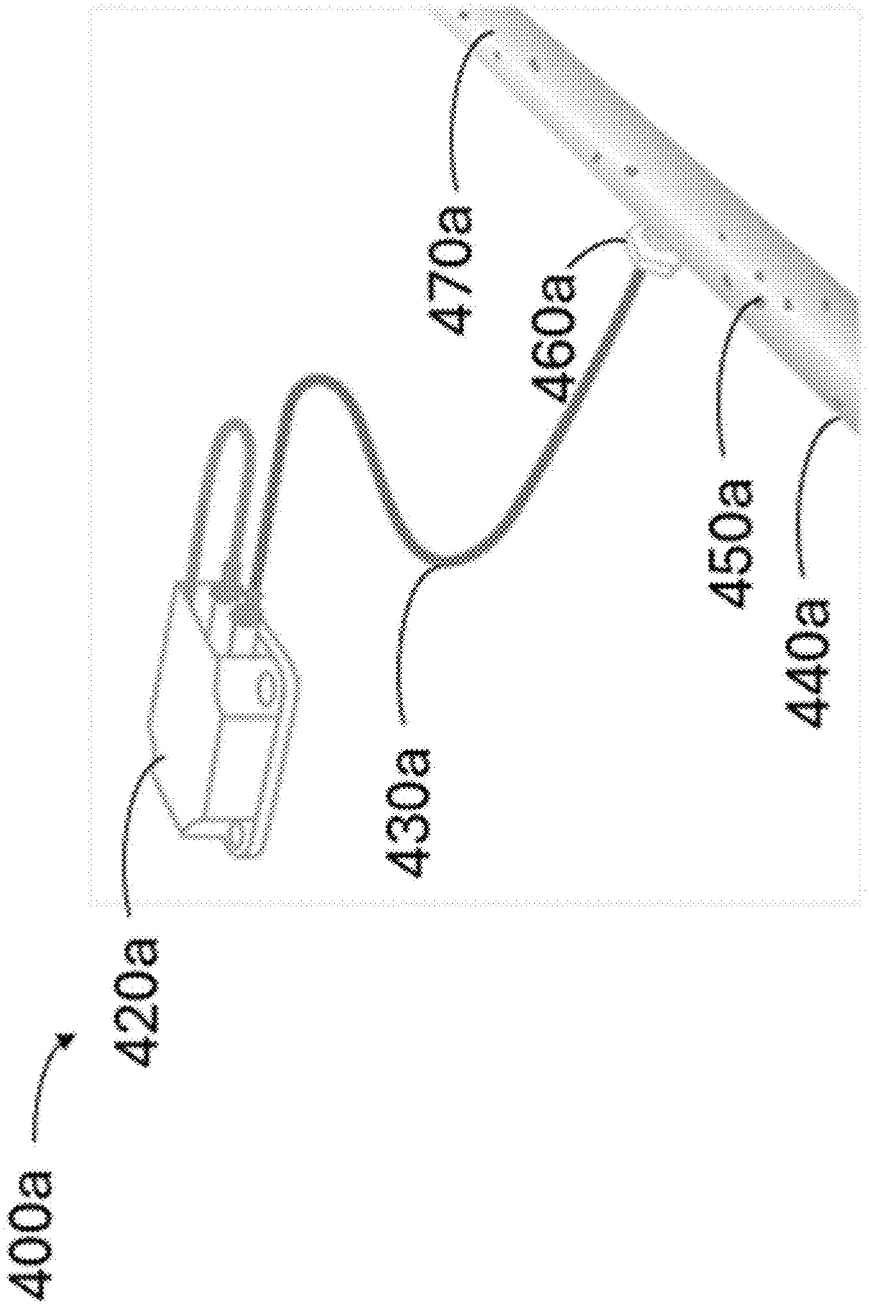
FIG. 4A is an illustration of an example fluid monitoring system in accordance with an embodiment.

Referring to FIG. 4A, shown therein is an example illustration 400*a* of a fluid monitoring system, such as fluid monitoring system 210, in an online application. As shown in the example in FIG. 4A, the fluid monitoring system includes one probe 460*a*. Probe 460*a* is installed in-line of a pipe 440*a* carrying fluid 470*a*. Fluid 470*a* is shown to have particulates 450*a*, which can be detected by the fluid monitoring system. Cable 430*a* connects the probe 460*a* to a processing unit 420*a*.

The processing unit 420*a* can include, for example, a processor such as processor 220, a memory such as memory 250, and/or a communication interface such as communication interface 230. The processing unit 420*a* can further include other components for sending and/or receiving data and/or signals to and/or from probe 460*a*.

Cable 430*a* can include a fiber optic cable and/or electronic cables to transmit data and/or signals to and/or from the probe 460*a*. In some embodiments, cable 430*a* includes a fiber optic cable having one or more fiber optic strands. In some embodiments, the fiber optic cable has 1 to 20 fiber optic strands. In some embodiments, the fiber optic cable has 2 to 5 fiber optic strands. Although FIG. 4A only shows one cable 430*a*, it should be understood that other example embodiments can include more than one cable 430*a*. In various embodiments, the cable 430*a*, such as, for example, the fiber optic strands, isolates the fluid, such as, for example, hot oil, from the sensitive optoelectronics.

Figure 4B:
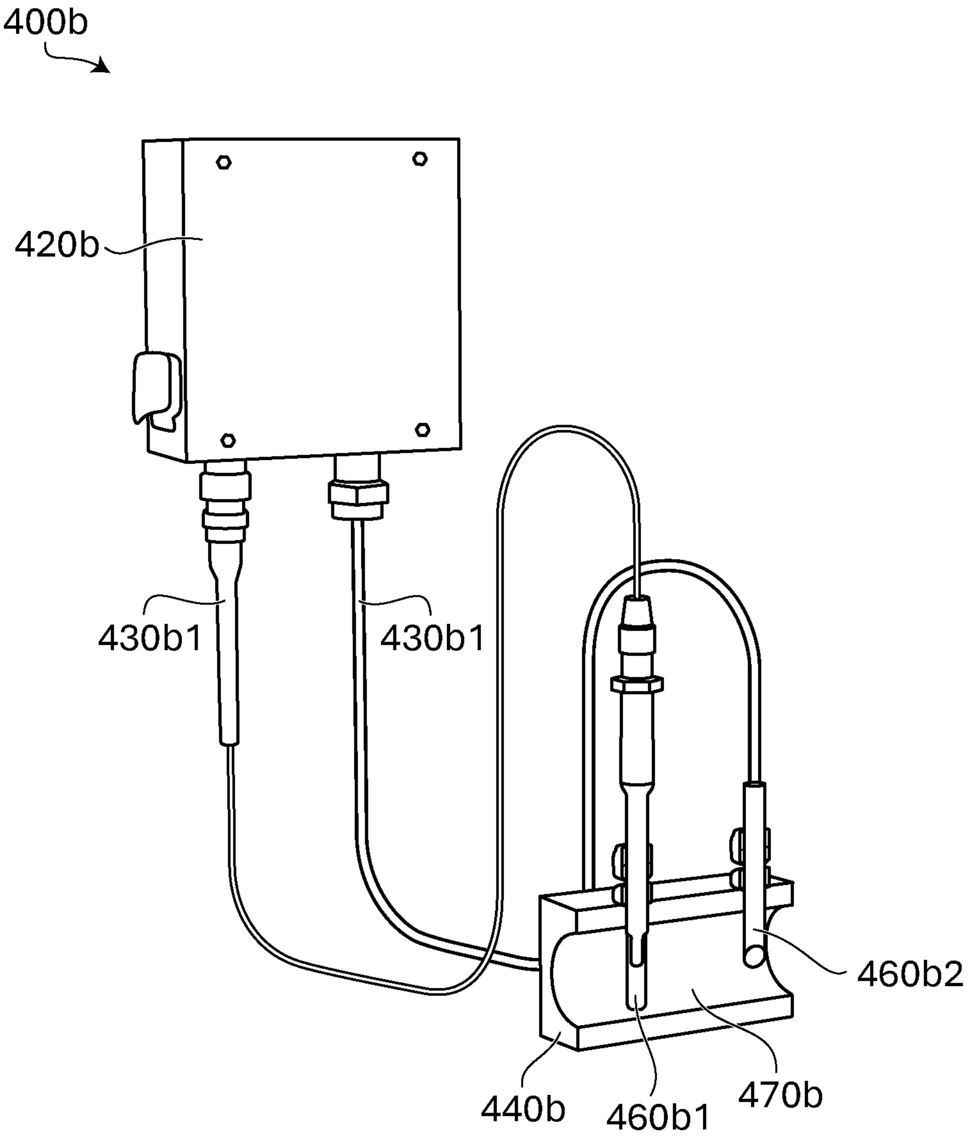
FIG. 4B is an illustration of another example fluid monitoring system in accordance with an embodiment.

Referring to FIG. 4B, shown therein is an example illustration 400*b* of a fluid monitoring system, such as fluid monitoring system 210, in an on-line application. As shown in the example in FIG. 4B, the fluid monitoring system includes two probes. Probes 460*b*1 and 460*b*2 are installed on-line of pipe 440*b* carrying fluid 470*b*. Each of probes 460*b*1 and 460*b*2 can include one or more sensors. For example, probe 460*b*1 can include an inductive sensor, and probe 460*b*2 can include one or more of an electrical properties sensor, a temperature sensor, and an optical sensing system. Cable 430*b*1 connects probe 460*b*1 to the processing unit 420*b*. Cable 430*b*2 connects probe 460*b*2 to the processing unit 420*b*. Each of cables 430*b*1 and 430*b*2 is analogous to cable 430*a*.

Although not shown in the example of FIG. 4B, in some embodiments the fluid monitoring system comprises more than two probes, wherein each probe can include one or more sensors and/or sensing systems.

Figure 5:
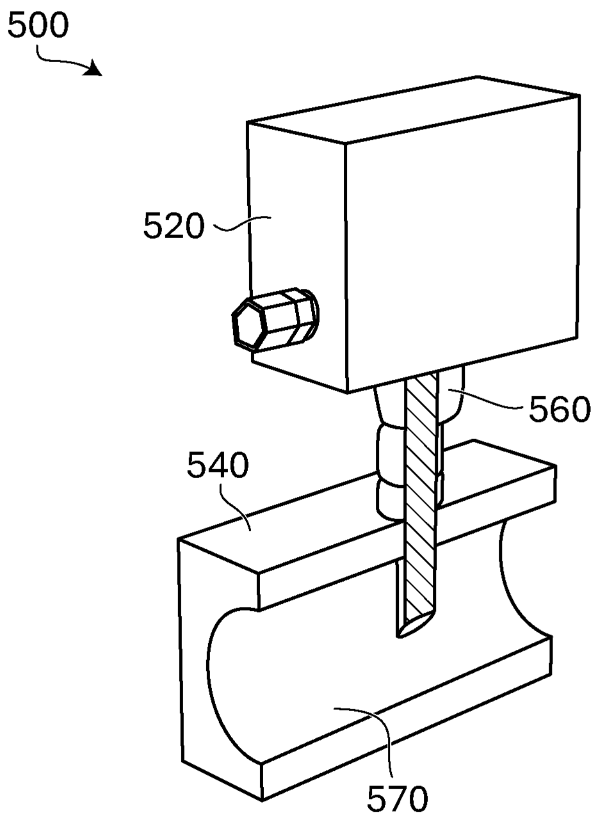
FIG. 5 is an illustration of another example fluid monitoring system in accordance with an embodiment.

Referring to FIG. 5, shown therein is an example illustration 500 of a fluid monitoring system, such as fluid monitoring system 210, in an online application. As shown in the example in FIG. 5, probe 560 is installed on-line of pipe 540 carrying fluid 570. Probe 560 can include one or more sensors. As shown in FIG. 5, the probe 560 is connected directly to the processing unit 520 without the use of cables, such as cable 430*a*.

In some embodiments, multiple probes, such as probes 460*a* (FIG. 4A), 460*b*1, 460*b*2 (FIG. 4B), or 560 (FIG. 5), are used at different locations throughout the pipe to capture measurement data from the fluid at those different locations. This may provide the advantage of more accurately detecting the properties of the fluid in the pipe. In some other embodiments, the probe, such as probe 460*a*, 460*b*1, 460*b*2, 560, is built into the pipe at one or more locations directly.

Figure 6A:
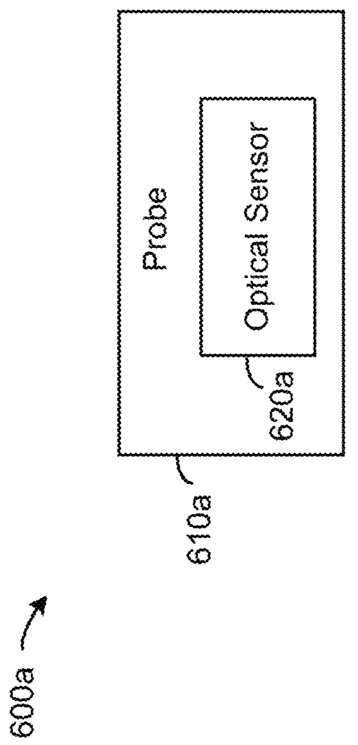
FIG. 6A is a block diagram of an example probe of the fluid monitoring system of FIG. 2 in accordance with an embodiment.

Referring to FIG. 6A, shown therein is a block diagram 600*a* of an example probe 610*a*. As shown in FIG. 6A, the probe 610*a* can include an optical sensor 620*a*. The optical sensor 620*a* is analogous to optical sensors of optical sensing systems 340*a-d*.

Figure 6B:
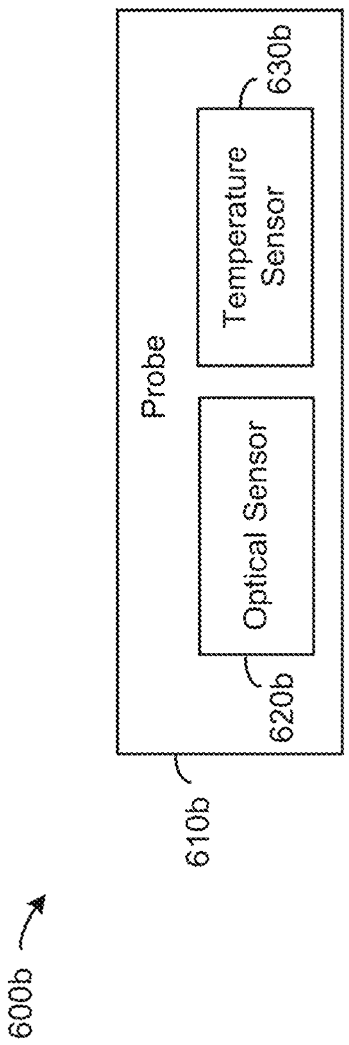
FIG. 6B is a block diagram of another example probe of the fluid monitoring system of FIG. 2 in accordance with an embodiment.

Referring to FIG. 6B, shown therein is a block diagram 600*b* of an example probe 610*b*. As shown in FIG. 6B, probe 610*b* can include an optical sensor 620*b* and a temperature sensor 630*b*. Optical sensor 620*b* is analogous to optical sensor 620*a*. Temperature sensor 630*b* is analogous to temperature sensor 360*c*.

Figure 6C:
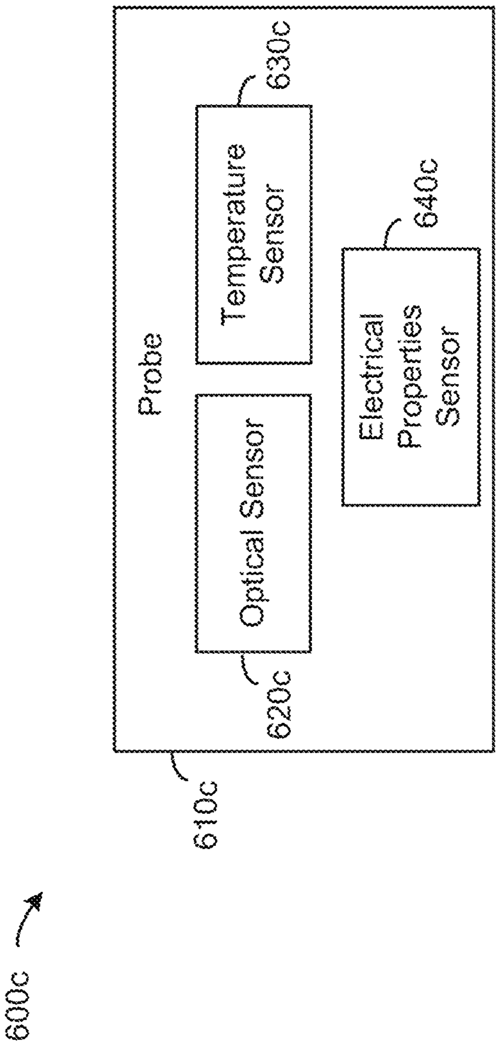
FIG. 6C is a block diagram of another example probe of the fluid monitoring system of FIG. 2 in accordance with an embodiment.

Referring to FIG. 6C, shown therein is a block diagram 600*c* of an example probe 610*c*. As shown in FIG. 6C, probe 610*c* can include an optical sensor 620*c*, a temperature sensor 630*c*, and an electrical properties sensor 640*c*. Optical sensor 620*c* is analogous to optical sensors 620*a-b*. Temperature sensor 630*c* is analogous to temperature sensor 630*b*. Electrical properties sensor 640*c* is analogous to electrical properties sensor 350*b*.

Figure 6D:
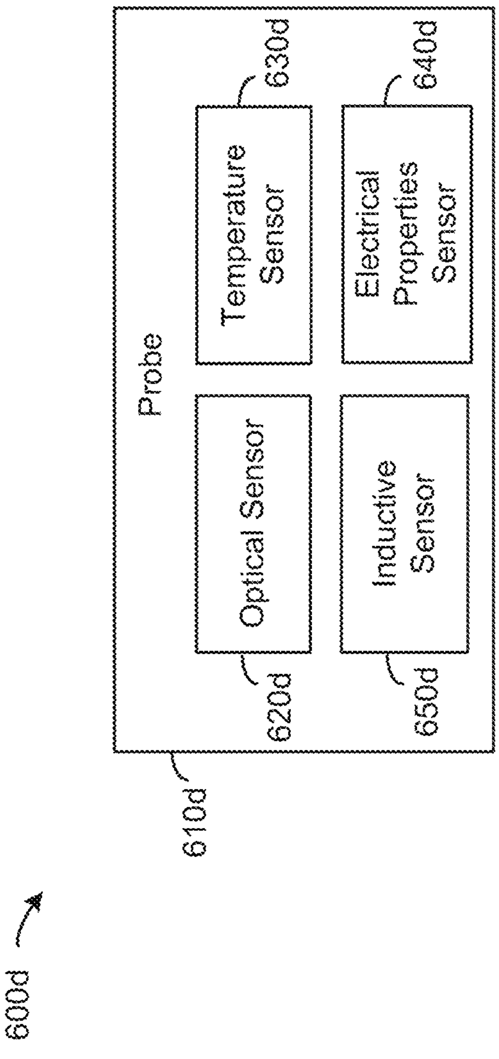
FIG. 6D is a block diagram of another example probe of the fluid monitoring system of FIG. 2 in accordance with an embodiment.

Referring to FIG. 6D, shown therein is a block diagram 600*d* of an example probe 610*d*. As shown in FIG. 6D, probe 610*d* can include an optical sensor 620*d*, a temperature sensor 630*d*, an electrical properties sensor 640*d*, and an inductive sensor 650*d*. Optical sensor 620*d* is analogous to optical sensors 620*a-c*. Temperature sensor 630*d* is analogous to temperature sensors 630*b-c*. Electrical properties sensor 640*d* is analogous to electrical properties sensor 640*c*. Inductive sensor 650*d* is analogous to inductive sensors 320*a*, and 320*c-d*.

Figure 6E:
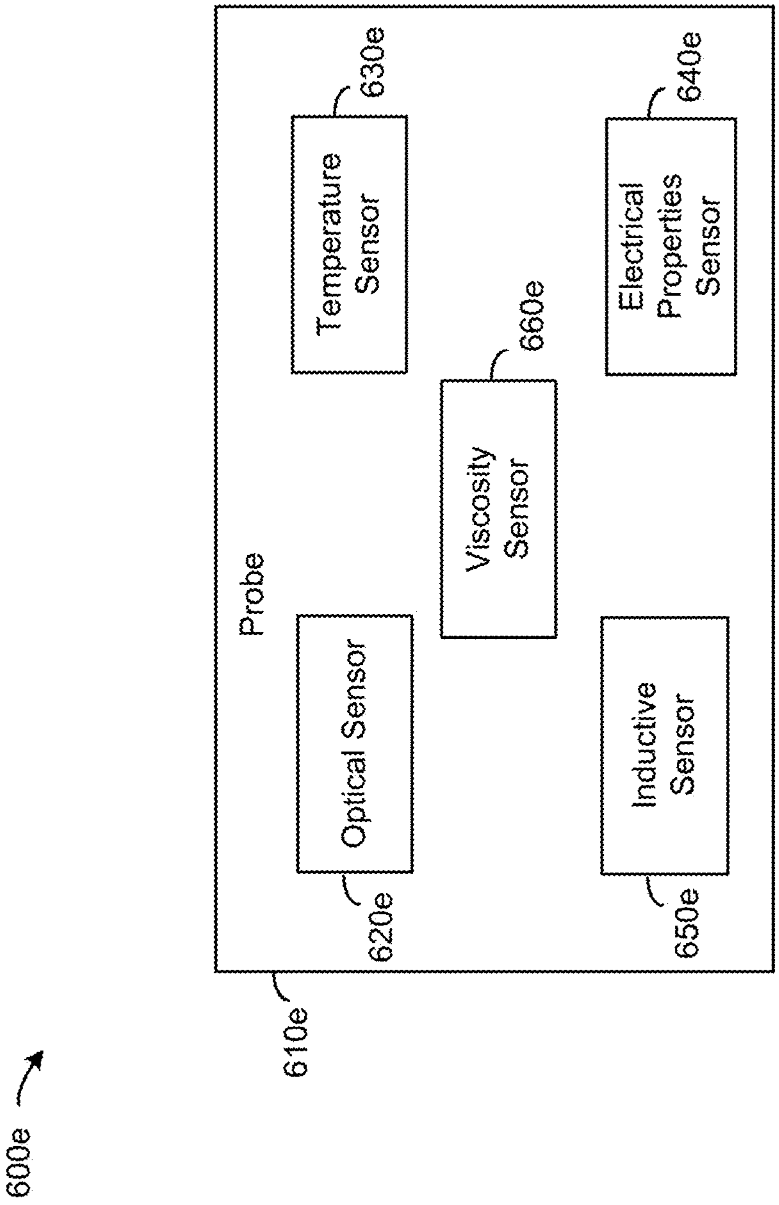
FIG. 6E is a block diagram of another example probe of the fluid monitoring system of FIG. 2 in accordance with an embodiment.

Reference is next made to FIG. 6E, shown therein a block diagram 600*e* of an example probe 610*e*. Probe 610*e* includes an optical sensor 620*e*, a temperature sensor 630*e*, an electrical properties sensor 640*e*, an inductive sensor 650*e*, and a viscosity sensor 660*e*. Optical sensor 620*e* is configured to measure optical properties of the fluid, such as fluorescence. Temperature sensor 630*e* monitors the fluid temperature. Electrical properties sensor 640*e* measures dielectric constant, conductivity, or other electrical characteristics. Inductive sensor 650*e* detects metallic or ferrous debris particles. Viscosity sensor 660*e* measures fluid viscosity in real-time, providing additional diagnostic information about fluid condition. In some embodiments, viscosity sensor 660*e* is a tuning fork viscosity sensor, such as, for example, a quartz tuning fork sensor. In some other embodiments, a density sensor may be included in addition to or alternative to the viscosity sensor to monitor fluid density.

The data from all sensors 620*e*-660*e* can be collected and transmitted to a processing unit for diagnostic and prognostic analysis. In some embodiments, sensor readings are analyzed independently or in combination to detect contaminants, degradation, or abnormal fluid conditions. Probe 610*e* may be integrated into a fluid monitoring system similar to probes 610*a-d*.

Figure 7A:
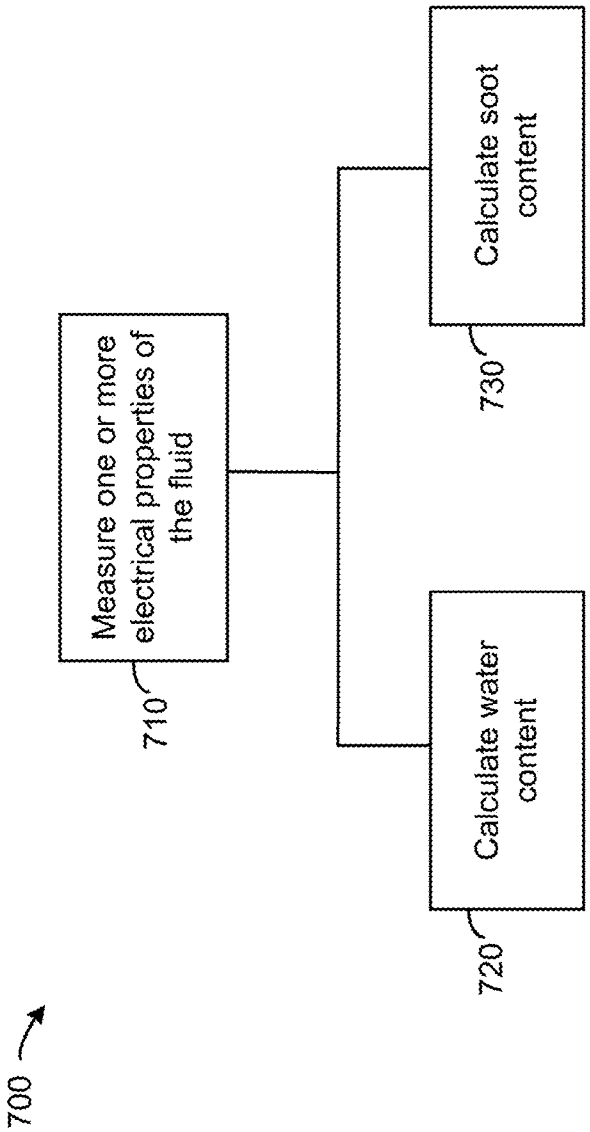
FIG. 7A is a flowchart of an example use of the probe of the fluid monitoring system of FIG. 2 in accordance with an embodiment.

Referring to FIG. 7A, shown therein is a flowchart 700 of an example use of a probe, such as probe 610*c* or 610*d*, that includes an electrical properties sensor. As shown in FIG. 7A, at 710, the electrical properties of the fluid are measured. For example, the electrical properties sensor of the probe can be used to measure the electrical properties of the fluid. In some embodiments, the electrical properties measurement obtained at 710 is calibrated using temperature data from a temperature sensor since electrical properties can be temperature dependent. For example, the temperature sensor can be located on the same probe as the electrical properties sensor, or on a different probe. In one embodiment, the electrical property of the fluid is the capacitance of the fluid.

At 720, the water content of the fluid is calculated based on the electrical properties measured at 710. Water has a dielectric constant that is significantly higher than the fluid, such as machinery fluid, that may be monitored by the fluid monitoring systems described herein. For example, the relative dielectric constant (Er) of water is approximately 80.1 whereas the relative dielectric constant of a lubricant, such as hexadecane, is approximately 2.04. Since water generally comprises a large portion of coolant formulations, the fluid monitoring systems described herein can identify coolant contamination of the fluid being monitored based on the determined water content of the fluid.

At 730, the soot content of the fluid is calculated based on the electrical properties measured at 710. The soot content of the fluid can be calculated based on electrical properties due to the high oxygen content of soot particles.

Figure 7B:
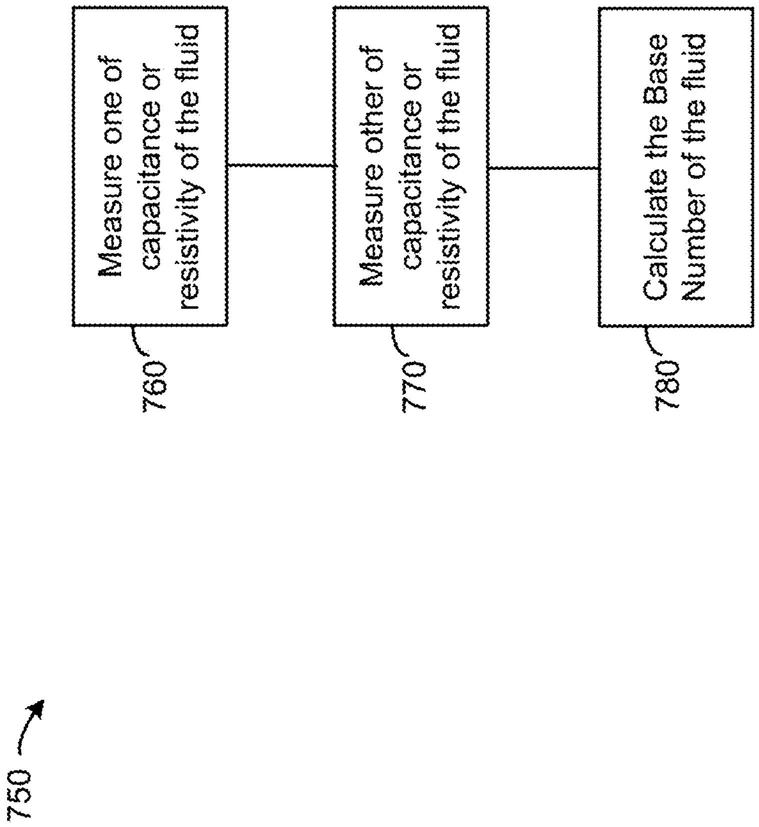
FIG. 7B is a flowchart of an example use of the probe of the fluid monitoring system of FIG. 2 in accordance with another embodiment.

Reference is next made to FIG. 7B, shown therein is a flowchart 750 of another example use of a probe, such as probe 610*c* or 610*d*, that includes an electrical properties sensor. As shown in FIG. 7B, at 760 and 770, electrical properties of the fluid are measured. For example, in one embodiment, at 760, one of the capacitance or resistivity of the fluid is determined. At 770, the other one of the capacitance or resistivity of the fluid is determined.

At 780, the Base number of the fluid is determined based on the capacitance and the resistivity of the fluid as determined at 760,770. Base number is related to the alkalinity of the oil and is typically defined as mg KOH/g oil. Changes in Base number may result in changes to electrical properties, such as capacitance, resistivity/conductivity, or a combination thereof. Generally, Base number decreases monotonically through the reaction with acids produced as a byproduct of oxidation or through the introduction of acids entering the system during the combustion process. Generally, acids products via oxidation are typically weak organic acids (e.g. carboxylic acids), whereas acids introduced via combustion are typically strong inorganic acids (e.g. sulfuric acid). The alkaline components in the oil (e.g. $CaCO_3$) neutralize these acids in turn creating reaction products that may include carbon dioxide ($CO_2$), water ($H_2O$) and/or salts.

In various embodiments, a change in Base number may be correlated with a change in the resistivity or the capacitance of the fluid. For example, the resistivity of the fluid can be related to the quantity |TBN−TAN|, where TBN is the Total Base Number and TAN is the Total Acid Number, as discussed in detail in ENGINE OIL CONDITION MONITORING WITH FPS2800 OIL PROPERTY SENSOR white paper, published by TE connectivity (FPS2800 White paper found at https://www.te.com/content/dam/te-com/documents/sensors/global/fps2800-white-paper.pdf), the entire contents of which are incorporated herein by reference.

In various embodiments, both the capacitance and the resistivity are used to determine the Base Number through the tan delta factor. The tan delta factor is an angle θ generally defined as: $\theta=\tan^{-1}$ (conductivity/capacitance). In some examples, the tan delta factor may be referred to as dissipation factor or loss angle. The tan delta factor may be related to the decrease in the Base number based on the teachings of Oil Quality Sensor and Associated Accessories user guide, published by Tandelta (Master-User-Guide-Gen-2-V2.7 Apr. 2024.pdf), the entire contents of which are incorporated herein by reference.

In some embodiments, the electrical properties measurement obtained at 760,770 are calibrated using temperature data from a temperature sensor since electrical properties can be temperature dependent. For example, the temperature sensor can be located on the same probe as the electrical properties sensor, or on a different probe.

Figure 8:
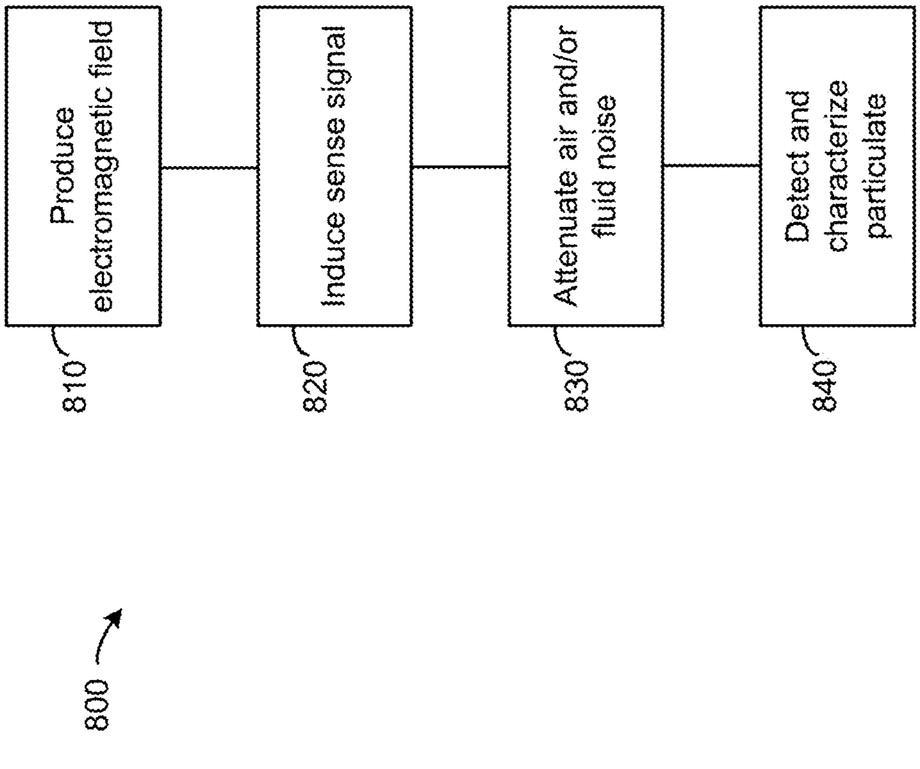
FIG. 8 is a flowchart of another example use of the probe of the fluid monitoring system of FIG. 2 in accordance with an embodiment.

Referring to FIG. 8, shown therein is a flowchart 800 of an example use of a probe, such as probe 610*d*, that includes an inductive sensor. As shown in FIG. 8, at 810, an electromagnetic field is produced by the inductive sensor. At 820, a sense signal is induced by the inductive sensor. At 830, the data obtained at 820 is processed to attenuate noise from air and/or the fluid. In some embodiments, step 830 is omitted. At 840, particulates are detected and characterized based on the data from step 820 and/or step 830.

Figure 9A:
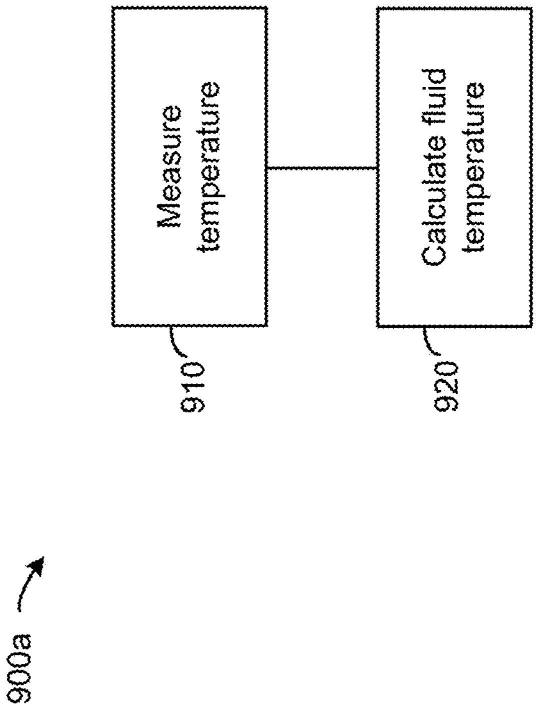
FIG. 9A is a flowchart of another example use of the probe of the fluid monitoring system of FIG. 2 in accordance with an embodiment.

Referring to FIG. 9A, shown therein is a flowchart 900*a* of an example use of a probe, such as probes 610*b-d*, that includes a temperature sensor. As shown in FIG. 9A, at 910, a temperature measurement is obtained. The temperature measurement can be obtained using any suitable temperature sensor. For example, the temperature sensor can include a resistance temperature detector. At 920, the temperature of the fluid is calculated based on the temperature measurement from 910.

As discussed herein, electrical properties measurements obtained by a electrical properties sensor described herein can be calibrated using temperature data since electrical properties measurement can be temperature dependent. Referring to FIG. 9B, shown therein is an example plot 900*b* of dielectric constant as a function of temperature for an example machinery lubricant oil. The dielectric constant is shown on the y-axis 930. The temperature is shown on the x-axis 940. The data 950 shows a decreasing proportional relationship between the dielectric constant 930 and temperature 940.

The relative dielectric constant of a particular fluid, Er, can be calculated based on the ratio of the capacitance of the fluid measured by an electrical properties sensor (C) to the measured capacitance of vacuum ($C_0$), as shown in equation (1). Experimentally, a measurement in air can be used if a measurement in vacuum is not possible.

$$\varepsilon_r = \frac{\varepsilon}{\varepsilon_0} = \frac{C}{C_0} \tag{1}$$

A fitted linear response of the sensor relative dielectric constant as a function of temperature, T (° C.), can be performed for the electrical properties sensor. For example, data 950 can be represented by equation (2).

$$\varepsilon_r = -0.00145(T) + 2.36 \tag{2}$$

Accordingly, the dielectric constant should be adjusted based on the measured temperature. In some embodiments, the adjustment is minor.

Figure 9C:
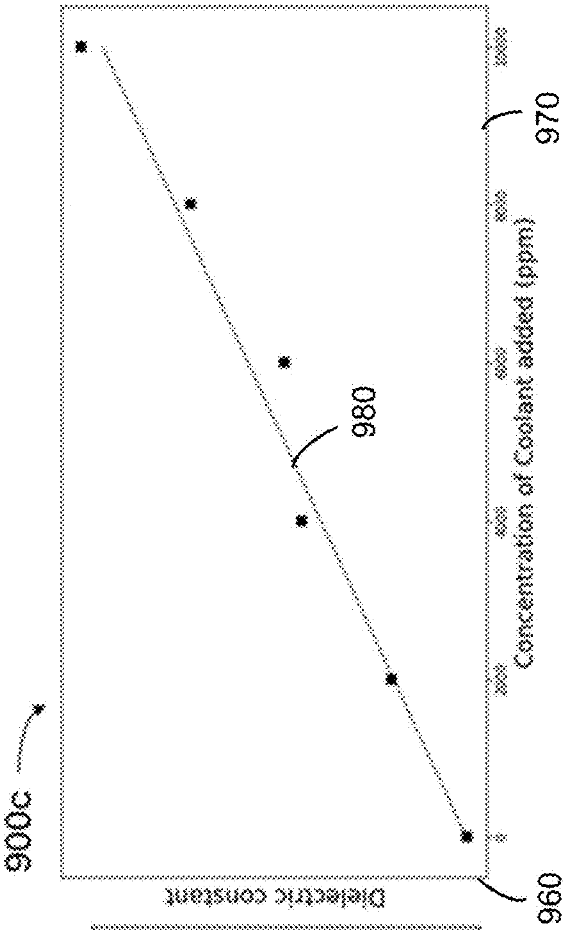
FIG. 9C is an example plot of measured dielectric constant as a function of coolant concentration in accordance with an embodiment.
Figure 9B:
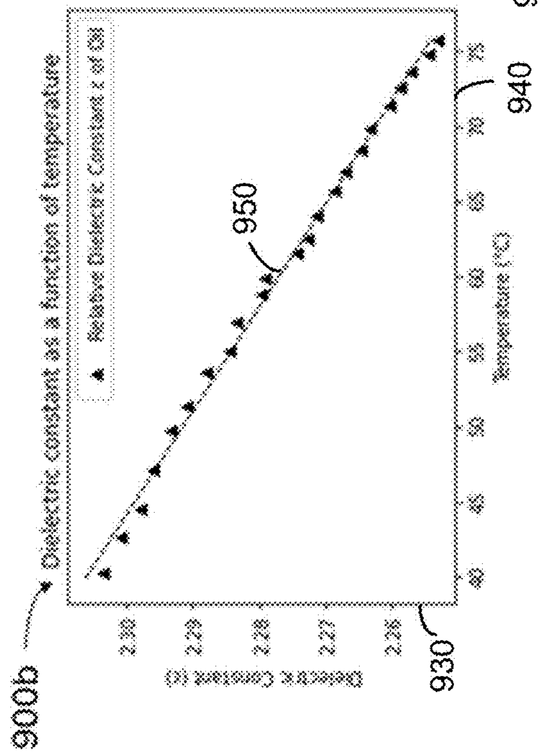
FIG. 9B is an example plot of measured dielectric constant as a function of temperature in accordance with an embodiment.

Referring to FIG. 9C, shown therein is an example plot 900*c* of dielectric constant as a function of coolant concentration in an example machinery lubricant oil. The coolant is predominantly a mixture of water and ethylene glycol in roughly 1:1 ratio. The dielectric constant is shown on the y-axis 960. The coolant concentration (ppm) is shown on the x-axis 970. The data 980 shows a proportional relationship between the dielectric constant 960 and coolant concentration 970.

As shown, coolant contamination (or water contamination), at a fixed temperature, will lead to increases in the dielectric constant.

As discussed herein, optical sensor measurements obtained by an optical sensing system described herein can be calibrated using temperature data. Further detail is provided with reference to FIGS. 24-26.

Figure 10A:
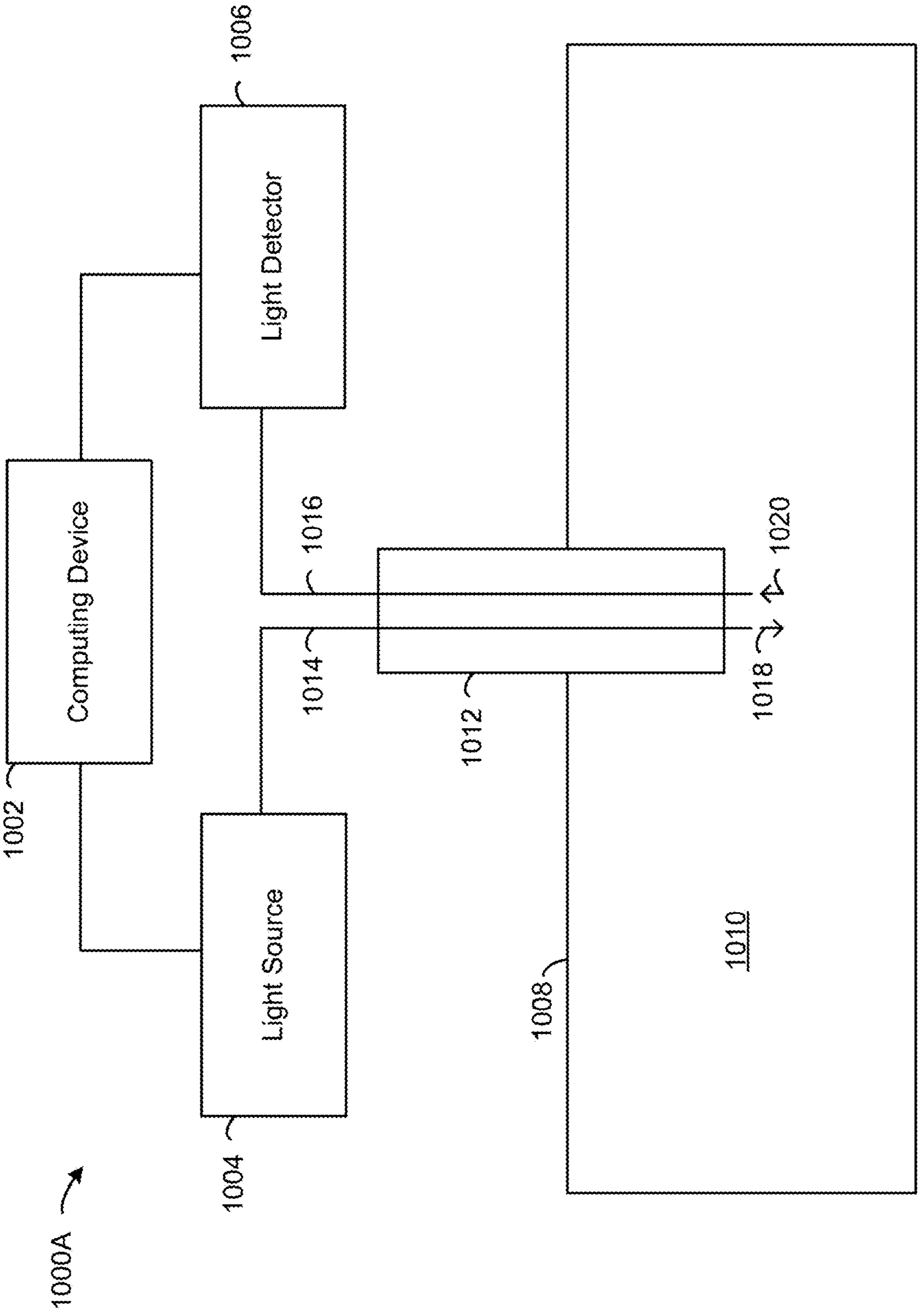
FIG. 10A is an illustration of an example optical sensing system in accordance with an embodiment.

Reference is next made to FIG. 10A, which illustrates a fluid monitoring system according to an example embodiment. The illustrated fluid monitoring system includes an optical sensing system 1000A interfacing with fluid 1010 within machine 1008. Optical sensing system1000 comprises a computing device 1002, one or more light sources 1004, one or more light detectors 1006, sensing or probe element 1012, and cables 1014 and 1016. In various embodiments, the optical sensing system 1000 is configured to conduct online detection and measurements of the fluid 1010. In other embodiments, the optical sensing system 1000A is configured to conduct off-line detection and measurements.

In some embodiments, the cables 1014, 1016 comprise of one or more fiber optic strand that couples the window of an optical sensing system with the one or more light sources and one or more light detectors. In some embodiments, the at least one fiber optic strand has a corresponding diameter approximately between 1 micron and 1000 microns. In various embodiments, the cables, such as for example, the at least one fiber optic strand, is configured to relay the excitation light from the light source to the window, and the emitted light from the window to the detector.

Computing device 1002 may include a system control unit (SCU) containing electronics that perform data storage, data analysis, data/signal acquisition, communications, and/or other system control functions. The SCU interfaces with light sources 1004 and the detectors 1006. In one or more embodiments the SCU is adjacent to the light sources 1004 and the detector 1006 is separated from probe element 1012.

In one or more embodiments, the SCU includes a data acquisition device containing data acquisition and processing software connected to a housing including the one or more light sources 1004 (e.g., LEDs), one or more detectors 1006 (e.g., a spectrometer), and electronics to control the operation of the light sources 1004. The detector 1006 can be powered and controlled via a connection to the computing device 1002, such as a USB cable from the device.

Machine 1008 may be any asset that includes a fluid system. For example, machine 1008 can be any asset that requires the use of lubricant oil for its operation, such as an engine or a gearbox.

One or more light sources 1004 is required for an optical measurement to take place. The light source 1004 can be LEDs (light emitting diodes), which can be semiconductor-based emission sources. The LEDs may be UV (Ultraviolet) wavelength LEDs. Visible wavelength LEDs may also be used in addition to the UV wavelength LEDs. In other embodiments, light sources are non-LED based. Light sources can comprise gas phase or solid-state lasers, high and low pressure hollow-cathode lamps, arc lamps with and without monochromators.

Figure 10B:
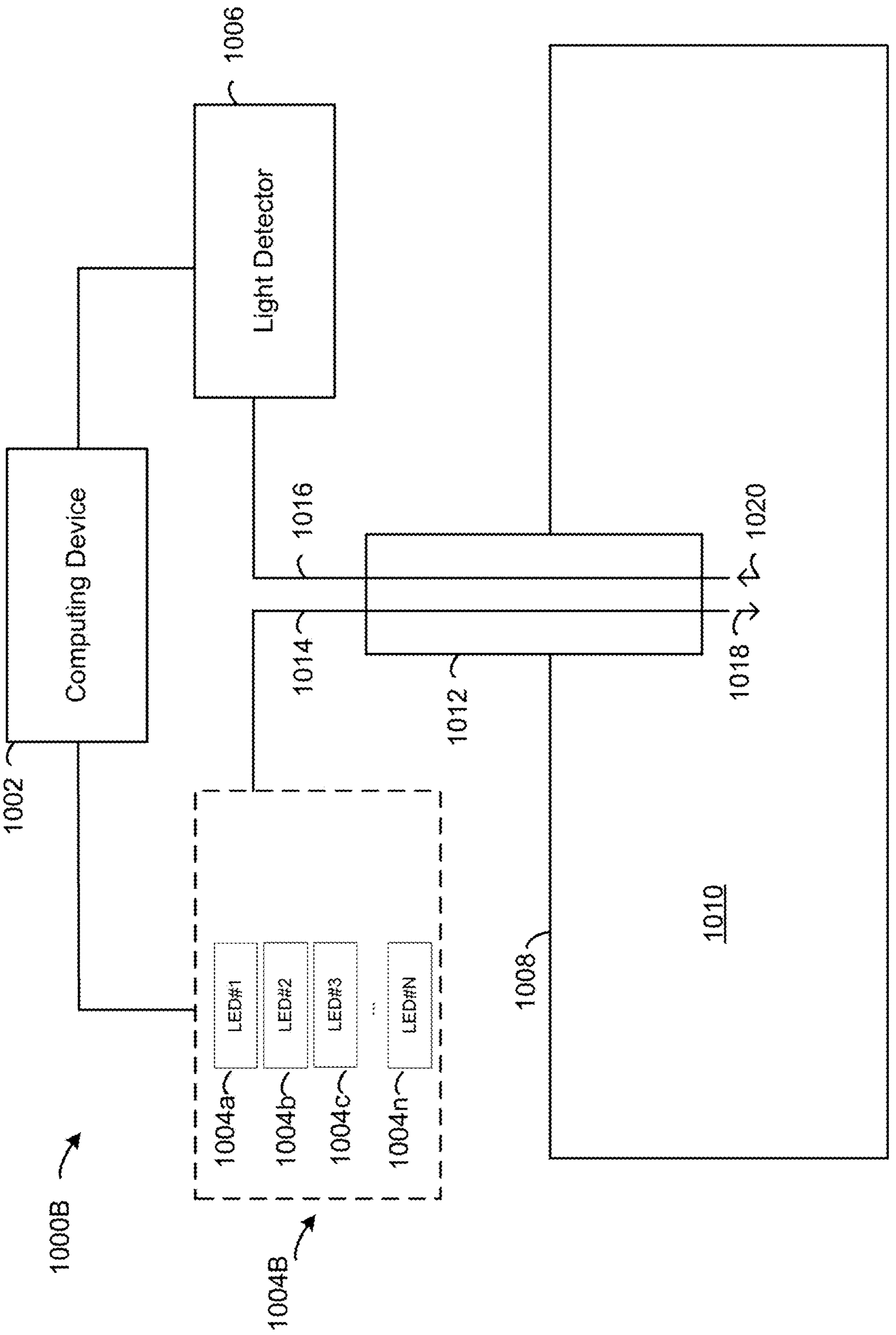
FIG. 10B is an illustration of an example optical sensing system in accordance with another embodiment.

Reference is briefly made to FIG. 10B, which is analogous to FIG. 10A, with the exception of the light source system 1004B. As shown in FIG. 10B, the light source system 1004B includes a plurality of LEDs connected in parallel to excite specific fluorescence properties of the fluid. For example, a first LED 1004*a*, a second LED 1004*b*, a third LED 1004*c* and a 'n' LED 1004*n* are included in the light source system 1004B in parallel. In some other embodiments, the light source system 1004B includes two LEDs in parallel. In some further embodiments, the light source system 1004B includes three LEDs in parallel.

Figure 10C:
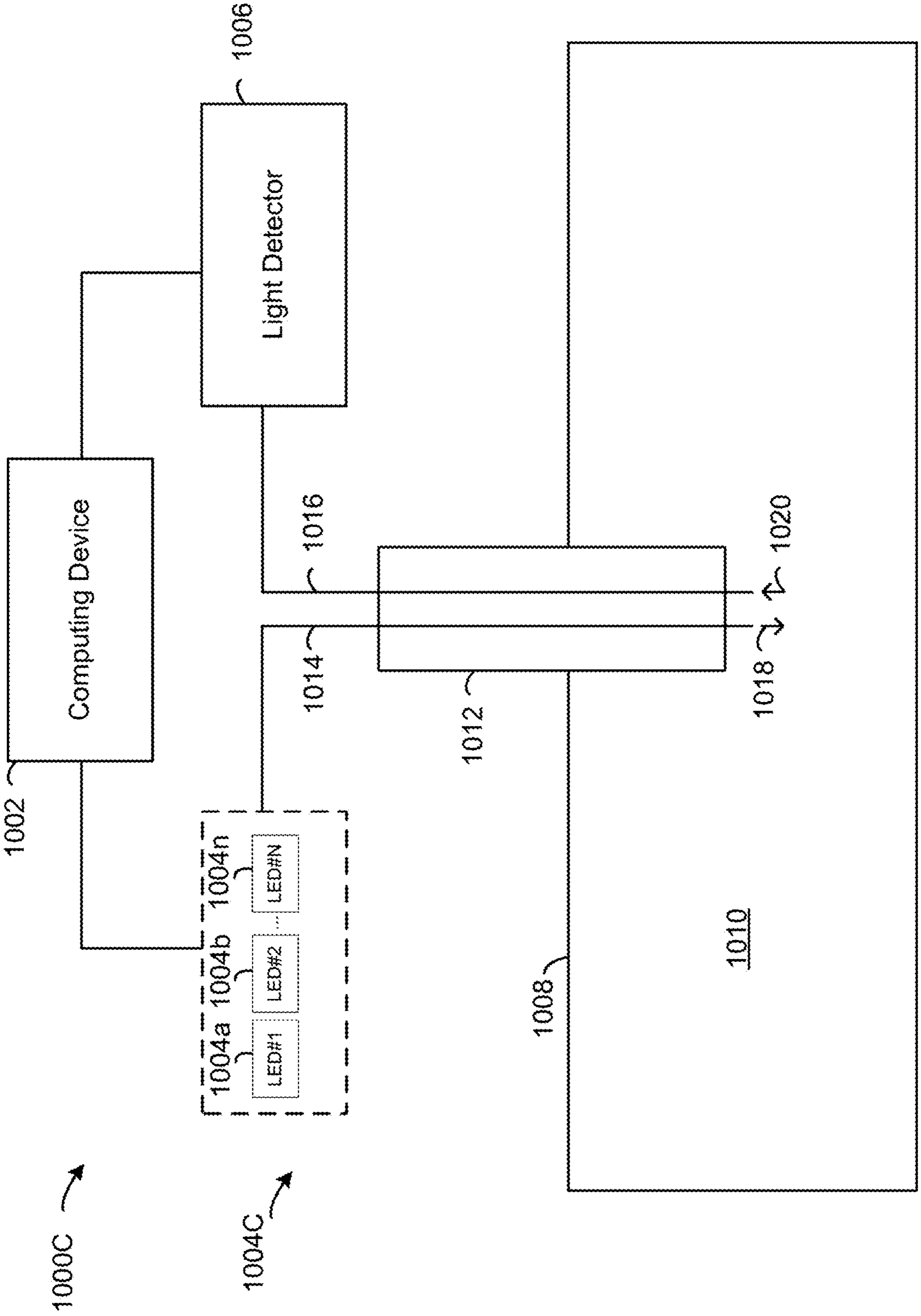
FIG. 10C is an illustration of an example optical sensing system in accordance with a further embodiment.

Reference is next made to FIG. 10C, which is analogous to FIG. 10A, with the exception of the light source system 1004C. As shown in FIG. 10C, the light source system 1004C includes a plurality of LEDs connected in series or sequence to excite specific fluorescence properties of the fluid. For example, a first LED 1004*a*, a second LED 1004*b* and a 'n' LED 1004*n* are included in the light source system 1004C in series. In some other embodiments, the light source system 1004C includes two LEDs in series. In some further embodiments, the light source system 1004B includes three LEDs in series.

One or more detector system 1006 transduces light into electrical signals. The detector system 1006 can be a spectrometer or a spectrophotometer, which provide spectral resolution such that incoming light intensity is spread across spectrometer channels. Spectrometers can comprise one or more CCD (Charge Coupled Device) or CMOS (Complementary metal-oxide-semiconductor) silicon devices. Spectrometers can also comprise Czerny-Turner based monochromator systems in conjunction with a photomultiplier tube (PMT), photodiode detector or CCD or CMOS silicon detector. In other embodiments, the use of one or more absorptive or Fabry-Perrot filters can also be employed in conjunction with a PMT, photodiode detector or CCD or CMOS silicon detector.

In one or more embodiments, detector 1006 is a CMOS spectrometer that contains between 1-65536 channels and has relative spectral sensitivity of at least 5% between approximately 200 nm to approximately 1000 nm. In one or more embodiments, detector 1006 is a CCD spectrometer that contains between 1-65536 channels and has relative spectral sensitivity of at least 5% between approximately 200 nm to approximately 1000 nm. Fiber optic cables 1014 and 1016 are glass fibers that transmits photons from one end to another through the principle of total internal reflection. The fibers typically comprise one or more of a core, cladding, and coating.

In some embodiments, the fiber optic cores have a diameter of approximately 10-2000 μm, or more preferably, approximately 100-800 μm. The coating may be polyimide or another coating that confers low and high temperature rating. Fiber optic cables can be terminated with industry standard connectors, such as SMA (subminiature assembly).

In some embodiments, fiber optic cables 1014 and 1016 comprise high OH fiber, which refers to optical fiber with a high hydroxyl ion (OH) concentration. The use of high OH fiber can be advantageous for UV transmission.

In some embodiments, fiber optic cables 1014 and 1016 comprise solarization resistant fibers, which are fibers that have been exposed to deep ultraviolet radiation. These fibers are treated to withstand the effects of high energy UV photons and maintain high transmittance over UV wavelength regions.

In some embodiments, the probe element 1012 is in physical contact, or near physical contact with the fluid. The diameter of the probe element may be between approximately 1-1000 mm. In various embodiments, the probe element comprises an optically transparent window that permits the transmission of the excitation light into the fluid. The optically transparent window can be made of sapphire or another optically clear material such as quartz or borosilicate glass.

Optically transparent windows have wavelength specific transmissions that that are sufficiently high. Light transmission through a window can be measured as a wavelength specific transmission coefficient between 0-100%, where 0 corresponds to no light transmission and 100% to all light being transmitted compared with a reference measurement where no window is present. In some embodiments, the window has a simple average transmission in the ultraviolet and visible wavelength spectral regions, from 250 nm to 850 nm greater than 10%, preferably greater than 50%.

The optically transparent window separates the volume inside the probe element, where the probe tips are located, and the fluid.

In some embodiments, the light emitted by the sample passes through the same optical window as the one through which the excitation light was delivered. In other words, a reflectance geometry for the probe element is employed.

As described herein, in some embodiments, the angle of the optically transparent window with respect to the longitudinal axis of the probe is approximately 45°. Alternatively, the optically transparent window has an angle other than 45°, or more generally is between approximately 0° to approximately 90°.

The optical sensing system 1000 may be based on optical methods such as optical absorbance (near infrared or infrared), Raman spectroscopy, hyperspectral imaging, surface plasmon resonance, or other non-linear optical techniques.

Figure 23A:
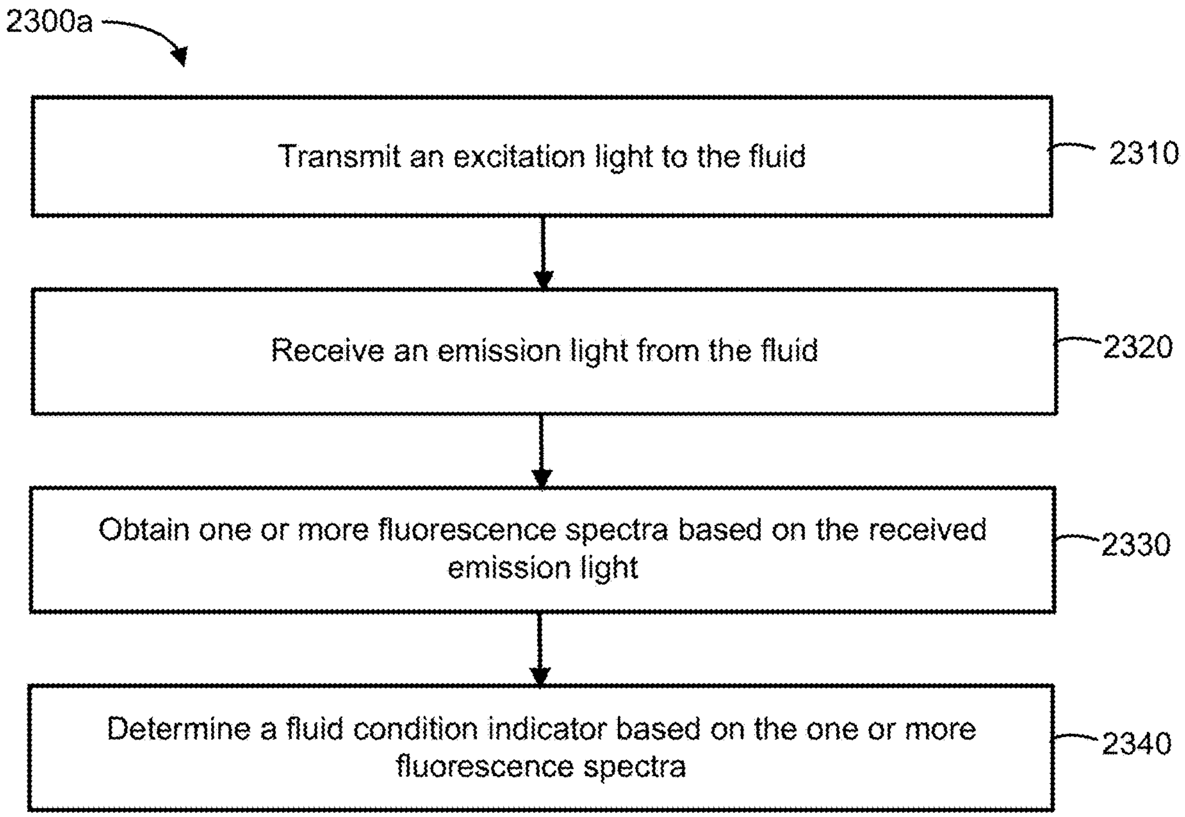
FIG. 23A is a flowchart of an example method for monitoring one or more properties of a fluid in accordance with an embodiment.
Figure 23B:
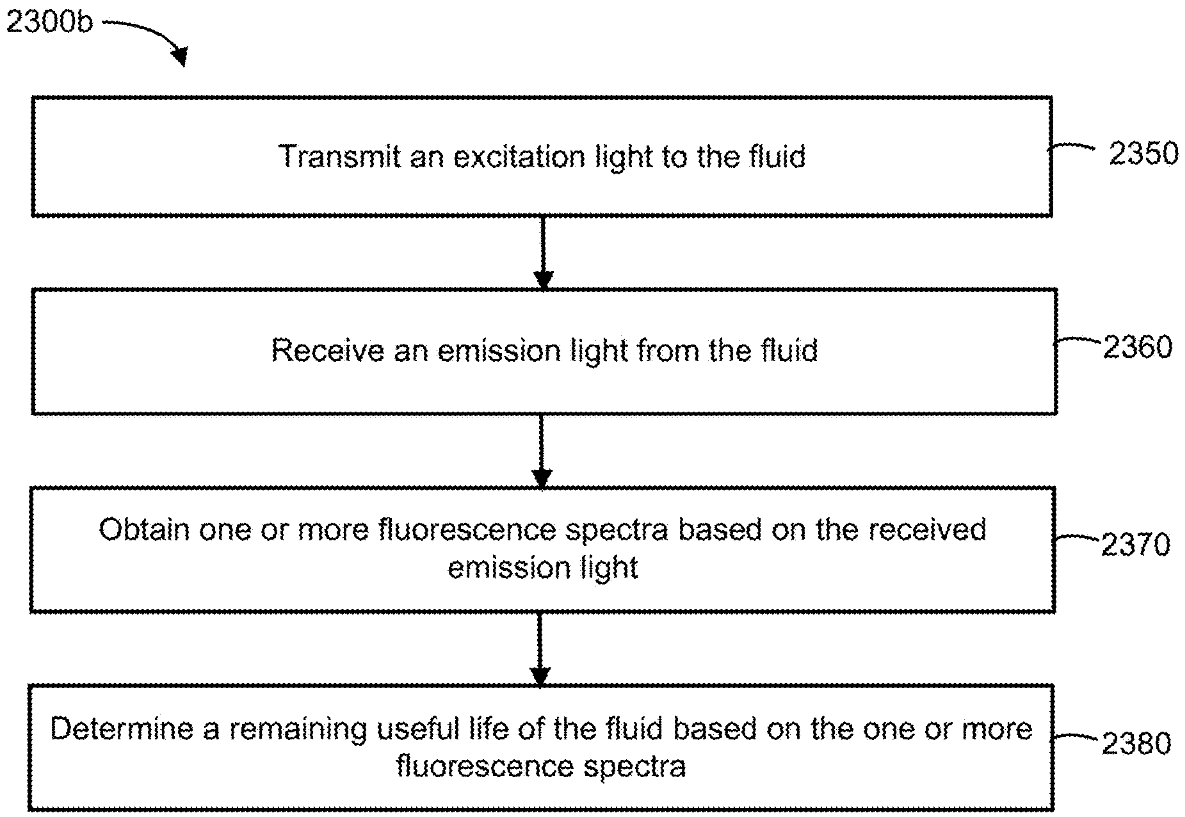
FIG. 23B is a flowchart of another example method for monitoring one or more properties of a fluid in accordance with an embodiment.

Reference is briefly made to FIGS. 23A and 23B to illustrate the functionality of apparatus 1000 of FIG. 10. FIG. 23A illustrates a flowchart 2300*a* for an example method for monitoring one or more properties of a fluid using a probe as described herein. At 2310, an excitation light is transmitted to the fluid. At 2320, an emission light is received from the fluid. At 2330, a processor is operated to obtain one or more fluorescence spectra based on the received emission light. At 2340, the processor is operated to determine a fluid condition indicator based on the one or more fluorescence spectra.

Referring to FIG. 23B, shown therein is a flowchart 2300*b* for an example method for monitoring one or more properties of a fluid using a probe as described herein. At 2350, an excitation light is transmitted to the fluid. At 2360, an emission light is received from the fluid. At 2370, a processor is operated to obtain one or more fluorescence spectra based on the received emission light. At 2380, the processor is operated to determine a remaining useful life of the fluid based on the one or more fluorescence spectra.

In one embodiment, the optical sensing apparatus 1000 is a fluorescent sensor which can detect contaminants and additives using the fluorescence phenomenon. Fluorescence measurements are based on the principle of absorbance of photons and re-emission of photons of lower energy, or higher wavelength. First, current is sent at the correct voltage to the LEDs 1004 so they generate UV photons. The LED light is delivered to the fluid sample in the probe element 1012 through fiber optic cables 1014 whose ends are enclosed within the probe body. The amount of energy delivered by the UV LEDs can be controlled using pulse width modulation. The fluid sample in contact with the probe element 1012 absorbs the LED light and remits photons of lower energy. The lower energy photons pass through the returning fiber optic cable 1016 and are received by the detector 1006, where the light signal is transduced to an electrical signal.

An advantage of using fluorescence spectroscopy in oil condition and concentration monitoring is that in general only certain additives fluoresce while the base oil does not. Therefore, the technique can be considered "background-free" to some extent, and a high signal to noise ratio can be achieved. Further, the fluorescence measurement is not impacted by vibrational frequencies. This is because the optical measurement frequencies are approximately 750-430 THz (400 nm-700 nm), and so they do not couple significantly to any vibrations between 1-3000 Hz, such that it would interfere with the overall measurement.

Using fluorescence to measure fuel contamination or antioxidant depletion can be advantageous because molecular species have unique fluorescence spectra. In various embodiments, the information obtained from taking a fluorescence measurement includes the line shape, line width and peak central wavelength. It is generally possible to distinguish between mixtures of fluorescence species using these features and data analysis algorithms. Common machinery fluids (e.g. fuel and lubricants) are comprised of mixtures of fluorescent molecules. Furthermore, using fluorescence to measure fuel antioxidant stability or antioxidant depletion can be advantageous to prevent coking of the fuel and subsequent damage to other components of the engine. Such antioxidant additives exhibit strong fluorescence responses, allowing early detection of antioxidant degradation and enabling proactive maintenance before harmful deposits or coking occur.

In some embodiments, the one or more light sources 1004 and the one or more detectors 1006 are carefully selected based on knowledge of target contaminants and additives in the fluid 1010. Depending on the particular chemical species in the fluids associated with a particular industry or application, the component configurations may vary. This is done to ensure that the correct excitation LEDs are present within the configuration to excite the target species fluorescence response, and an appropriate spectrometer with sufficient spectral range and resolution is present to detect the fluorescence response.

Excitation using narrow light sources can be advantageous in isolating the fluorescence responses of molecules in the fluid 1010, and simplifying elements of the data analysis. If multiple light sources are used at the same time, then it may induce spectral distortions or other self-absorption effects.

In various embodiments, light sources are typically operated separately and sequentially, rather than simultaneously because it is preferable that the fluorescence response of each compound in the lubricant mixture be excited independently. This allows for subsequent determination of the additives and fuel contaminants. The specific light source that is employed largely depends on the specific molecular target, and possible absorptive interferences from other molecules in the fluid 1010. In one or more embodiments, light sources 1004 are selected carefully using chemical knowledge of the system.

Figure 11:
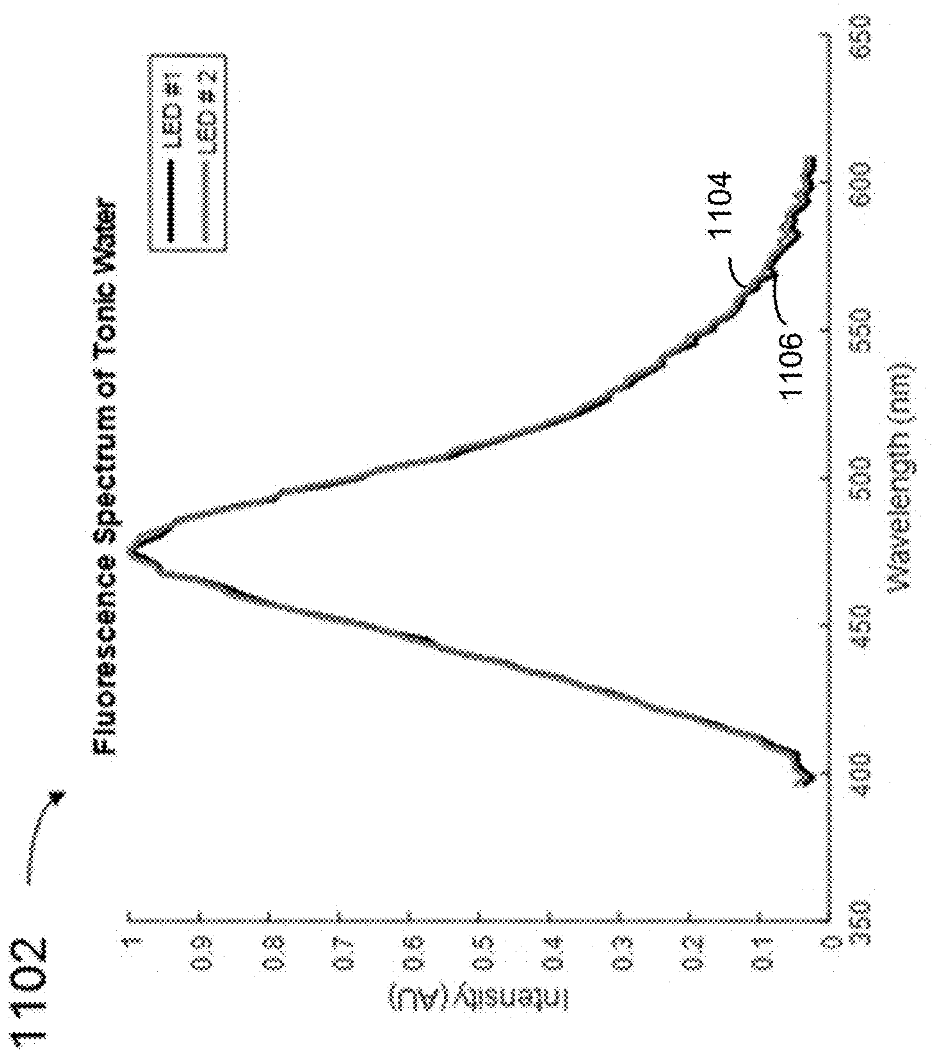
FIG. 11 shows example fluorescence spectra in accordance with an embodiment.

For exemplary purposes only, referring to FIG. 11, graph 1102 shows an example of fluorescence spectra 1104 and

1106 of a sample of store-bought tonic water obtained using two different LED light sources. The target additive in tonic water that provides the fluorescence response is the molecule quinine, or a salt thereof.

In one embodiment, the fluorescence spectrum of quinine is measured with a fluorescence optical sensing apparatus 1000, where the light source 1004 is an LED with a central wavelength of 365 nm or 405 nm, or another suitable wavelength. The detector 1006 is a CMOS spectrometer with a spectral range that covers the fluorescence spectral range of quinine in tonic water from 400-600 nm, and a spectral resolution from 400 nm-600 nm of 10 nm. The measured fluorescence spectrum of quinine is substantially the same using either a 365 nm or 405 nm light source in this embodiment because there are no spectral interferences present within the tonic water mixture at either of these excitation wavelengths.

In one or more embodiments, the fluid is a lubricating oil and the target molecule to which fluorescence optical sensing apparatus 1000 is configured to is antioxidant(s) N-Phenylnaphthalen-1-amine (CAS #90-30-2), or a derivative thereof, the antioxidant diphenylamine, or a derivative thereof (CAS #122-39-4), or the antioxidant 2,6-Di-tert-butyl-p-cresol, otherwise known as Butylated hydroxytoluene (CAS #: 128-37-0) or a derivative thereof, or other antioxidant with known chemical structure. In other embodiments, the exact chemical structure of the target molecule is unknown, and the optical sensing apparatus 1000 is configured empirically based on experimental investigations.

In one or more embodiments, the fluid can contain one or more target molecules.

In one or more embodiments, the fluid can be a fuel-oil mixture, whereby the fuel is a contaminant in the lubricating oil. The target molecule is a molecular species present in the fuel. In one or more embodiments, the exact chemical structure of the target molecule present in the fuel is unknown, and the optical sensing apparatus 1000 is configured with light sources 1004 empirically based on experimental investigations.

Figure 12:
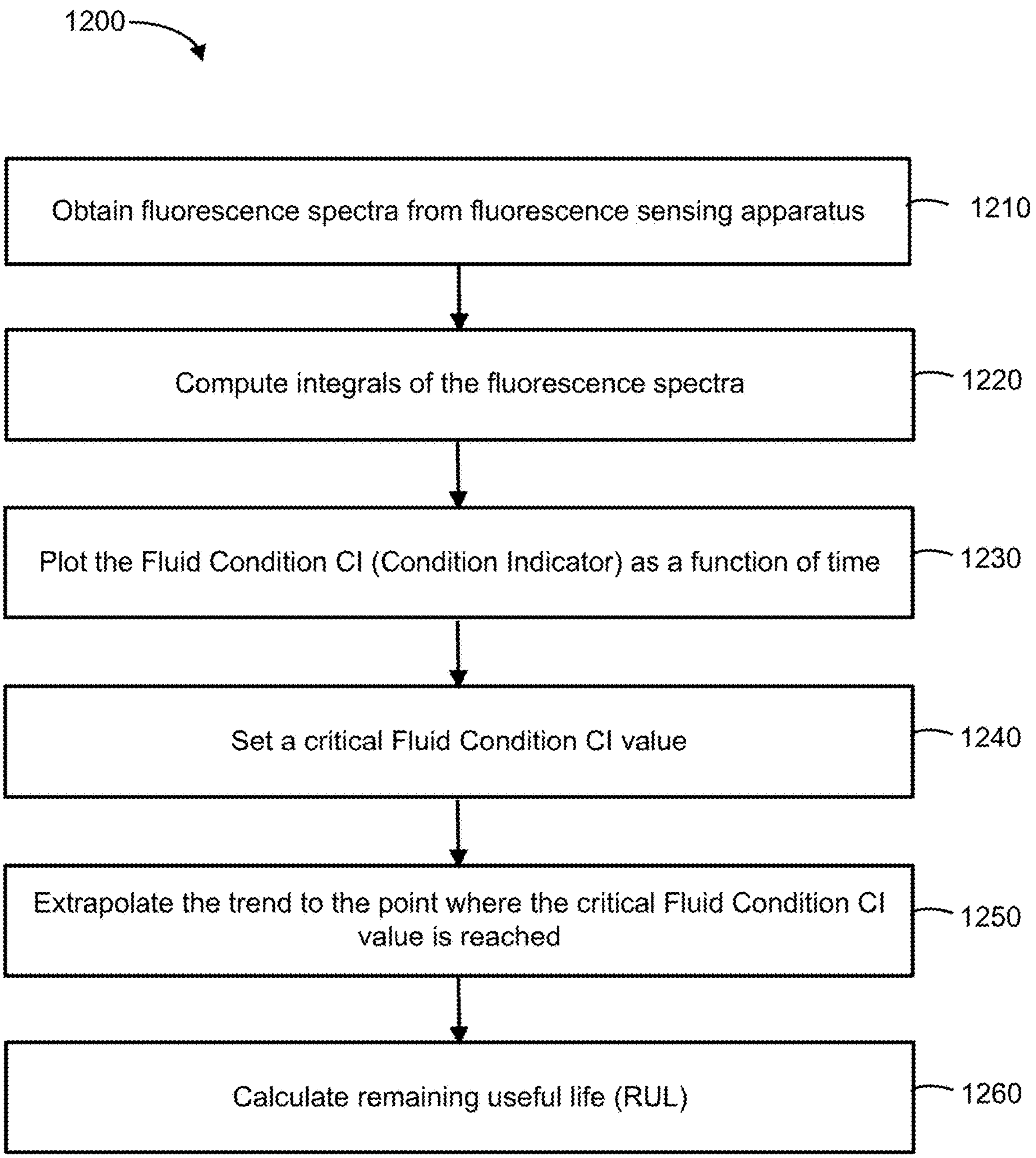
FIG. 12 is a flowchart of an example method for developing a prognostic model in accordance with an embodiment.

FIG. 12 shows a flowchart 1200 for developing a prognostic model in order to determine the remaining useful life (RUL) of lubricant oil using fluorescence measurements in accordance with one or more embodiments described herein. In the absence of any lubricant contamination, the remaining useful lifetime is limited by thermal oxidation, and by extension the remaining concentration of antioxidant in the lubricant system. In this case, the fluorescence measurement can be used as a standalone technique for the determination of the oil RUL.

Antioxidants are additives designed to prolong the life of a lubricant by increasing the oxidative resistance of the base oil. During their use in lubrication systems, antioxidants will deplete to a certain critical level, at which point the lubricant will start to degrade at an accelerated rate. Therefore, monitoring the concentration of antioxidants can be effective method to determine the remaining useful life (RUL) of the lubricant.

The basic idea behind the fluorescence measurement is that the antioxidant (typically a fluorescent compound) concentration is proportional to the measured fluorescent intensity. There is typically one antioxidant per formulation, but some formulations have multiple antioxidants. The antioxidants can either be primary (that reacts with ·OH and RO· radicals) or secondary (react with hydroperoxides). In either case, the method requires that the targeted antioxidant fluoresce under UV or visible wavelengths excitation. One or more of the antioxidant and its reaction byproducts may be monitored.

At 1210 of method 1200, fluorescence spectra from the fluorescence sensing apparatus are obtained. The fluorescence sensing apparatus may be apparatus 1000 of FIG. 10. An example can be seen in FIG. 13, where spectral traces 1308, 1309, 1310, and 1311 corresponding to different lubricant aging times are shown in graph 1302. Traces 1308 to 1311 are labelled chronologically (i.e., 1308 is an earlier time and 1311 is a later time).

The x-axis 1304 over which the integral is performed does not need to be in units of wavelength (e.g., nm). It can also be in units of energy, for example wavenumbers (cm-1) or electron volts (eV). Converting the x-axis from wavelength, which is the typical default for a measurement obtained on a spectrophotometer, to an energy axis does not substantially alter the method. The y-axis 1306 represents the fluorescence intensity, which is an indication of how much light is emitted by the sample. The fluorescence intensity depends on the concentration of one or more fluorescent compounds within the sample.

At 1220 of method 1200, one or more integrals of a fluorescence spectrum is computed. The process can be repeated for multiple fluorescence spectra that are obtained by one or more excitation sources (e.g. UV LED). The concentration of a particular antioxidant species or antioxidant oxidation product is proportional (a) to the integral of its fluorescence spectrum:

$$\text{Antioxidant } conc\,\alpha \int_{\lambda_1}^{\lambda_2} I(\lambda)d\lambda \tag{3}$$

Therefore, to monitor the concentration of an antioxidant compound or an antioxidant oxidation product, an integral of its respective fluorescence spectrum can be computed over the course of the lubricant degradation. In the example shown in graph 1302 in FIG. 13, the integral is bounded by the limits of integration over a certain wavelength range.

A computing device, such as device 1002 of FIG. 10, may be used to compute the integral. This can be done in different ways. In some embodiments, the method used to compute the integral is an unweighted sum of the intensities within the integration wavelength limits. This can be done using a modern programming language or application, such as Python®, MATLAB®, Excel®.

Integration is carried out in the same manner for each recorded spectral trace.

At 1230 of method 1200, the Fluid Condition Indicator (CI) values are plotted as a function of time. An example can be seen in graph 1312 of FIG. 13. The Fluid CI 1314 in FIG. 13 refers to the normalized integrals calculated in 1220. The normalized integral for each of the spectral traces 1308 to 1311 is plotted as a data point 1316 in graph 1312 for each point in time to form trendline 1318. The x-axis 1320 represents the time since the last oil change.

At 1240 of method 1200, a critical Fluid CI value 1322 is set. For example, the RUL can be determined when the intensity of a given antioxidant spectral intensity reaches a certain critical percentage of its initial intensity. For example, in graph 1312 of FIG. 13, a relative value of 25% is assumed for the critical Fluid Condition CI value 1322.

Figure 13:
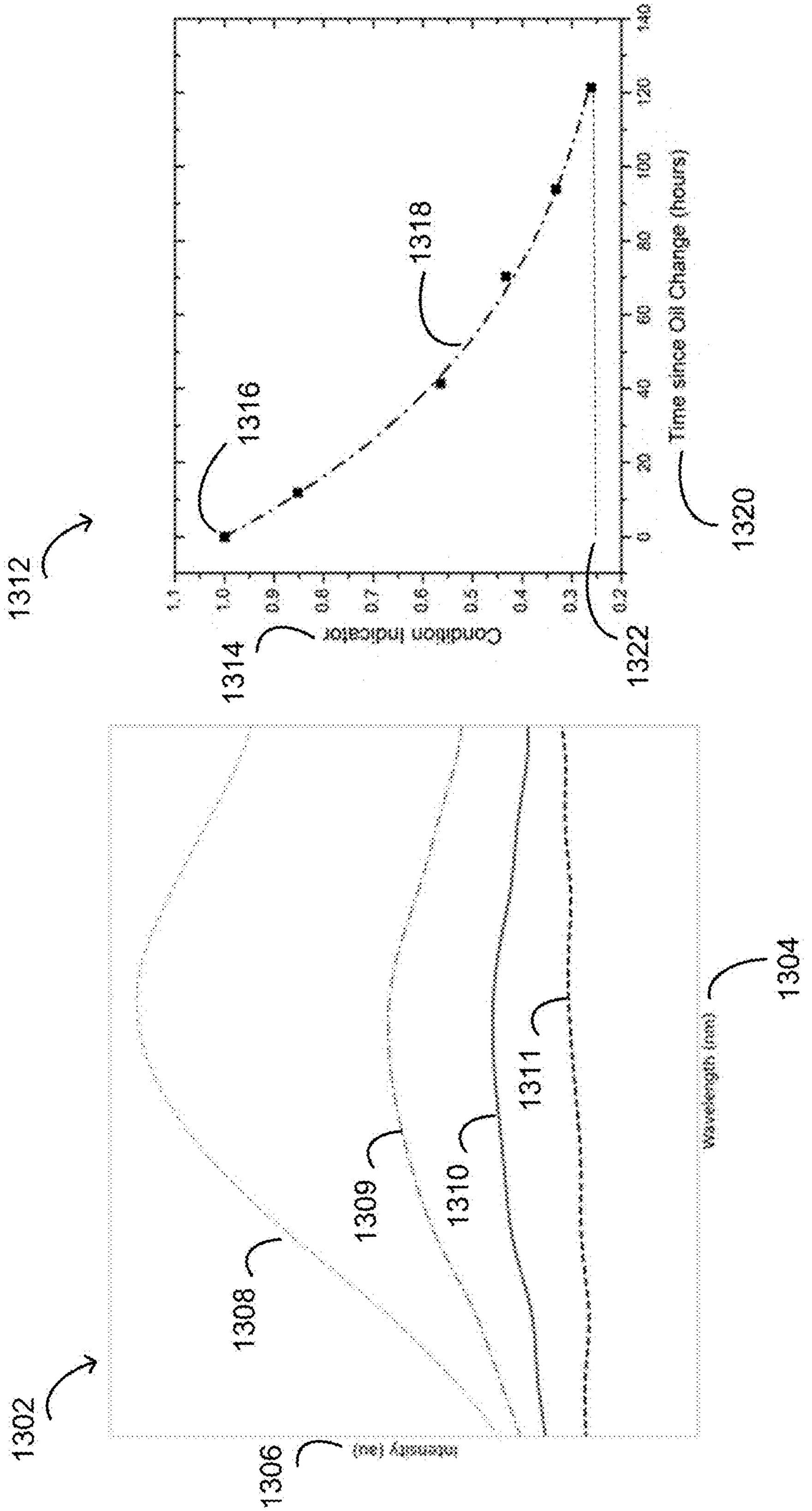
FIG. 13 is a series of example plots of intensity as a function of wavelength and condition indicator as a function of time in accordance with an embodiment.

At 1250 of method 1200, the trend in graph 1312 of FIG. 13 is extrapolated to the point where the critical Fluid CI value 1322 is reached. This is done in the absence of data that covers the entire desired range. Ideally, the training data used to fit the prognostic function covers the entire domain where the RUL is computed.

At 1250, the method 1200 may involve fitting an equation that can predict the loss of the primary antioxidant. For example, an exponential function may be used to extrapolate the degradation rate described by Equation 4:

$$\text{Antioxidant remaining} = Ae^{-\frac{t}{B}} + C \quad (4)$$

The fluorescence data plotted in graph 1312 of FIG. 13 can be used to obtain the parameters A, B, C in the fitted equation (4):

$$y = 0.847\exp\left(\frac{-t}{60.225}\right) + 0.153 \quad (5)$$

At 1260 of method 1200, the RUL is calculated. RUL can then be defined as:

$$RUL = \Delta t = t_2 - t_1 \quad (6)$$

where t1 is the current time. Conventionally, t0=0 is the time corresponding to immediately after a fresh oil change, and all time after that is the time since the fresh oil change.

To solve for t2, the prognostic function based on the fitted data can be rearranged. Using the exponential decay model, t2 can be solved for by rearranging the terms in equation (4):

$$t_2 = -\ln\left(\frac{y_2 - C}{A}\right)B \quad (7)$$

Substituting using the parameters from equation (5), t2 can be computed:

$$t_2 = -\ln\left(\frac{0.25 - 0.153}{0.847}\right)60.225 = 130.5 \quad (8)$$

Then using equation (6), and assuming, for example, that the current time t1 is 40 hours (i.e., 40 hours since the last fresh oil change), the RUL can be determined:

$$RUL = \Delta t = 130.5 - 40 = 90.5 \text{ hours} \quad (9)$$

In some embodiments, other numerical models can be used empirically as a prognostic model, such as an $n^{th}$ degree polynomial function. The monoexponential decay is just one possible simple prognostic model, albeit one that is well supported by chemical kinetics theory.

In some embodiments, a remaining useful lifetime can be set based on the projected amount of time for which is takes for the antioxidants to reach 25% or 50% of their initial concentration.

In some embodiments, the Fluid CI values at 1220 of method 1200 are computed through a ratio of two or more fluorescence integrals computed from one or more fluorescence spectra and then normalized.

In some embodiments, antioxidant depletion can be monitored using other well established chemometric or machine learning algorithms. For example, such algorithms can include a combination of one or more of: support vector machines and its variants, ridge regression and its variants, lasso regression and its variants, partial least squares and its variants, parallel factor analysis and its variants, multivariate curve resolution-asymmetric least squares and its variants, decision trees and its variants, singular value decomposition and its variants, principle component analysis and its variants, simple-to-use Interactive Self-modeling Mixture Analysis and its variants, orthogonal projection approach—asymmetric least Squares and other chemometric or machine learning algorithms.

The RUL can also be determined by other lubricant parameters than the fluorescence intensity decreasing to a particular amount if those lubricant parameters correlate with antioxidant depletion. The acceptable limits that govern the computation of RUL depends on the particulars of the machinery application and customer. FIG. 24 shows reference tables outlining recommended ranges for oxidation and lubricant contaminations that would limit the useful life of the lubricant.

Figure 14:
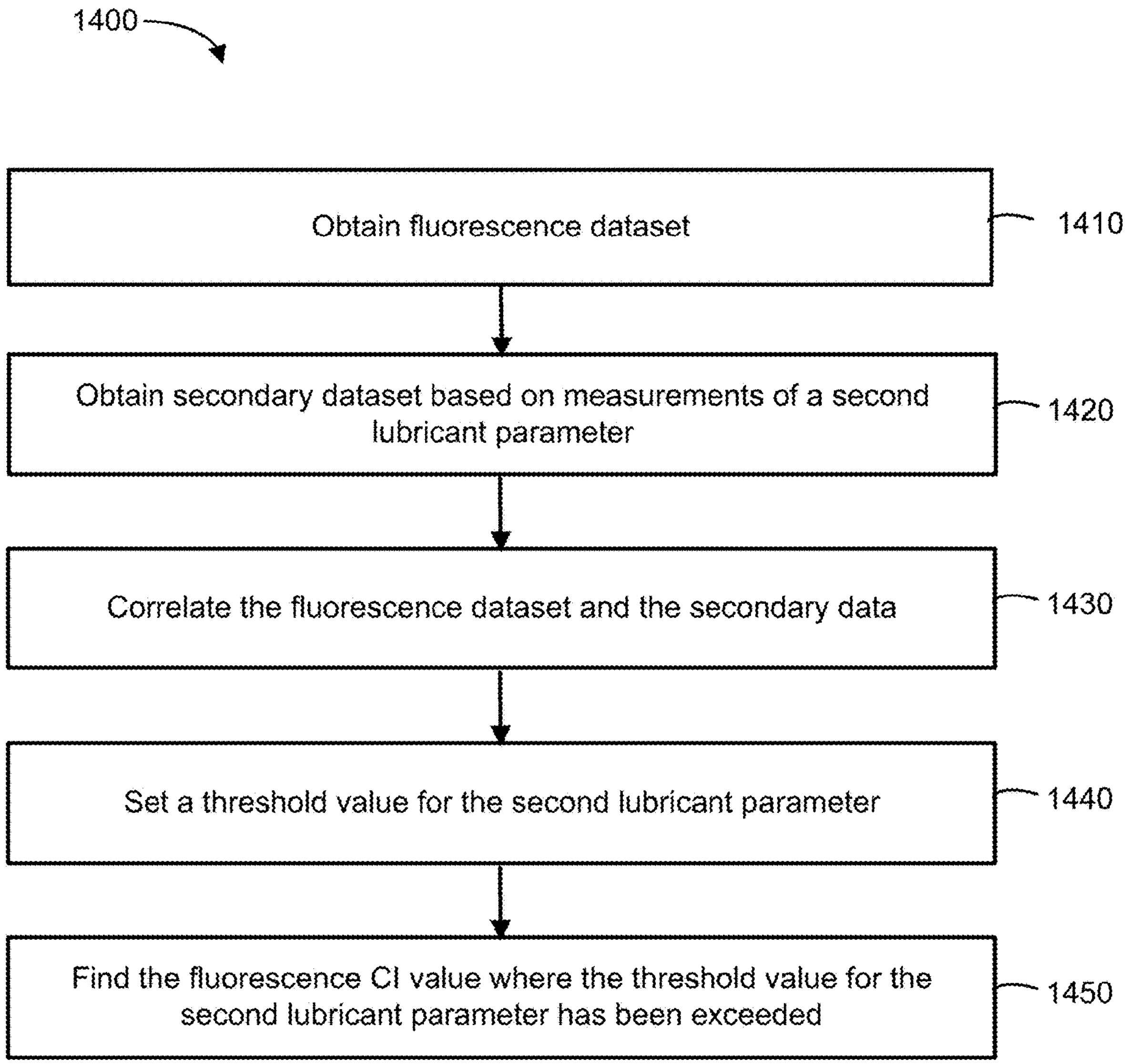
FIG. 14 is a flowchart of an example method for determining the remaining useful life of a fluid in accordance with an embodiment.

FIG. 14 shows a flowchart 1400 for determining the RUL of lubricant oil based on other lubricant parameters such as the change in Acid Number (AN), Number (BN), oxidation number (ON), and/or viscosity, in accordance with one or more embodiments.

At 1410 of method 1400, the fluorescence dataset is obtained from the fluorescence sensing apparatus. The fluorescence sensing apparatus may be apparatus 1000 of FIG. 10.

At 1420 of method 1400, a secondary dataset based on measurements of a second lubricant parameter is obtained. The second lubricant parameter can be the Acid Number (AN), Base Number (BN), oxidation number (ON), viscosity, or another parameter that correlates with the oxidation of the base oil. A secondary dataset may be obtained using offline techniques. For example, in the case of oxidation number, this metric can be measured using established methods such as ASTM 7414, where the oxidation number is obtained using an FTIR instrument.

Figure 15B:
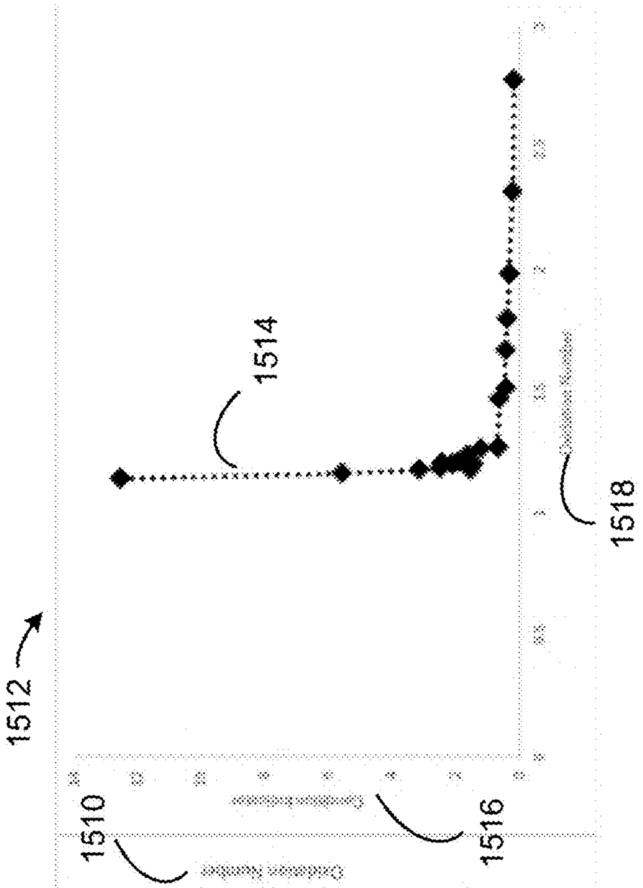
FIG. 15B is an example plot of condition indicator as a function of oxidation number in accordance with an embodiment.
Figure 15A:
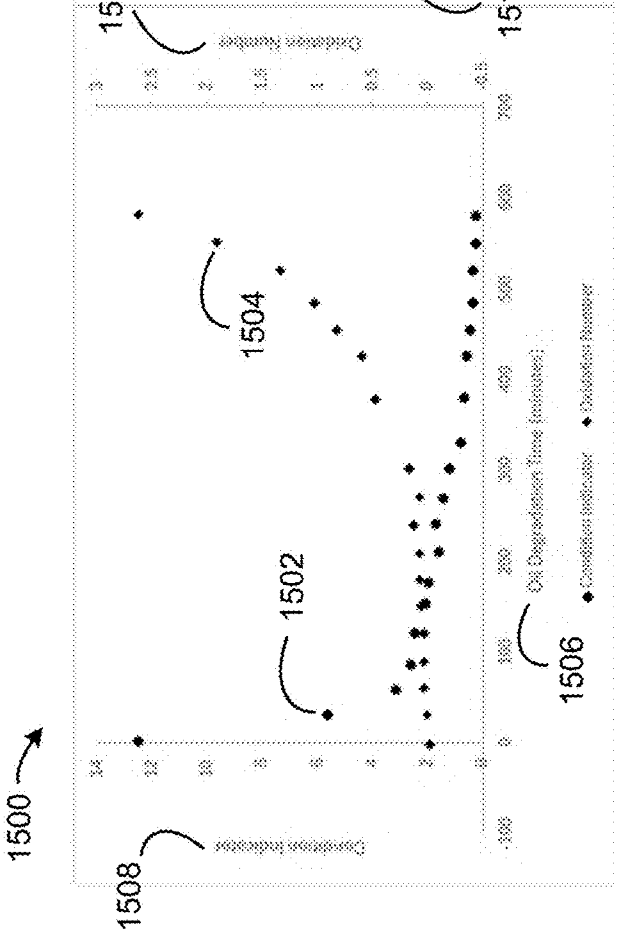
FIG. 15A is a series of example plots of condition indicator and oxidation number as a function of time in accordance with an embodiment.

At 1430 of method 1400, the fluorescence dataset and the secondary dataset are correlated. The oil condition indicator (CI) may be obtained from the fluorescence data using methods described in method 1200. Graph 1500 of FIG. 15A shows that the oxidation number data plot 1502 is inversely related to condition indicator data plot 1504 in this example when plotted against time 1506. The left y-axis 1508 represents the Fluid Condition CI and the right y-axis 1510 represents the oxidation number. These two independently collected datasets may be used to generate a fitted relationship, or lookup table, between the two measured quantities. Graph 1512 of FIG. 15B shows the relationship 1514 between the Fluid Condition CI 1516 and the oxidation number 1518 through fitting an empirical function to a plot of these two measurements.

Figure 16A:
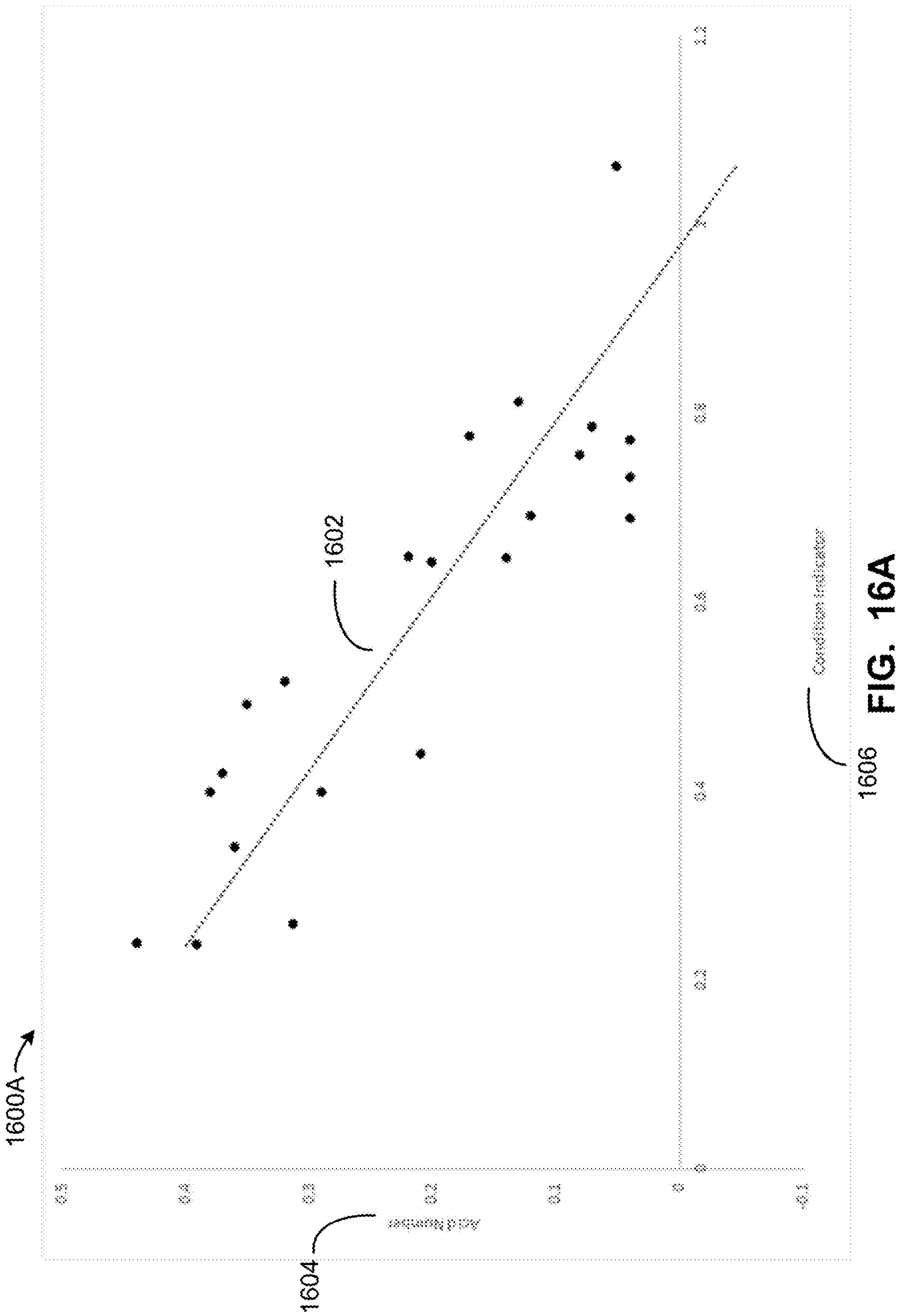
FIG. 16A is an example plot of acid number as a function of condition indicator in accordance with an embodiment.

Referring to FIG. 16A, an example plot 1600A shows the relationship 1602 between the Fluid Condition CI 1606 (x-axis) and the Acid Number 1604 (y-axis) through fitting an empirical function to a plot of these two measurements, in accordance with an example embodiment.

Figure 16B:
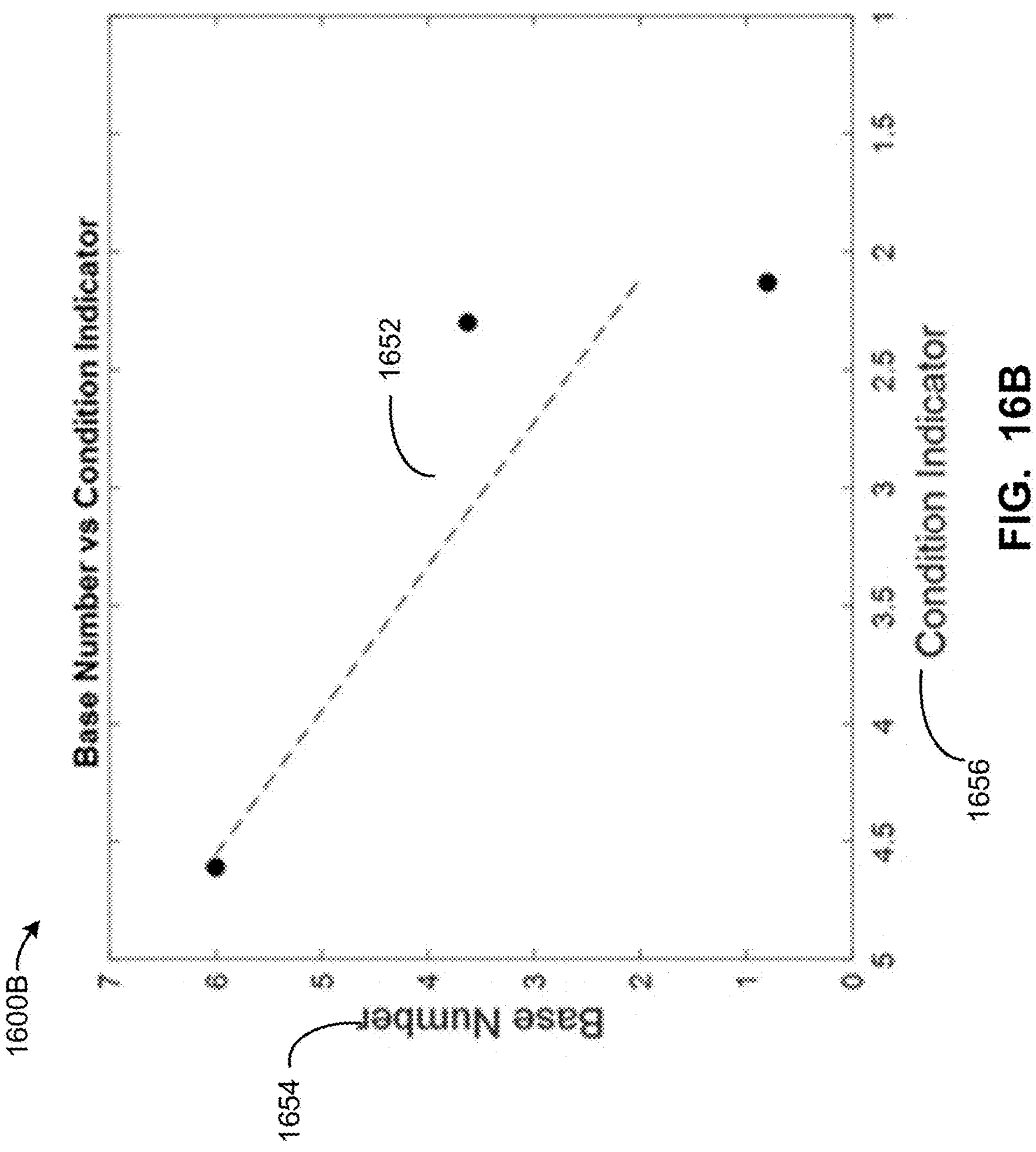
FIG. 16B is an example plot of base number as a function of condition indicator in accordance with an embodiment.

Referring to FIG. 16B, an example plot 1600B shows the relationship 1652 between the Fluid Condition CI 1656 (x-axis) and the Base Number 1654 (y-axis) through fitting an empirical function to a plot of these two measurements, in accordance with an example embodiment. In the illustrated embodiment, the measurements are obtained by heating SuperBear 3006 oil (with a Base number 6), heated to 45 hours at 170° C.

At 1440 of method 1400, a threshold value for the second lubricant parameter is set. This may be determined with reference to table 2400 shown in FIG. 24.

At 1450, the method 1400 includes finding a fluorescence condition indicator value where the threshold value for the second lubricant parameter has been exceeded. This can be done through the empirical relationship, or the lookup table obtained in 1430. In the case of oxidation number, the RUL can be determined from the CI value 1508 where the oxidation number 1510 has exceeded the threshold set in 1440. In the case of acid number, the RUL can be determined from the CI value 1606 where the Acid Number 1604 has exceeded the threshold set in 1440.

In one embodiment, the fluorescence sensing apparatus 1000 is employed to monitor fuel contamination. The fluorescence sensing apparatus 1000 can selectively target molecular components of fuel rather than its impact on the electrical properties or the viscosity of the lubricant fluid, allowing for higher sensitivity to fuel contamination compared to purely electrical methods.

Figure 17:
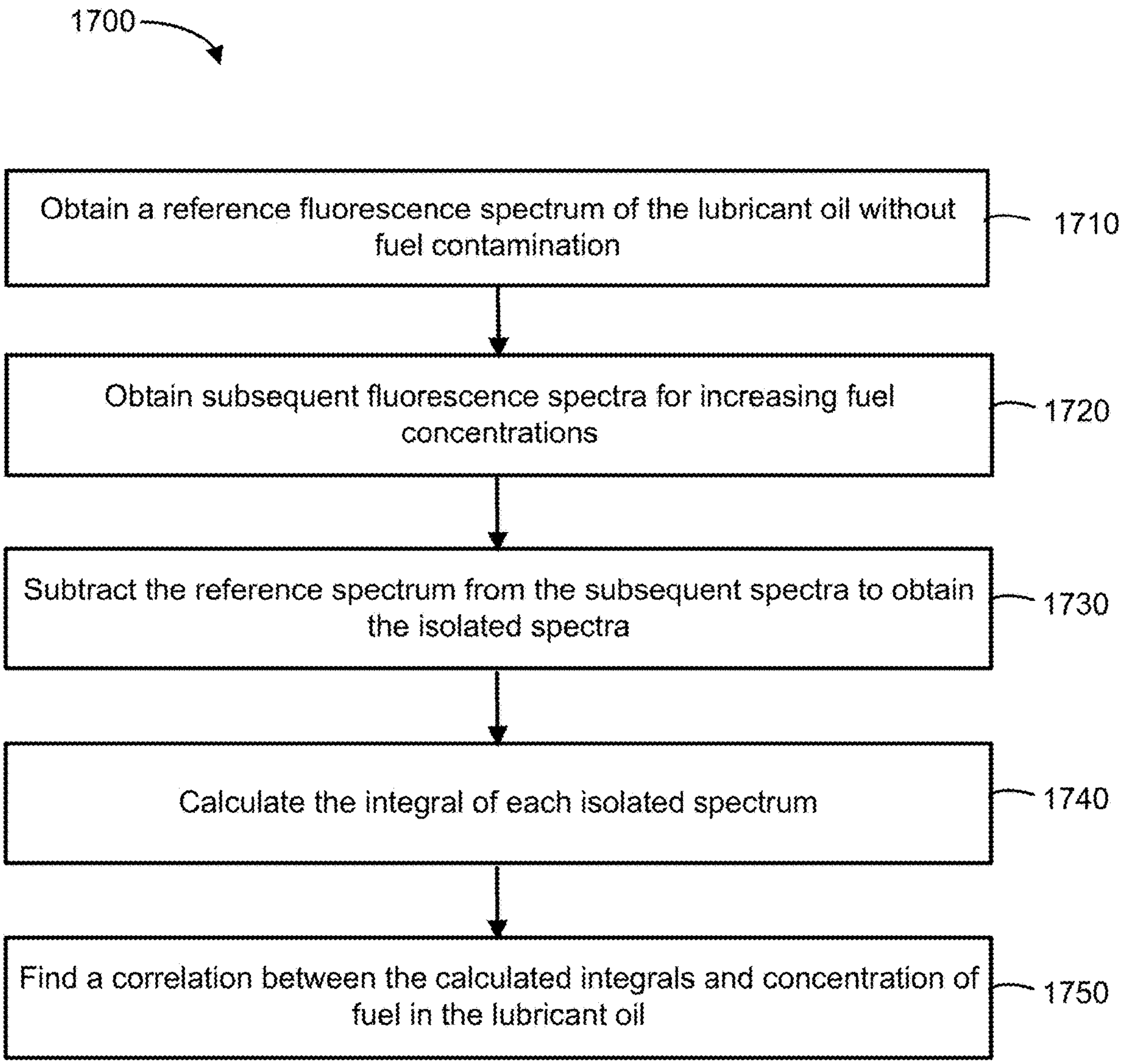
FIG. 17 is a flowchart of an example method for developing a calibration curve in accordance with an embodiment.
Figure 18:
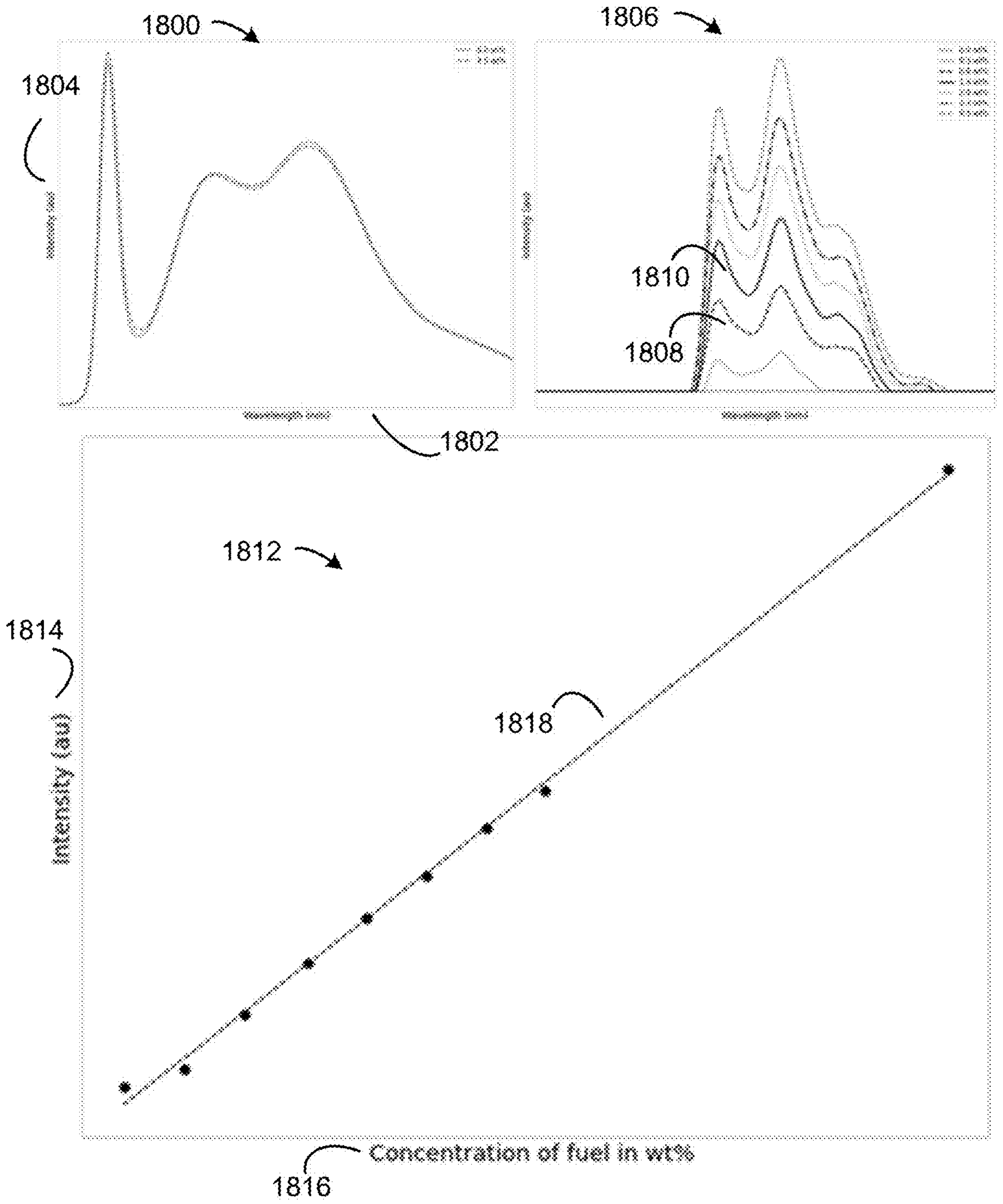
FIG. 18 is a series of example plots of steps of the method of FIG. 17 in accordance with an embodiment.
Figure 19:
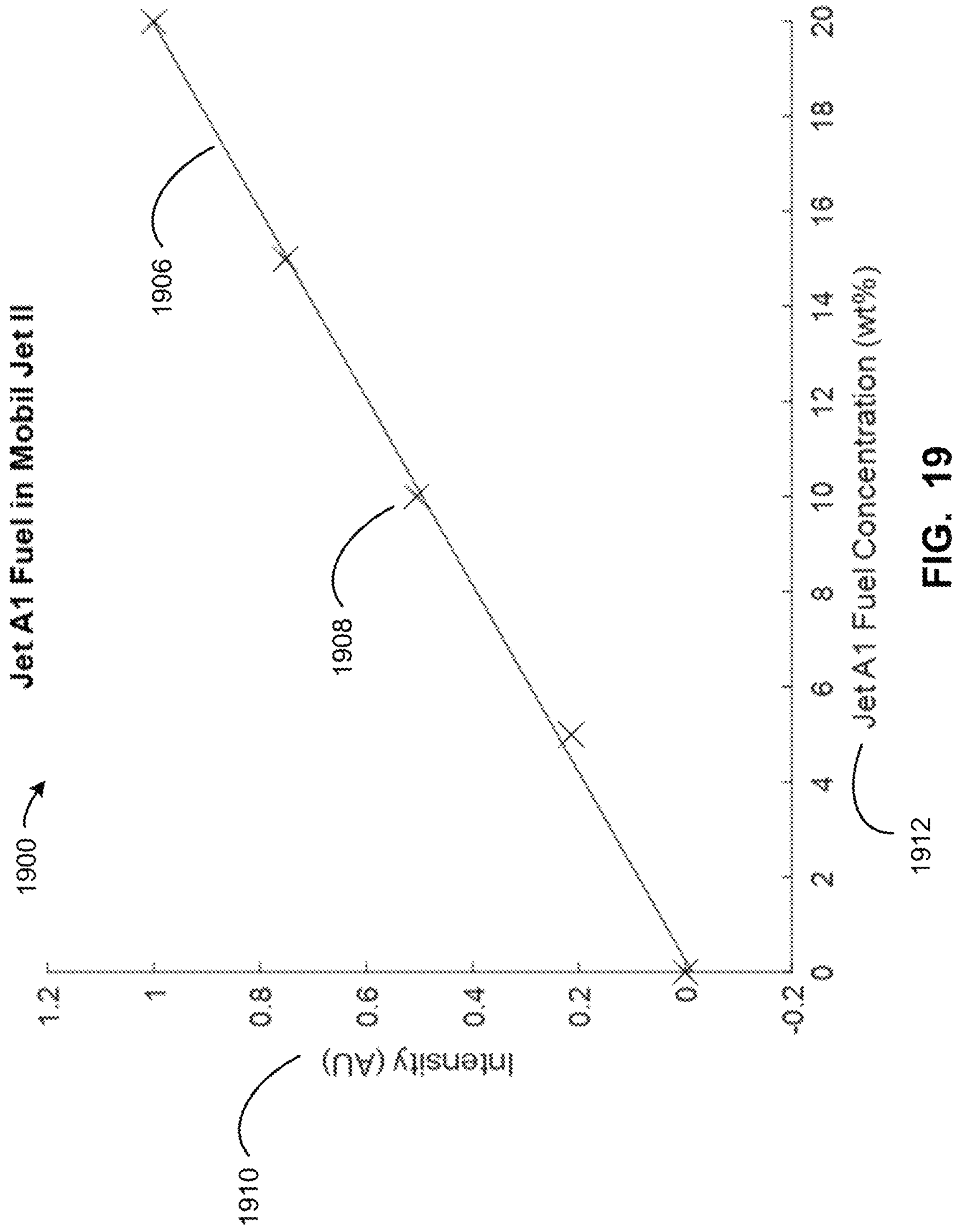
FIG. 19 is an example plot of intensity as a function of fuel concentration in accordance with an embodiment.

FIG. 17 shows a flowchart 1700 for developing a calibration curve used to determine the concentration of fuel in the lubricant oil.

At 1710, the method 1700 includes obtaining a reference fluorescence spectrum of the lubricant oil without any fuel contamination. The cumulative fuel contamination may be low (i.e., less than 10 wt %) so the overall impact of fuel contamination on the fluorescence spectra may not be obvious when looking at the superimposed fluorescence spectra such as the one shown in graph 1800 of FIG. 18. The x-axis 1802 is the emission wavelength and the y-axis 1804 is the fluorescence intensity. At t=0, it is assumed that there is no fuel, and therefore this measurement can be used as a spectral background that can be subtracted from each subsequent spectrum.

At 1720, the method 1700 includes obtaining subsequent fluorescence spectra for increasing fuel concentrations. In other words, a fluorescence spectrum was obtained after each standard addition of fuel in the lubricant oil after sufficient time had passed to allow the fuel to properly mix with the viscous oil.

At 1730, the method 1700 includes subtracting the reference spectrum from the subsequent fluorescence spectrum after each fuel addition. Examples of the resulting isolated spectra can be seen in graph 1806 of FIG. 18, which correspond to different times. For example, spectrum 1808 corresponds to a fuel contamination of 0.6% and spectrum 1810 corresponds to a later point in time when the fuel contamination is 1.6%, at which point an alarm may be triggered.

At 1740, the integral of each isolated spectrum is calculated, similar to step 1220 in method 1200.

At 1750, the method 1700 includes correlating the calculated integrals 1814 and the concentration of fuel 1816 in the lubricant oil. A linear regression curve 1818 may be obtained, as shown in graph 1812 of FIG. 18.

In some embodiments, fuel contamination can be detected using other well established chemometric or machine learning algorithms. For example, such algorithms can include a combination of one or more of: support vector machines and its variants, ridge regression and its variants, lasso regression and its variants, partial least squares and its variants, parallel factor analysis and its variants, multivariate curve resolution-asymmetric least squares and its variants, decision trees and its variants, singular value decomposition and its variants, principle component analysis and its variants, simple-to-use Interactive Self-modeling Mixture Analysis and its variants, orthogonal projection approach—asymmetric least Squares and other chemometric or machine learning algorithms.

Relative increases in fuel can be assessed using one or more of the algorithms listed above. A variant of the partial least squares algorithm can be used, for example, in the context of relative detection of jet A1 fuel in Mobil Jet II oil samples, as shown by the regression curve 1906 in graph 1900 of FIG. 19. As shown, a data point 1908 of the integrated intensity 1910 is plotted against the fuel concentration 1912 for each recovered spectral component to obtain regression curve 1906.

In some embodiments, fluorescence data is processed for oil classification purposes. Oil classification is mainly done in the context of fresh oils, to ensure that an oil change has been correctly carried out. Oil classification can be carried out using one or more of data processing algorithms. For example, such algorithms can include a combination of one or more of: support vector machines and its variants, ridge regression and its variants, lasso regression and its variants, partial least squares and its variants, parallel factor analysis and its variants, multivariate curve resolution-asymmetric least squares and its variants, decision trees and its variants, singular value decomposition and its variants, principle component analysis and its variants, simple-to-use Interactive Self-modeling Mixture Analysis and its variants, orthogonal projection approach—asymmetric least squares and its variants, and other chemometric or machine learning algorithms.

Figure 20A:
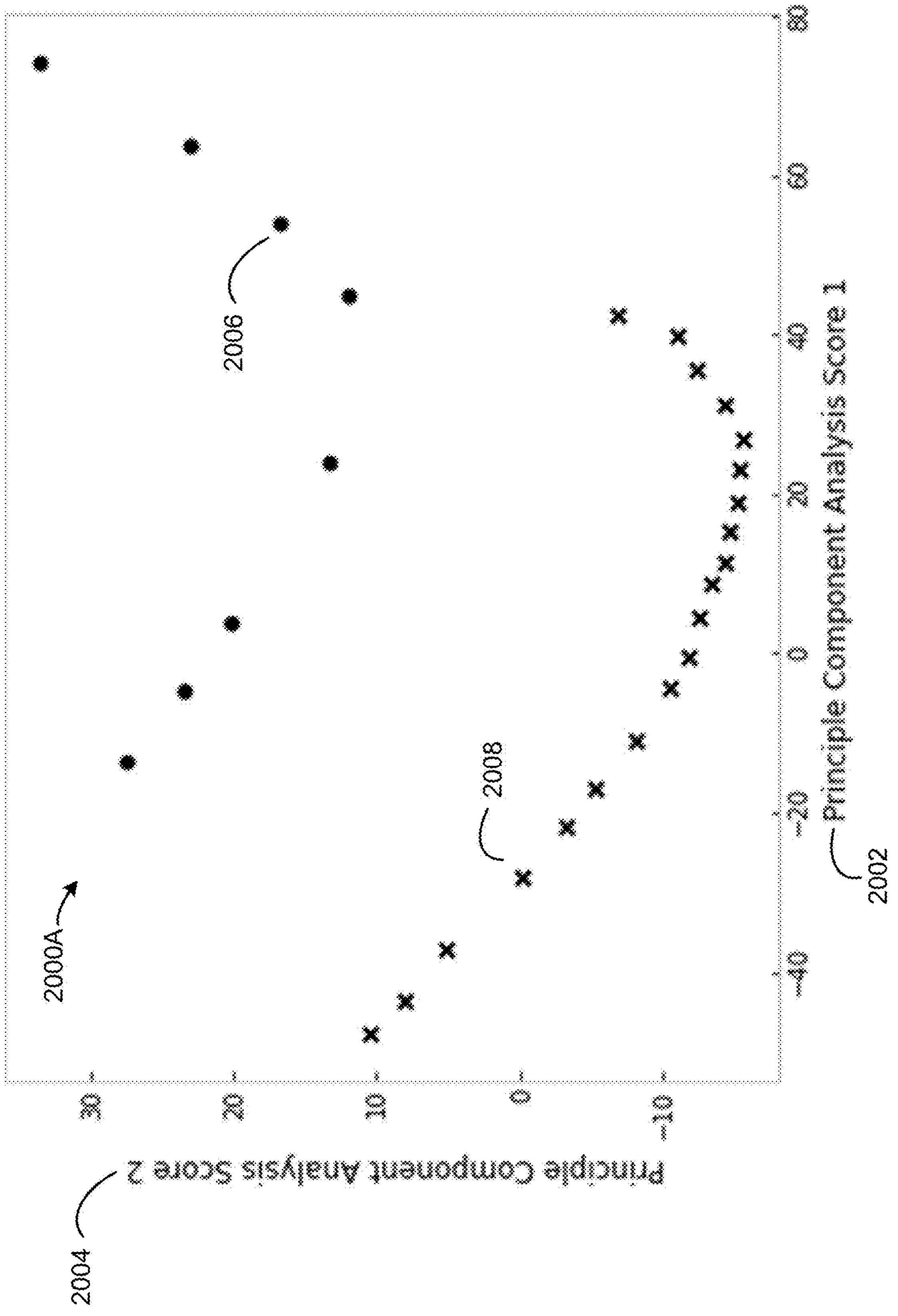
FIG. 20A is an example plot of Principle Component Analysis Scores in accordance with an embodiment.

Referring to FIG. 20A, shown therein is an example graph 2000A for applying Principle Component Analysis (PCA) to a series of fluorescence spectra obtained on two aviation oils undergoing thermal oxidative aging. PCA can be applied to a series of fluorescence spectra measured throughout the thermal oxidative process. Different oils in various degradation states can be classified in this manner. The x-axis 2002 represents the first PCA component and the y-axis 2004 represents the second PCA component. Curves 2006 and 2008 represent two different types of engine oils used in the aviation industry. The ability of the invention to classify oil types in this manner depends on the number of samples and oil types in the reference library. Classification of an unknown sample will usually require that there is reference data available for comparison.

In some embodiments, temperature calibration can be used to correct the signal intensity of a given antioxidant. The fluorescence response of a fluorescent organic molecule is temperature dependent. The photoluminescence quantum yield (PLQY) of a fluorescent organic molecule can typically be described by equation (10):

$$PLQY(T) = \frac{\text{krad}}{\text{krad} + \sum \text{k}non\text{rad}(T)} \tag{10}$$

Where Σknonrad(T) is a sum of all nonradiative processes. Generally, the higher the temperature, the lower the photoluminescence quantum yield, due to coupling with inter and intra molecular phonon modes.

Figure 25:
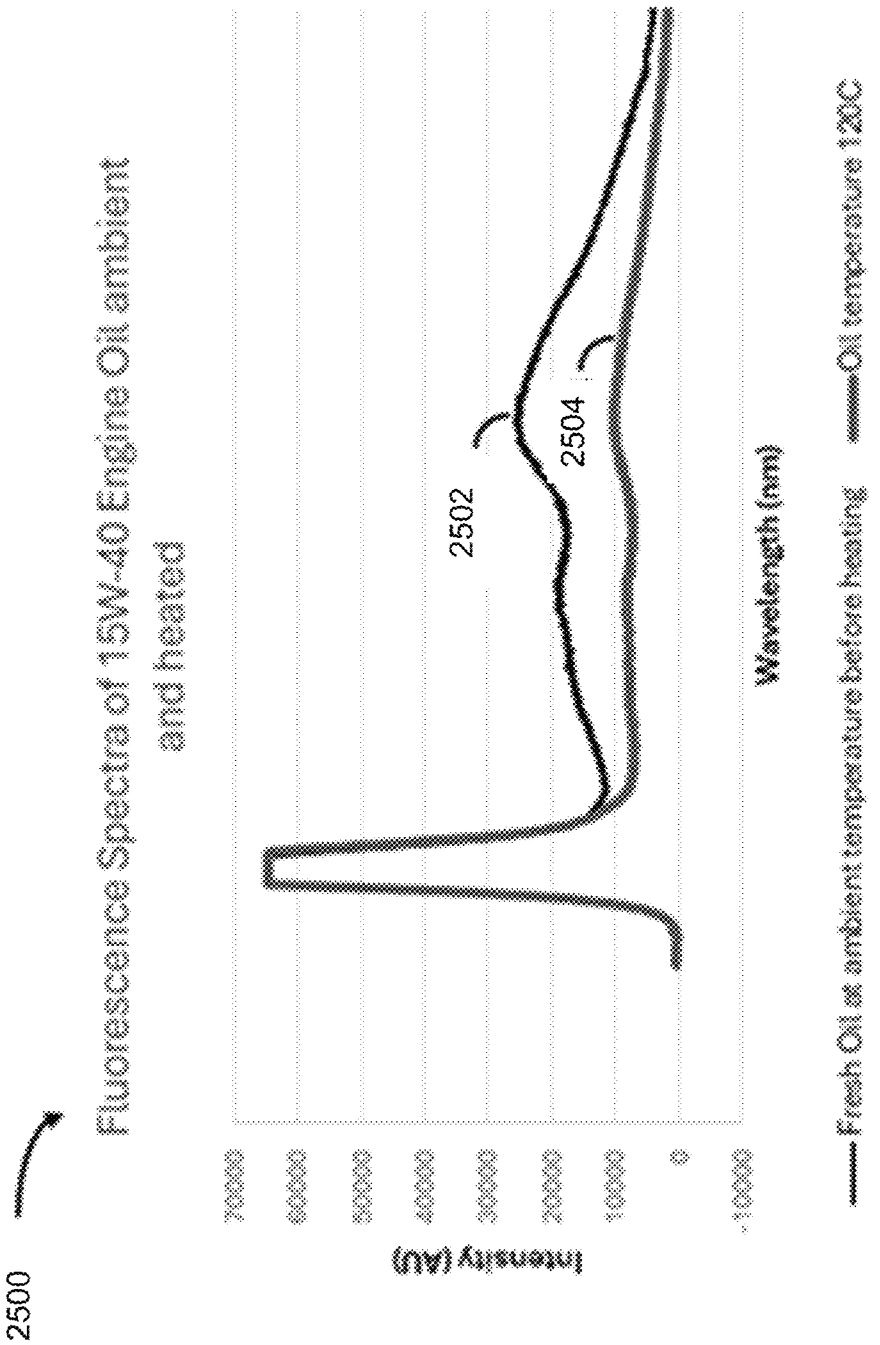
FIG. 25 is an example plot of intensity as a function of wavelength in accordance with an embodiment.
Figure 26:
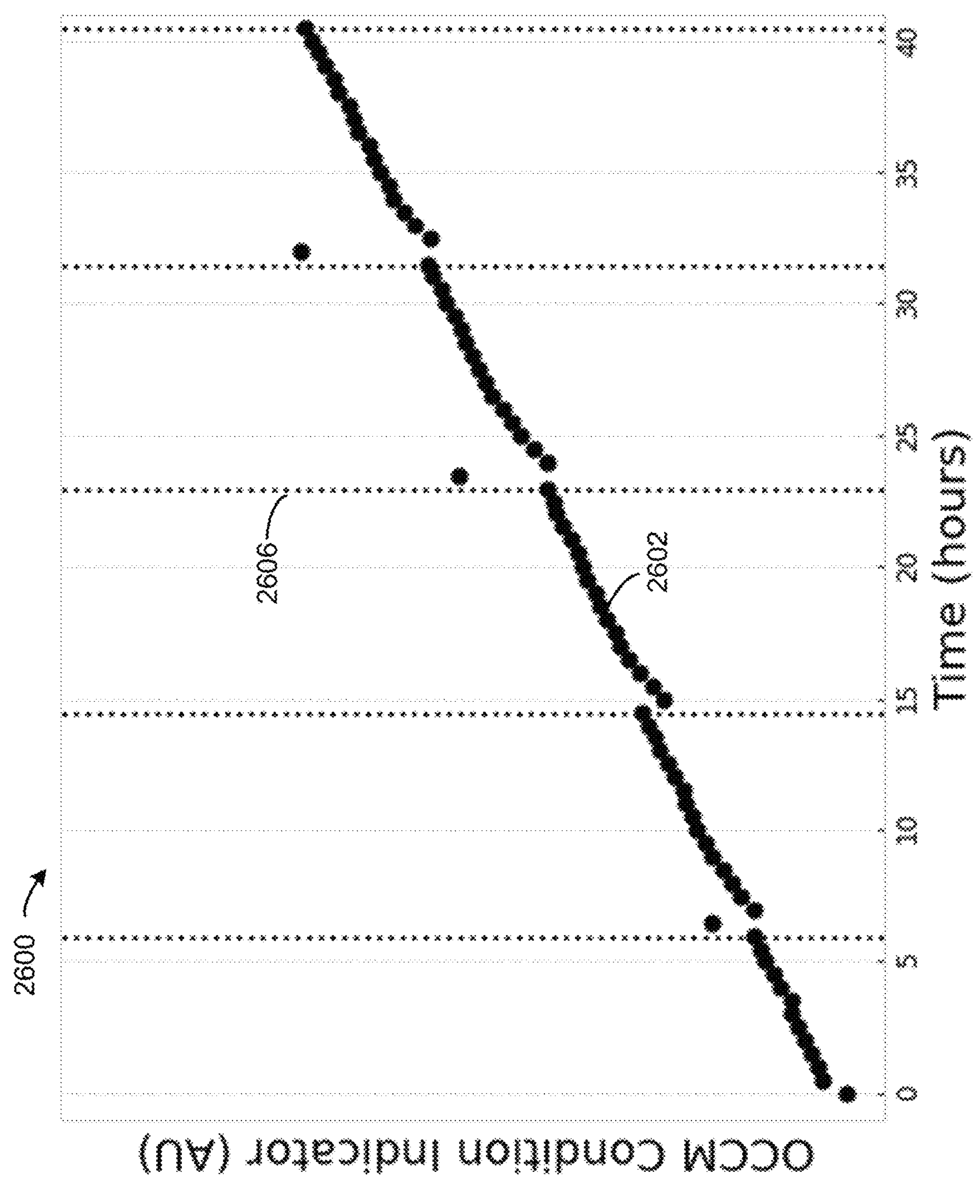
FIG. 26 is an example plot of condition indicator as a function of time in accordance with an embodiment.
Figure 27:
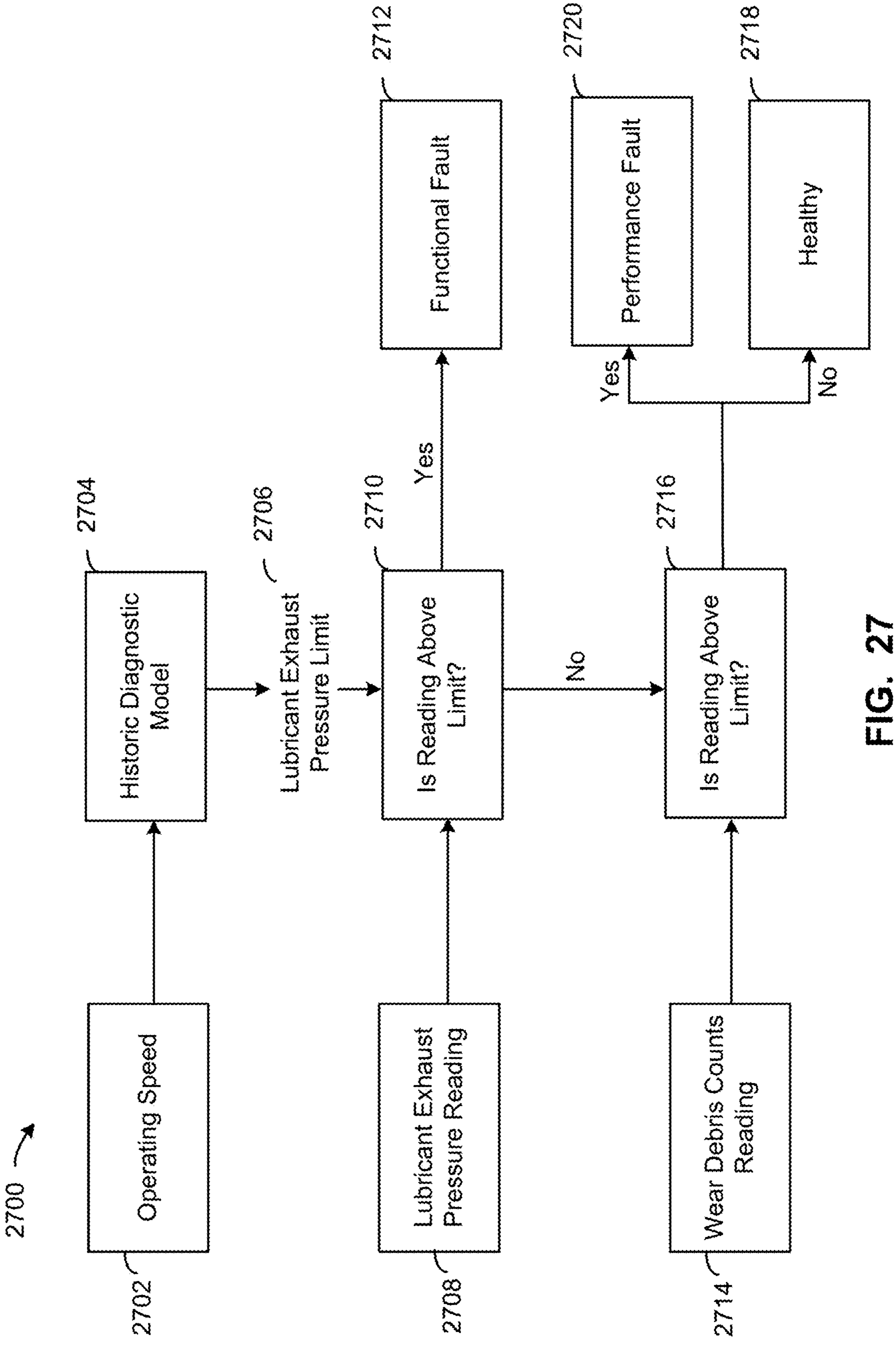
FIG. 27 is a block diagram of an example diagnostic model in accordance with an embodiment.

For lubricants, the overall fluorescence intensity under the same data acquisition settings will decrease when the temperature increased. Example graph 2500 in FIG. 25 shows the impact of thermal quenching on the overall fluorescence intensity of diesel engine oil. Plot 2502 corresponds to a fluorescence spectrum of a fluid sample that is a 15W-40 engine oil obtained at room temperature. Plot 2504 corresponds to the same fluid sample at a higher temperature of 120 degrees Celsius. As can be noted from the differences in intensities between the plots, the overall intensity drops as a function of temperature, but the overall spectra profile remains substantially the same. Temperature correction of the fluorescence intensity may be needed if the temperature is not kept constant throughout the machinery operation. The fluorescence response under different temperatures can be monitored with the fluorescence sensing apparatus 1000 and any temperature sensor as described herein.

For a marine diesel engine application, the temperatures are normally stable and fixed throughout its normal application. Temperature correction of fluorescence intensities is not generally required if the engine is maintained at this given operating temperature and the system has reached a thermal equilibrium. A demonstration of the invention installed in the lubrication system of a diesel generator is shown in example plot 2600 in FIG. 26, where the datapoints 2602 can be seen converging onto a trendline as the system reaches thermal equilibrium after the start of each day or operation, which is represented by the vertical lines 2606.

Figure 20B:
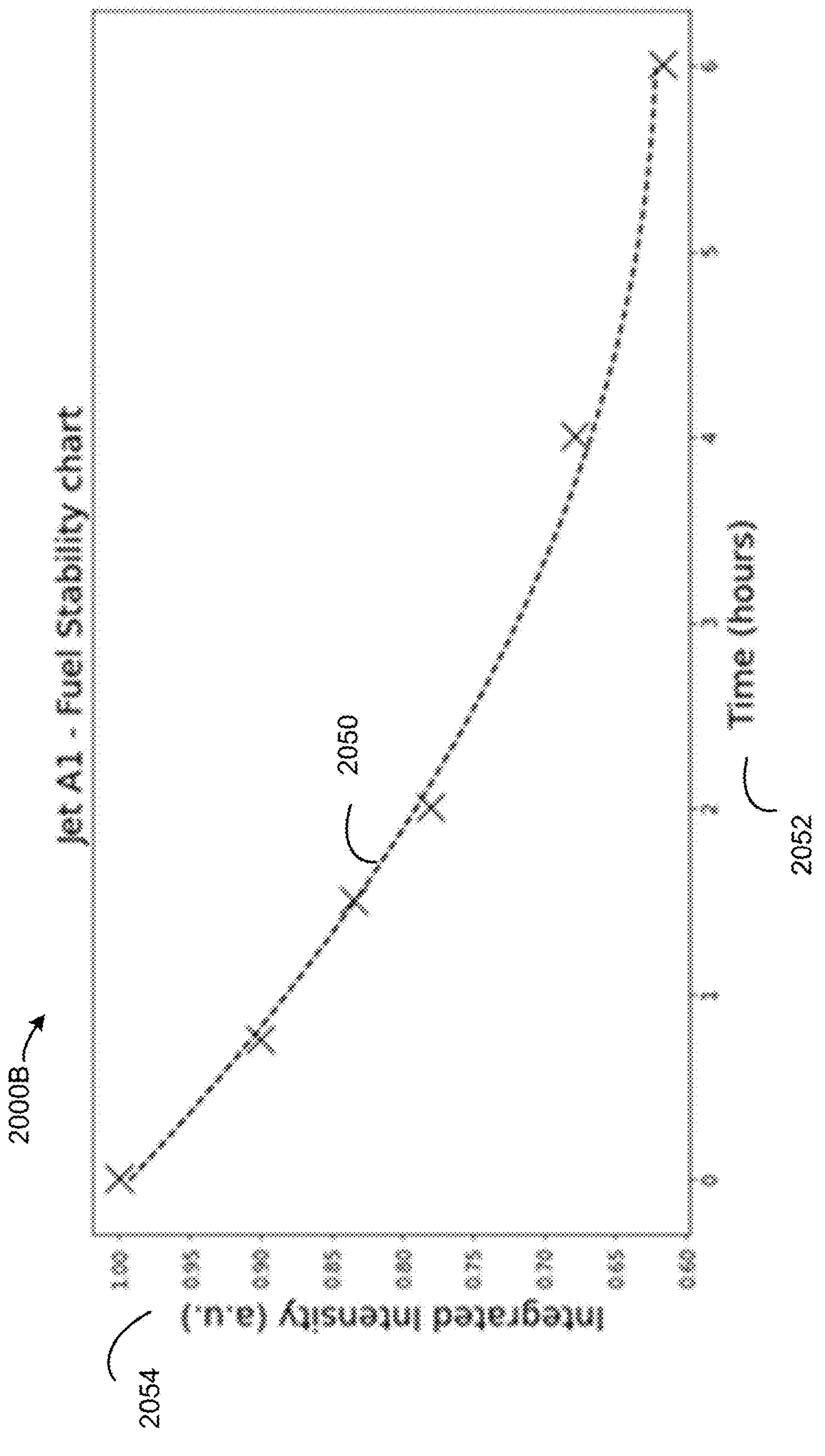
FIG. 20B is an example plot of fuel stability chart in accordance with an example embodiment.

Referring now to FIG. 20B, shown therein is a fuel stability chart 2050 illustrating the relationship between fuel degradation and fluorescence response over time, in accordance with an example embodiment. The x-axis 2052 represents operating hours or thermal exposure duration, and the y-axis 2054 represents the integrated fluorescence intensity or oxidation index. In the illustrated embodiment, the measurements are obtained by heating Jet A1 fuel at 150° C., and sampling at times up to 6 hours. As shown, as fuel degradation progresses, characteristic shifts or decreases in intensity can be observed, enabling the apparatus to monitor fuel stability in real-time.

In various embodiments, a fuel monitoring system comprising a flurorescence probe, such as the systems illustrated herein, is used to assess fuel stability. Fuel types can comprise, but are not limited to, petroleum-based fuels and synthetic fuels and blends thereof. For instance, petroleum-based fuels can comprise diesel fuels, bunker fuels such as heavy fuel oils, aviation fuels such as Jet A and Jet A1. Synthetic fuels can comprise biodiesel and hydroprocessed esters and fatty acids synthetic paraffinic kerosene.

Typically, one or more antioxidant molecules are added to certain fuel types to extend shelf life and prevent oxidation before the fuel is combusted. This is especially relevant in the context of aviation fuels, which are being employed as a thermal heat sink in aircraft to improve engine efficiency.

In various embodiments, a system comprising one or more LEDs and an optical probe is used to assess fuel stability. The assessment comprises at least one of measuring the fluorescence response of the antioxidant additives, and/or molecular products of oxidation or other fluorescence feature stemming from other additives present in the fuel mixture.

In other embodiments, an optical probe is used to assess fuel stability using an optical technique that is non-fluorescence based. In yet another embodiment, a system comprising an optical probe and an optical source, such as, for example, a laser, to assess fuel stability. This assessment comprises at least one of measuring vibrational modes of antioxidant additives and/or molecular products of oxidation or other vibrational modes stemming from other additives present in the fuel mixture.

In some embodiments, fuel monitoring systems, such as those disclosed herein, can be used to monitor glycol degradation. For example, non-fluorescence optical methods can be used to monitor coolant degradation, such as, for example, by monitoring oxidation of molecular constituents. In such examples, coolant degradation is determined through the increasing levels of glycolate (glycolic acid) overtime. As the coolant degrades over time, there is a decrease in coolant pH, which is a result of the coolant becoming more acidic and having more hydronium ions in aqueous mixture.

Coolants are typically mixtures that consist substantially, of water ($H_2O$), glycols and/or other additives. Glycol compounds, such as ethylene or propylene glycols, can undergo oxidation to form organic acids including glycolic acids. This is a form of coolant degradation. The resulting acidic products of coolant degradation can cause corrosion of metal surfaces in machinery.

In various embodiments, a system comprising an optical probe is used to determine coolant degradation. The assessment comprises at least one of measuring the vibrational modes of the coolant glycol content, coolant additives such as inhibitors, and/or molecular products of coolant oxidation or other vibrational modes stemming from other additives present in the coolant mixture.

In another embodiment, a system comprising an optical probe and an electrical probe are used to determine coolant degradation. The assessment comprises at least one of measuring the vibrational modes of the coolant glycol content, coolant additives such as inhibitors, and/or molecular products of coolant oxidation or other vibrational modes stemming from other additives present in the coolant mixture and other electrical properties of the coolant mixture such as conductivity.

Many industries that involve the use of heavy machinery generally use "magnetic plugs" or "mag plugs" for debris monitoring within a fluid. Mag plugs include a magnet that is installed within a fluid such that it can magnetically capture ferrous debris within the fluid. The captured debris can be examined by a technician to identify properties that indicate that the debris is the result of component failure, such as gear box failure or bearing failure. The failure of such components can result in significant damage to expensive equipment, and pose a risk to human safety (e.g., applications involving aircraft turbine engines).

Mag plugs take up little space and weight when installed. However, mag plugs have several drawbacks. For example, smaller debris particles that may be captured by mag plugs generally are not actually indicative of component failure, but are produced in large quantities, which requires technicians to perform high volumes of assessment to determine whether the captured debris is a concern with respect to component health. Additionally, the fraction of particles captured by mag plugs with respect to the total number of particles that pass by the mag plug is relatively low (e.g., as low as 10%). This can result in increased time to detect component failure. Furthermore, mag plugs can only capture ferrous material. Although most gear box and bearing components are ferrous, there are certain components in bearings and seals, for example, which are metallic but non-ferrous, and accordingly would not be captured by a mag plug.

Online debris monitoring solutions exist as alternatives to mag plugs, and in addition to solving the above challenges, also provide particle-level information such as total particle counts, individual particle size and material. This additional particle-level information can be used to not only look at the cumulative counts and mass of debris, but also to look at rates at which different sizes of particles are being detected. These particle detection rates can be used to greatly increase the reliability of both diagnostic and prognostic predictions. Furthermore, since different failure modes generate different particle-size distributions, the particle-level sizing analysis of online wear debris analysis can be used to focus only on particle size ranges of interest to a given failure mode.

While online debris monitoring has many advantages over either simple mag plugs or electronic chip detectors, existing online debris monitoring solutions generally have other drawbacks. For example, many existing debris monitoring solutions do not scale efficiently to larger fluid pipe diameters. One solution to this problem is to bypass a smaller volume of flow out of the main pipe and into a smaller diameter pipe to then analyze the fluid in the smaller diameter pipe. This adds installation complexities and added costs. Additionally, existing online debris monitoring solutions are often heavy, which limits their use in certain applications, such as aerospace applications. Owing to this, only one system may be used in a common scavenge line, instead of having an individual system for each scavenge line for fault isolation as is the current practice with mag plugs. Mag plugs are the dominant debris monitoring implementation in many heavy machinery applications, and many manufacturers fit equipment with standard threaded ports for mag plugs. Online debris monitoring systems are often larger than mag plugs and may require replacement of entire sections of a pipe for installation. Also, environmental noise caused by, for example, vibration, non-uniform media (e.g., air bubbles, soot, or other contaminants present in the fluid being monitored), and thermal and/or pressure fluctuations, poses a challenge to designing an online debris monitoring system that can detect acceptable levels of small enough particles that are indicative of component damage (e.g., particles that are approximately 100 microns to 400 microns in size). Finally, some debris monitoring systems that rely on particle capture tend to capture particles that are smaller than the particles that are indicative of component damage.

Figure 21B:
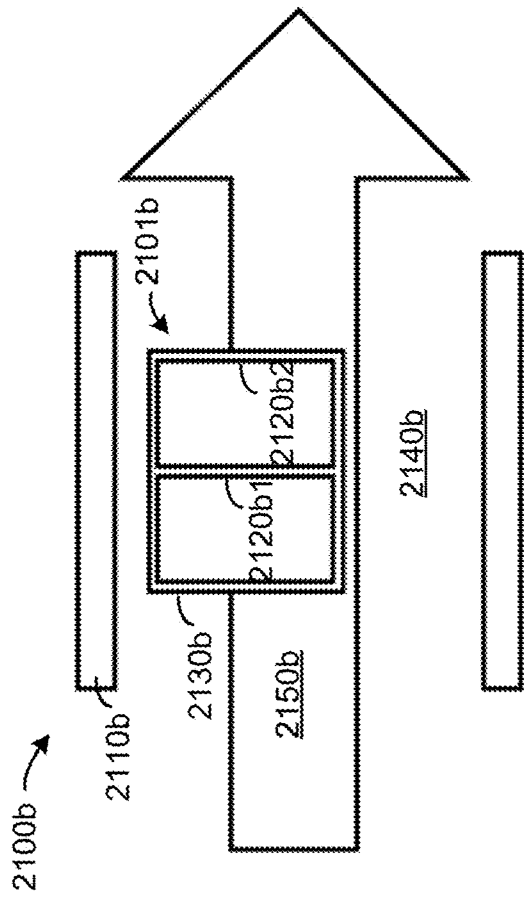
FIG. 21B is a cross-sectional illustration of an example printed-coil induction sensor (PCS) in accordance with an embodiment.
Figure 21A:
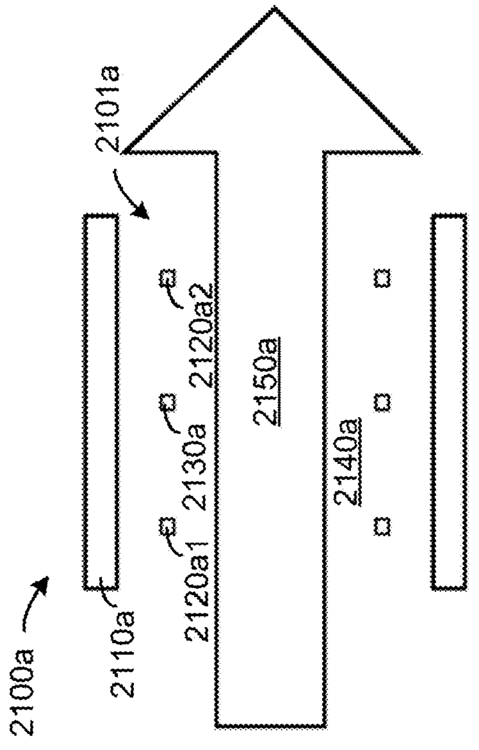
FIG. 21A is a cross-sectional illustration of an example flow-through debris monitoring sensor in accordance with an embodiment.

Referring now to FIG. 21A, shown therein is a cross-sectional illustration 2100*a* of an example flow-through debris monitoring sensor 2101*a*. As shown in the example in FIG. 21A, the debris monitoring sensor 2101*a* is installed in a pipe 2110*a* having a fluid 2140*a* flowing in direction 2150*a*. The illustrated debris monitoring sensor 2101*a* includes field coils 2120*a*1 and 2120*a*2, and sense coil 2130*a* which are wound around the pipe 2110*a*. As shown in FIG. 21A, the fluid 2140*a* flows through the debris monitoring sensor 2101*a*.

Referring now to FIG. 21B, shown therein is a cross-sectional illustration 2100*b* of an example printed-coil induction sensor (PCS) 2101*b*. As shown in the example in FIG. 21B, the PCS 2101*b* is installed in a pipe 2110*b* having a fluid 2140*b* flowing in direction 2150*b*. The illustrated PCS 2101*b* includes field coils 2120*b*1 and 2120*b*2, and sense coil 2130*b*. As shown in FIG. 21B, the PCS 2101*b* is inserted into the fluid 2140*b* and the fluid 2140*b* flows around the PCS 2101*b* (e.g., rather than through the sensor).

In some embodiments, the PCS 2101*b* may be implemented using one field coil and two sense coils. In some other embodiments, the PCS 2101*b* may be implemented using a different combination and configuration of the field and the sense coils.

Referring briefly to FIG. 31A, shown therein is an illustration 3100*a* of an example PCS 3101*a* installed in a pipe 3110*a*. PCS 3101*a* is connected to a processor, such as processor 220, via cable 3165*a*. As shown, fluid within the pipe 3110*a* flows in direction 3150*a* around the PCS 3101*a*.

Referring briefly to FIG. 31B, shown therein is an illustration 3100*b* of an example PCS 3101*b* installed in a pipe 3110*b*. PCS 3101*b* is connected to a processor, such as processor 220, via cable 3165*b*. In the illustrated example, PCS 3101*b* is a larger-coiled format compared to PCS 3101*a*. As shown, fluid within the pipe 3110*b* flows in direction 3150*b* around the PCS 3101*b*.

Returning now to FIG. 21B, PCS 2101*b* is based on a three-magnetic-coil design. Two of the coils, 2120*b*1 and 2120*b*2 are field coils, which are electrically driven to produce a magnetic field. One coil, 2130*b* is a sense coil, which passively detects changes in the magnetic field produced by the field coils (i.e., via magnetic induction). Accordingly, as metallic particles within fluid 2140*b* travel in direction 2150*b* past the first field coil 2120*b*1, the metallic particles interact with the magnetic field produced by field coil 2120*b*1. This interaction is detected as a change in voltage across the sense coil 2130*b*. As the metallic particles continue to travel in direction 2150*b* past the second field coil 2120*b*2, the metallic particles interact with the magnetic field produced by field coil 2120*b*2. This interaction is detected in an opposite change in voltage across the sense coil 2130*b*.

Referring to FIG. 33, shown therein is an example plot 3300 of a PCS sensor output as a function of time. The y-axis 3382 represents the voltage measured by the sense coil of a PCS sensor. The x-axis 3384 represents time. The data trace 3380 can be referred to as a "particle trace" or "trace". As shown in FIG. 33, the PCS generates distinct peaks 3386 and 3388 over time as particles pass the sensor. For example, peak 3386 represents a ferrous particle passing the PCS, while peak 3388 represents a non-ferrous particle passing the PCS. These distinct peaks 3386 and 3388 allow the fluid monitoring system to distinguish fluid particle signals from noise. For example, each of peaks 3386 and 3388 is "double-lobed" due to the two distinct spikes in the particle trace of each peak that are opposite in polarity. As shown, peak 3386 includes spike (or lobe) 3386*a* and opposite polarity spike (or lobe) 3386*b*. Similarly, peak 3388 includes spike (or lobe) 3388*a* and opposite polarity spike (or lobe) 3388*b*. The double-lobed nature of particle trace 3380 distinguishes the sensor signal from noise (e.g., vibration noise), which can appear as single-lobed. In general, the fluid monitoring system can better distinguish a PCS sensor signal from noise when a particle trace has more lobes because the signal band within the frequency domain is narrower for a double-lobed signal than a single-lobed signal, which allows more of the noise (e.g., vibration spectrum) to be filtered out. The PCS design to include two field coils allows the particle trace 3380 to have this distinct double-lobed shape.

Figure 22:
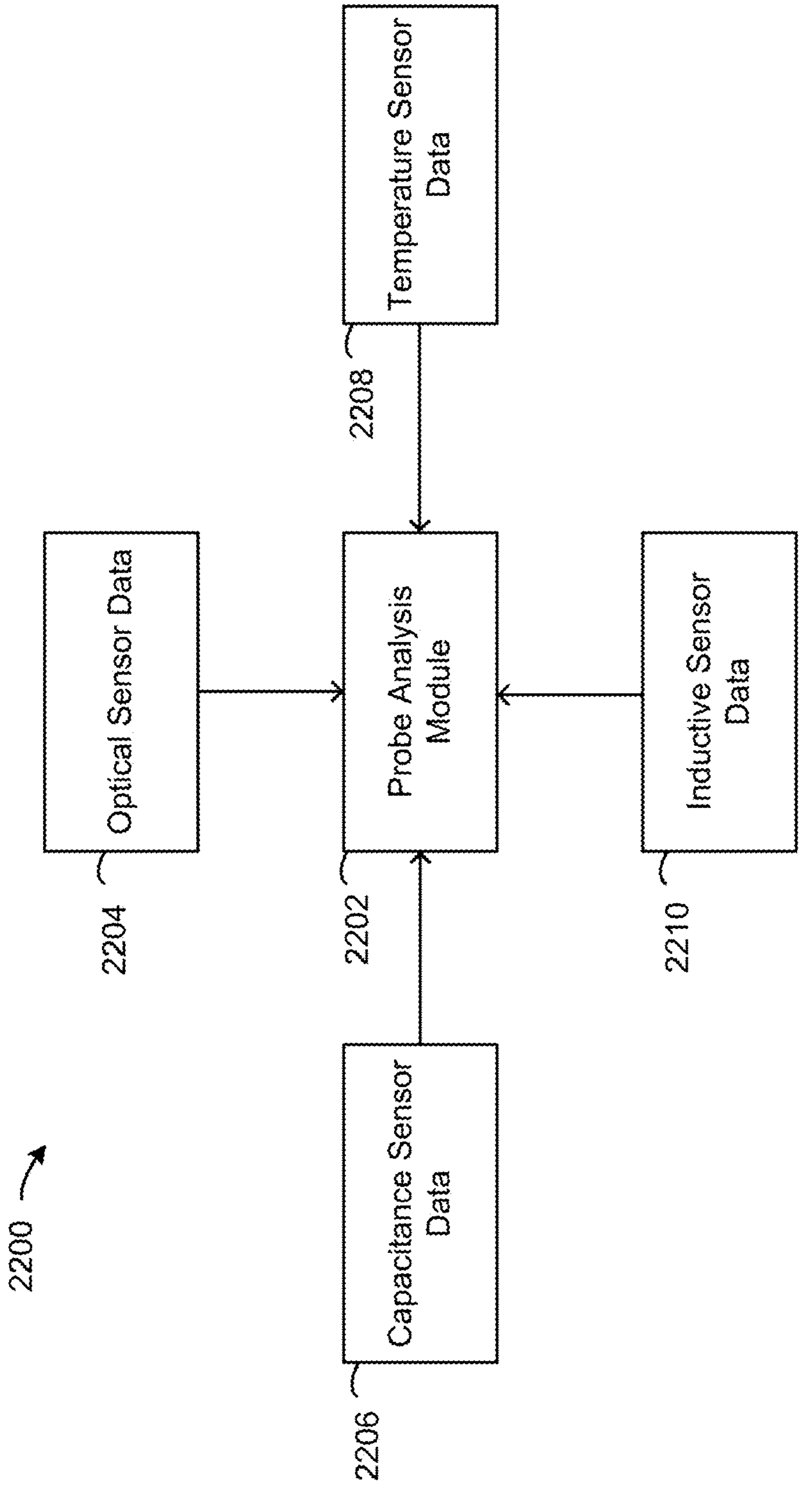
FIG. 22 is a block diagram of an example data flow within the fluid monitoring system of FIG. 2 in accordance with an embodiment.

Referring to FIG. 22, shown therein is a block diagram 2200 of an example data flow within a fluid monitoring system as described herein. As shown, probe analysis module 2202 can receive inputs including optical sensor data 2204, temperature sensor data 2208, inductive sensor data 2210, and electrical properties sensor data 2206. For example, the sensor data 2204, 2206, 2208, and 2210 can be analyzed independently or in combination. In some embodiments, the sensor data, whether raw or processed, can be used in combination for diagnostic and/or prognostic purposes using, for example, machine learning models or other data processing algorithms.

The use of additional sensors generates data capable of inferences to both detection as well as causes of failure which are not possible with either individual sensor in isolation. For example, the combination of fluorescence spectroscopy and inductive sensing can infer an oil-degradation-related component failure since degraded oil has a higher viscosity, which can induce wear on the lubricated components. Monitoring for wear debris in isolation would suggest replacing the damaged component, monitoring for oil degradation would suggest replacing the oil, but monitoring for both would suggest that oil degradation is causing component failure and to replace (or perform other maintenance actions on) both oil and the damaged component. Similarly, measuring the water content of the oil using an electrical properties sensor as well as wear debris using an inductive sensor could make the inference that a component is being damaged by corrosion.

The use of additional sensors can also detect a more complete set of failure modes. For example, the combination of fluorescence spectroscopy and electrical properties sensing can monitor for both fuel and water contamination of oil, whereas fluorescence spectroscopy would only detect fuel contamination and electrical properties sensing would only detect water contamination.

In some embodiments, the sensor inputs are combined for increased reliability of detection, pinpointing the failure mode and/or damaged component and improved accuracy of predictions of remaining useful life. For example, in the case of some types of fuel and coolant contamination, the electrical properties sensor may indicate contamination in the oil but it may be challenging to identify the type of contamination or source of contamination. The electrical properties sensor then functions as an indicator and corroborative input, while the fluorescence sensor correctly identifies the type of contamination. The quantification of the level of contamination by the fluorescence sensor can then be checked against the measurement from the electrical properties sensor and correlations or other algorithms can be employed to improve the accuracy of the diagnostic output from the overall system. This would enable the end user to identify the source of contamination such as faulty injectors and take the correct maintenance action promptly.

In some embodiments, a diagnostic model utilizes historic engine, operational and performance data to evaluate the probability that a certain component within the system is damaged. The diagnostic model may be a machine learning model such as a decision tree model. The inputs of the diagnostic model can include operational data such as speed, load, torque, and runtime, and Condition Indicator data such as pressure, temperature, wear debris, vibration, oil condition data.

In some embodiments, the diagnostic model is capable of leveraging data from multiple sensors such as the Fluid Condition sensors optical sensing system (e.g., Optical sensing System or electrical properties sensor), debris monitoring sensor (e.g., ODM sensor), and other Engine Control Unit sensors (e.g., temperature sensor or pressure sensor) to identify and distinguish between performance faults and functional faults. In the case of performance faults, component damage is detectable by online sensors or other offline methods but the overall system remains functional. Spall formation on a bearing or other component is an example of a performance fault that can be tracked in terms of the number of debris particles released into the oil as the spall propagates. Once this fault has been detected, there is a finite amount of time before a functional fault will occur, and a scheduled maintenance action will be required. The more severe functional fault typically results in engine shutdown, as either a component is simply no longer able to function, or that continued operation risks immediate catastrophic engine failure. Disk rupture in gas turbines or bearing cage failures in gearboxes are examples of functional faults.

For example, the operating speed, the wear debris counts, vibration and the lubricant exhaust pressure can be used as inputs to the diagnostic model, which then classifies the condition of the engine as one of three outputs states. An example logic tree 2700 for an example diagnostic model can be seen in FIG. 27. The operating speed 2702 of the engine, obtained from an ECU sensor, is used as an input to a historic model 2704, which outputs a lubricant exhaust pressure limit 2706. A pressure sensor provides the lubricant exhaust pressure reading 2708. At 2710, the lubricant exhaust pressure limit 2706 and the lubricant exhaust pressure reading 2708 are compared. If the lubricant exhaust pressure reading 2708 is above the lubricant exhaust pressure limit 2706, the engine is determined to have a functional fault at block 2712. At the same time, the wear debris count reading 2714 obtained from the ODM sensor is compared to a wear debris counts rate limit (not shown in FIG. 27) at block 2716. The engine is diagnosed healthy at block 2718 if both ODM and pressure sensors are below their respective limits. Correspondingly, if the debris counts rate detection limit is exceeded, then there is a fault on the engine and the lubricant exhaust pressure 2708 is used to determine whether it consists of a functional or performance failure. Once the engine has a detectable performance fault at block 2720, prognostic models can be implemented to track the RUL.

Figure 28:
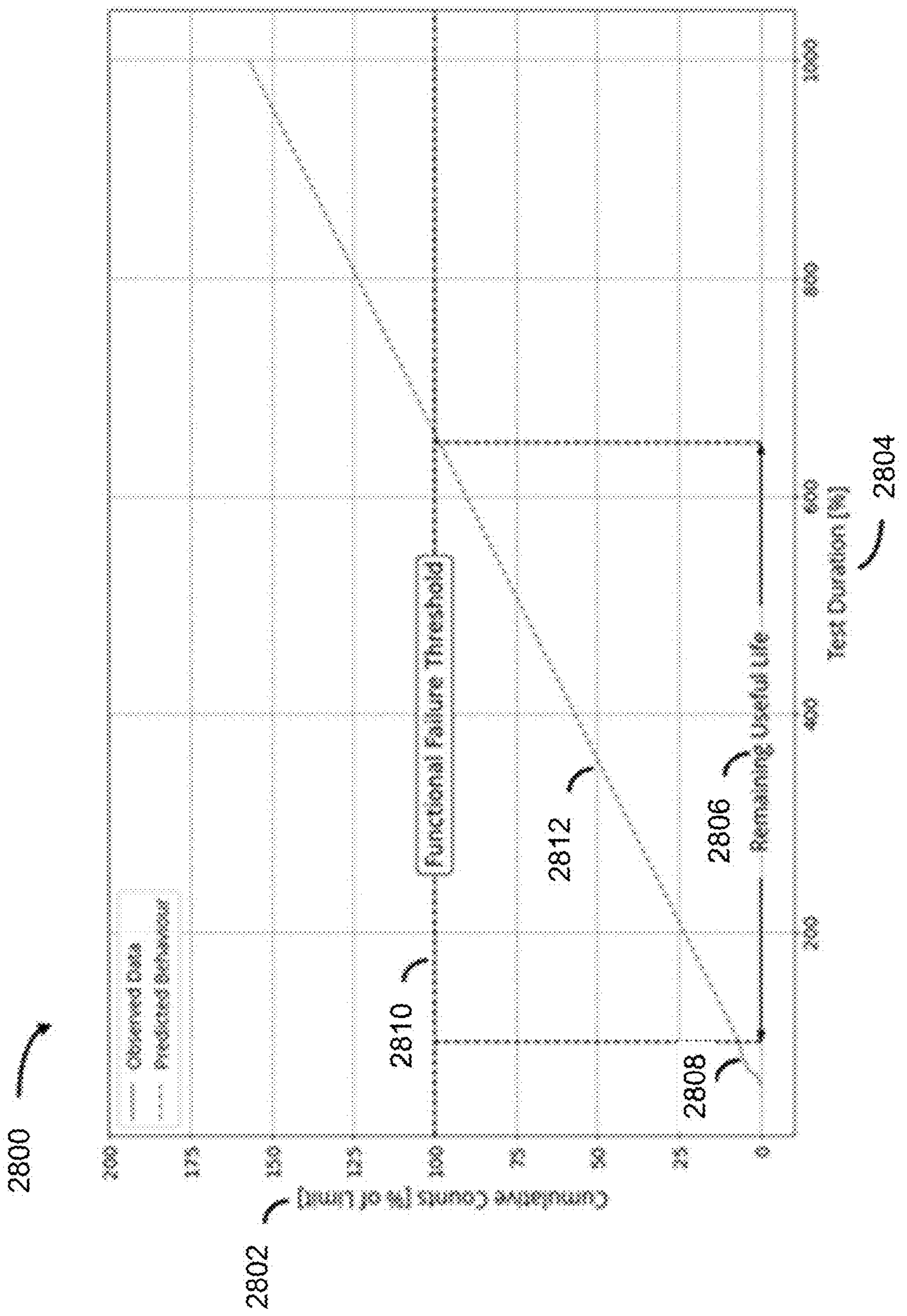
FIG. 28 is an example plot of debris count as a function of test duration in accordance with an embodiment.

In some embodiments, the prognostic models can output an optimal time to perform the maintenance, by predicting the functional RUL based on the measured rate progression of the given performance fault and a threshold with a margin of safety before critical functional failure. An example, plot 2800 to be used for obtaining the RUL 2806 from debris count using historic counts behaviour is seen in FIG. 28. The y-axis 2802 represents the cumulative debris count obtained from the ODM sensor and the x-axis 2804 represents time. The RUL 2806 is determined by taking the current count degradation rate 2808 and extrapolating that rate out to the failure threshold 2810, forming a predicted behaviour trendline 2812.

ODM sensor data can be combined with engine vibration, data obtained through accelerometers, temperature data, engine operational data such as loading and rotational speeds, offline and at-line collected data types such as filter and oil sample analyses, and engine specific information, such as time since maintenance, total operational hours, previous builds, etc. This combination allows for improvements in ODM based diagnostic condition indicators using supervised machine learning algorithms such as decision trees and regression models, and other forms of traditional data analytics.

Online ODM sensor data is a continuous measurement system that goes through several analytical models before it can provide an accurate and reliable diagnosis as to the current damage state of rolling element bearings, gears, journal bearings, seals, and various other forms of oil wetted rotating machinery components. Several of these models are critical and will be stated herein, with the example of rolling element bearings (REB).

Figure 29:
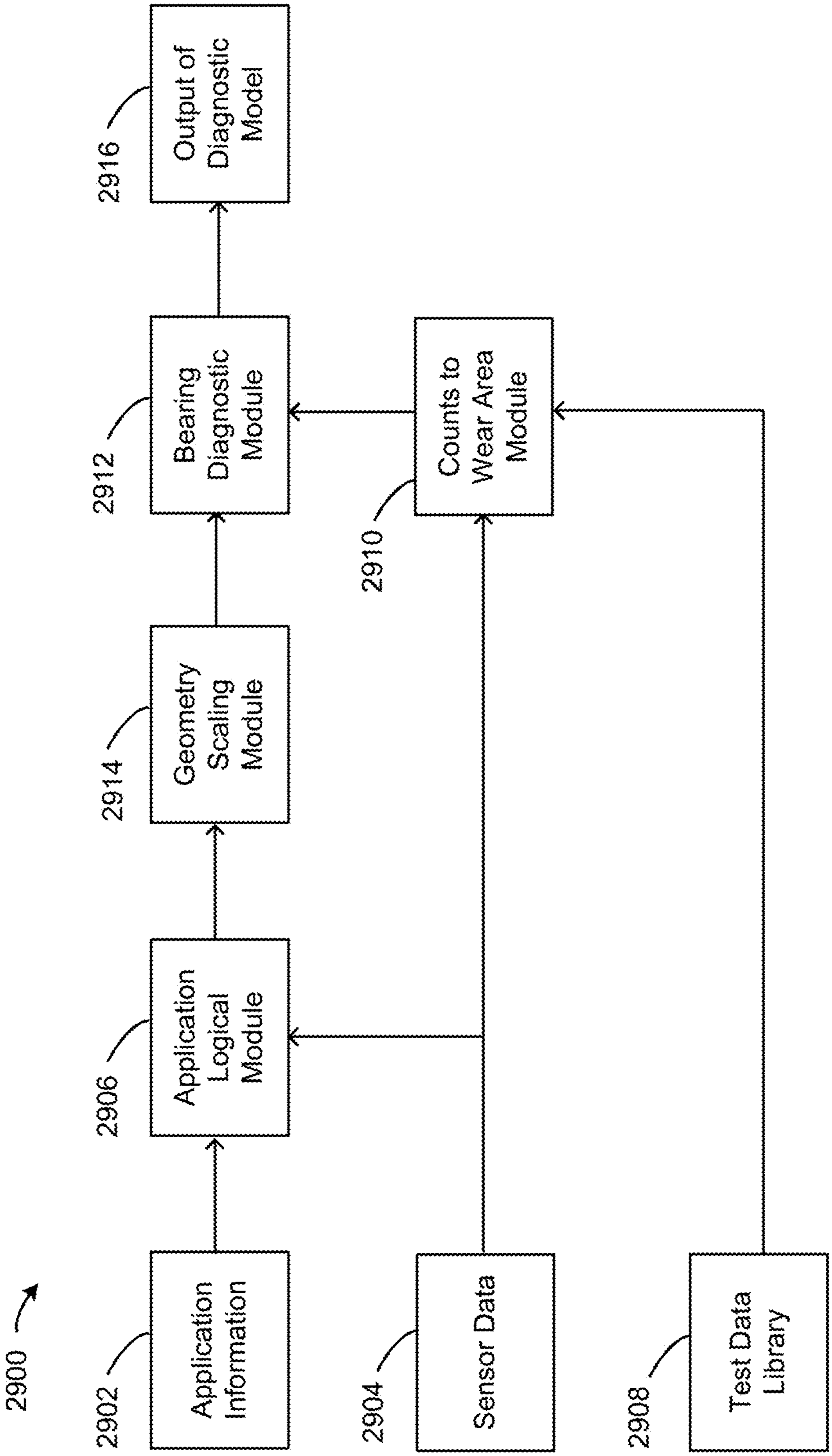
FIG. 29 is a block diagram of an example diagnostic model in accordance with an embodiment.

Referring to FIG. 29, shown therein is a flow diagram 2900 of a diagnostics model in accordance with an embodiment. The inputs of the ODM based diagnostic model include critical application specific knowledge 2902 about the target component and engine. For REB in particular, this includes the raceway geometries, number of rolling elements and their geometries, all relevant material information, as well as information about the lubrication environment including flowrates, and wear debris particle transport efficiencies.

Another input to the diagnostic model is the sensor data 2904 such as ODM sensor counts, as well as the sizing criteria. This continuously monitored data provides direct correlation to damaged components.

The diagnostic model involves application specific logical tailoring via the application logical module 2906 and the geometry scaling module 2914. This includes logic driven component isolation, any lubrication environment scaling factors and models for applications that have low transport efficiencies or unique sensor installation logistics. The output of the geometry scaling module 2914 is a scaled counts property that confirms the existence of a fault and identifies the fault component. The application logical module 2906 and the geometry scaling module 2914 include a series of logical conditions which apply a particle size specific scaling factor to the sensor data 2904 (e.g., counts input) based on user pre-set application settings. The component isolation setting is based on sensor installation location, (i.e. which component is it downstream of) or simple data features of the counts such as their size distribution, total counts amount, and overall change in total counts over a specific application dependent time interval. Once the scaled counts version passes a certain application specific pre-set threshold, a fault is diagnosed, and the model engages the next module(s). Depending on the application, a warning state will also be issue to the operator of the application once this threshold is passed.

The test data library 2908 includes a series of ground inspections from field applications and laboratory testing that form the fundamental physics driven linear correlation between wear debris count and damaged component area/volume/mass. The linear correlation slope is continuously updated for improved accuracy and reliability.

The linear correlation is also physics informed so that it can be adjusted based on component types and wear modes, which can affect the particle size distribution. The particle size distribution is key for application of the linear correlation.

The counts-to-wear area model 2910 applies the linear relationship obtained from the test data library 2908 to the modified counts input. The resultant product is output as a damaged area value. In some embodiments, the output includes a volume or mass. This is a probability distribution to the damage on a particular component in the application engine. This distribution is then translated into an understandable component specific damage quantity within the bearing diagnostic module 2912. For REB, this may include a raceway spall level in terms of angle of spall, percentage of raceway that is spalled, and/or number of rolling elements in spall at an instant. These require the geometric information of the component provided within the system input.

The output of the diagnostic module 2916 is a distribution of the component specific damage. Depending on the application requirements, a single value can be reported rather than a distribution for operator use. Examples include 99% reliability (where the probability of damage level greater than the reported value is 1%) or the expected value from the distribution. Furthermore, in some embodiments, the value is compared against a threshold driven by the degradation physics of the component and its geometry. If the reported damage level is larger than this threshold, an alarm can be issued to the operator or maintenance program oversight.

Figure 30:
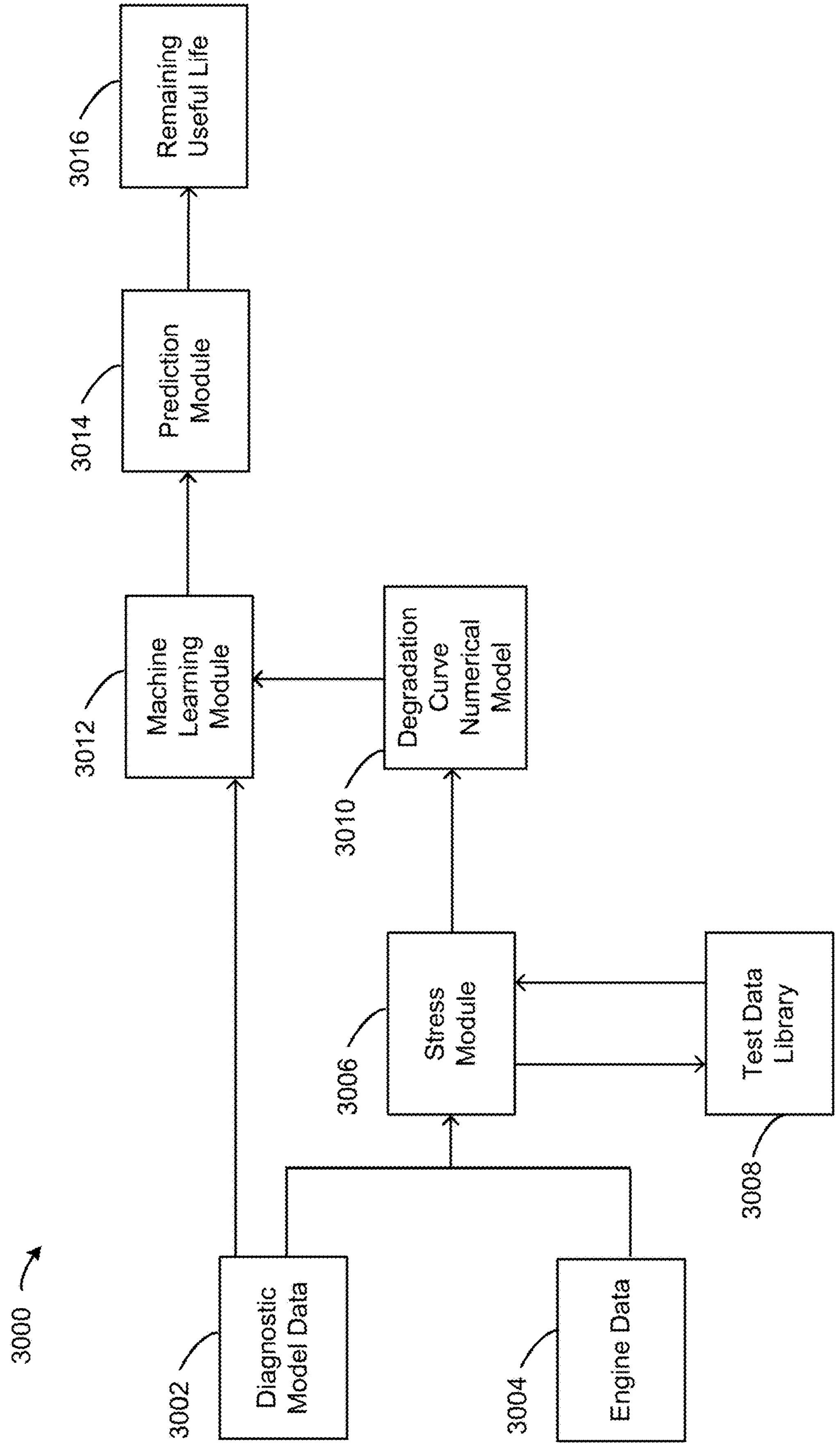
FIG. 30 is a block diagram of an example prognostic model in accordance with an embodiment.

Referring to FIG. 30, shown therein is a flow diagram 3000 of a prognostic model in accordance with an embodiment. The goal of the prognostic model is to take in the history of the diagnostic model outputs, such as output 2916, over a period of time once a fault is detected and predict the time until the probability of catastrophic failure is significant (e.g., maintenance should be performed). The timescale of this notice can be in the range of hours to days to months, for example, depending on the application. The model can receive diagnostic model data 3002 such as diagnostic model distribution history since last engine build, sensor installation, or when a fault was first diagnosed. The model can further receive engine data 3004, including the engine load, rotational speed, and build history, for example. Furthermore, component specific geometry data is used by the model in a similar manner as in the diagnostic model as described with reference to FIG. 29.

The prognostic model uses a test data library 3008 that includes experimentally derived degradation curves obtained through laboratory REB failures, or experimental field trials. Numerical physics driven models are then fitted to these curves, with consideration for both loads and rotational speeds. These are mainly for REB spall, however, the library 3008 accepts testing continuously to add capability for different failure modes, different operational regimes, different materials, and different oil wetted components.

The engine load and speed data provided are critical to deciphering which degradation curve the bearing will follow. Built into this curve are degradation curve changepoints based on the damage level, load changes, and/or physical degradation phenomena. Therefore, there exists a recursive relationship between the degradation curve library 3008, diagnostic model history 3002, and the individual REB numerically modelled degradation curve.

The load and speed data are not sufficient for degradation curves, as REB can be under various different conditions dependent on application, industry, and engine size. For this reason, the stress module 3006 translates the loading information into scalable features.

The degradation curve numerical model 3010 includes exponential and linear growth models. It includes deterministic coefficient and variables set-up based on the degradation physics, geometries, and application settings. There are also stochastic experimentally derived physics informed coefficients and variables that cause for a distribution as to the expected shape of the REB degradation curve. Experimental testing has revealed that bearings even under identical conditions can have vastly different degradation curves. For this reason, the machine learning module 3012 can be used to improve accuracy and best match the degradation curve via the diagnostic model data 3002. In other words, the internal stochastic coefficients of the degradation curve numerical models 3010 are shifted to improve accuracy and reliability in matching the evolution in the diagnostic model distribution over the time the faulted component is in operation. These methodologies may employ Monte Carlo methodologies and supervised machine learning approaches within the machine learning module 3012.

At an application specific point in the faulted component operation, a prediction as to the remaining useful life 3016 is made by projecting the numerical model into the future, with some idea as to the future mission profile of the target asset. This prediction module 3014 has the projected curve and reports the time, revolutions, flight cycles or equivalent operator friendly criteria until a threshold for failure. Application driven factors such as reliability or accuracy can also be implemented. The threshold is physics informed and relates to the onset of catastrophic failure risk, such as seizure or cage fracture, and is application dependent.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

CLAUSES

Clause 1: A system for monitoring one or more properties of a fluid in a mechanical device, the system comprising: an optical sensor comprising: an excitation light aperture; and an emission light aperture; wherein the excitation light aperture transmits an excitation light to the fluid and the emission light aperture receives an emission light from the fluid.

Clause 2: The system of any of the preceding clauses, wherein the optical sensor comprises a fluorescence sensor.

Clause 3: The system of any of the preceding clauses, further comprising one or more of a temperature sensor, an inductive sensor, and an electrical properties sensor.

Clause 4: The system of any of the preceding clauses, further comprises a viscosity sensor.

Clause 5: The system of any of the preceding clauses, further comprising a probe, wherein at least a portion of the probe is insertable into the fluid.

Clause 6: The system of any of the preceding clauses, further comprising a probe, wherein the at least one optical sensor is housed in the probe.

Clause 7: The system of any of the preceding clauses, wherein one or more of a temperature sensor, an inductive sensor, and an electrical properties sensor is housed in the probe.

Clause 8: The system of any of the preceding clauses, wherein a viscosity sensor is housed in the probe.

Clause 9: The system of any of the preceding clauses, wherein at least a portion of the probe is insertable into the fluid.

Clause 10: The system of any of the preceding clauses, wherein the fluid comprises a lubricant oil.

Clause 11: The system of any of the preceding clauses, wherein the fluid comprises a fuel.

Clause 12: The system of any of the preceding clauses, wherein the fluid comprises a hydraulic oil.

Clause 13: The system of any of the preceding clauses, wherein the fluid comprises a transmission oil.

Clause 14: The system of any of the preceding clauses, wherein the fluid comprises a thermal transfer fluid.

Clause 15: The system of any of the preceding clauses, wherein the thermal transfer fluid comprises a coolant.

Clause 16: The system of any of the preceding clauses, wherein the one or more properties comprises an additive concentration of the fluid.

Clause 17: The system of any of the preceding clauses, wherein the one or more properties comprises a contamination level of the fluid.

Clause 18: The system of any of the preceding clauses, wherein the one or more properties comprise an oxidative stability level of the fluid.

Clause 19: The system of any of the preceding clauses, wherein the one or more properties comprise a degradation level of the fluid.

Clause 20: The system of any of the preceding clauses, wherein the one or more properties comprise at least one of the acid number and the base number associated with the fluid.

Clause 21: The system of any of the preceding clauses, wherein the probe is dimensionally complementary to at least a portion of an in-situ vessel of the fluid.

Clause 22: The system of any of the preceding clauses, wherein the probe comprises a transparent or translucent window through which the excitation light and emission light pass.

Clause 23: The system of any of the preceding clauses, wherein the optical sensor is configured to detect a fluorescence intensity or emission spectrum corresponding to an oxidative property of the fluid.

Clause 24: The system of any of the preceding clauses, wherein the oxidative property of the fluid corresponds to degradation, contamination or corrosion potential of the fluid.

Clause 25: An optical sensing system for monitoring one or more properties of a fluid in a mechanical device, the optical sensing system comprising: a light source system configured to transmit excitation light toward the fluid; a detector configured to receive light emitted from the fluid; and a window disposed between the light source system and the fluid, the window comprising an optically transparent material configured to allow transmission of the excitation light and the emitted light, wherein the optical sensing system is configured to determine at least one characteristic of the fluid based on the received light.

Clause 26: The optical sensing system of any of the preceding clauses, wherein the light source system comprises at least two light emitting devices connected in series.

Clause 27: The optical sensing system of any of the preceding clauses, wherein the light source system comprises at least two light emitting devices connected in parallel.

Clause 28: The optical sensing system of any of the preceding clauses, wherein the light emitting devices comprise a light emitting diode (LED).

Clause 29: The optical sensing system of any of the preceding clauses, wherein the light emitting devices comprise a non-light emitting diode (LED) based light source.

Clause 30: The optical sensing system of any of the preceding clauses, wherein the non-LED based light source comprises at least one of a gas phase laser, a solid-state laser, a high pressure hollow-cathode lamp, a low pressure hollow-cathode lamp, an arc lamp with monochromators and an arc lamp without monochromators.

Clause 31: The optical sensing system of any of the preceding clauses, wherein the optical sensing system is housed in a probe.

Clause 32: The optical sensing system of any of the preceding clauses, wherein at least a portion of the probe has a generally cylindrical shape.

Clause 33: The optical sensing system of any of the preceding clauses, wherein the probe comprises concentric portions having a width ratio in the range of about 1000 to 1.01.

Clause 34: The optical sensing system of any of the preceding clauses, wherein a width of the probe is in the range of about 1 millimeter and 1000 millimeters.

Clause 35: The optical sensing system of any of the preceding clauses, wherein the optical sensing system is based on fluorescence spectrometry.

Clause 36: The optical sensing system of any of the preceding clauses, wherein the emitted light received by the detector is processed, by a processor coupled to the optical sensing system, to determine one or more of an oxidative property of the fluid, an additive concentration of the fluid, a contamination level of the fluid and a degradation state of the fluid.

Clause 37: The optical sensing system of any of the preceding clauses, wherein the window comprises an optically transparent material configured to transmit light in at least one of the ultraviolet and visible wavelength ranges.

Clause 38: The optical sensing system of any of the preceding clauses, wherein the window comprises an optically transparent material configured to transmit light in an infrared wavelength range.

Clause 39: The optical sensing system of any of the preceding clauses, wherein the window comprises sapphire.

Clause 40: The optical sensing system of any of the preceding clauses, wherein the window comprises quartz.

Clause 41: The optical sensing system of any of the preceding clauses, wherein the window comprises a multilayer optical element having at least one layer of sapphire and at least one layer of quartz.

Clause 42: The optical sensing system of any of the preceding clauses, wherein the window comprises an anti-reflective coating configured to enhance optical transmission efficiency.

Clause 43: The optical sensing system of any of the preceding clauses, further comprising a processor in communication with the system, the processor being configured to: obtain one or more fluorescence spectra based on the received emission light; and determine a remaining useful life of the fluid based on the one or more fluorescence spectra.

Clause 44: The optical sensing system of any of the preceding clauses, wherein the processor is configured to determine the remaining useful life of the fluid based on the one or more fluorescence spectra by: obtaining a secondary dataset comprising one or more fluid parameters of the fluid; and correlating the one or more fluorescence spectra to the secondary dataset.

Clause 45: The optical sensing system of any of the preceding clauses, wherein the one or more fluid parameters comprises an acid number, a base number, an oxidation number, or a viscosity of the fluid.

Clause 46: The optical sensing system of any of the preceding clauses, wherein the secondary dataset is obtained offline.

Clause 47: The optical sensing system of any of the preceding clauses, wherein the fluid comprises one or more of a lubricant oil, a fuel, a hydraulic oil, a transmission oil, a thermal transfer fluid, and a coolant.

Clause 48: The system of any one of any of the preceding clauses, wherein the one or more properties comprises one or more of an additive concentration of the fluid, a contamination level of the fluid, an oxidative stability level of the fluid, a degradation level of the fluid, an acid number associated with the fluid and a base number associated with the fluid.

Clause 49: A method for monitoring one or more properties of a fluid in a mechanical device using the system of any of the preceding clauses.

Clause 50: A method for monitoring one or more properties of a fluid in a mechanical device using the optical sensing system of any of the preceding clauses.

The invention claimed is:

1. An optical sensing system for monitoring one or more properties of a fluid in a mechanical device, the optical sensing system comprising:

- a probe, wherein at least a portion of the probe is insertable into the fluid, the probe comprising:
  - one or more light sources configured to transmit excitation light toward the fluid;
  - a detector configured to receive light emitted from the fluid;
  - a window disposed between the one or more light sources and the fluid, the window comprising an optically transparent material configured to allow transmission of the excitation light and the emitted light, wherein the optical sensing system is configured to determine at least one characteristic of the fluid based on the received light; and
  - at least one fiber optic strand coupled between the window and the one or more light sources and the detector;
- at least one temperature sensor housed in the probe; and
- a processor coupled to the probe, the processor being configured to:
  - obtain one or more fluorescence spectra based on the received emission light;
  - obtain temperature data from the at least one temperature sensor;
  - processes the obtained fluorescence spectra based on the temperature data; and
  - determine a remaining useful life of the fluid based on the processed one or more fluorescence spectra.

2. The optical sensing system of claim 1, wherein the at least one fiber optic strand has a corresponding diameter approximately between 1 micron and 1000 microns.

3. The optical sensing system of claim 1, wherein the at least one fiber optic strand is configured to relay the excitation light from the light source to the window, and the emitted light from the window to the detector.

4. The optical sensing system of claim 1, wherein the one or more light sources system-comprise at least two light emitting devices connected either in a series or in a parallel configuration.

5. The optical sensing system of claim 4, wherein the light emitting devices comprise either a light emitting diode (LED) or a non-light emitting diode (LED) based light source.

6. The optical sensing system of claim 1, wherein at least a portion of the probe has a generally cylindrical shape.

7. The optical sensing system of claim 6, wherein the probe comprises concentric portions having a width ratio in the range of about 1000 to 1.01.

8. The optical sensing system of claim 1, wherein a width of the probe is in the range of about 1 millimeter and 1000 millimeters.

9. The optical sensing system of claim 1, wherein the optical sensing system is based on fluorescence spectrometry.

10. The optical sensing system of claim 1, wherein the emitted light received by the detector is processed, by the processor, to determine one or more of an oxidative property of the fluid, an additive concentration of the fluid, a contamination level of the fluid and a degradation state of the fluid.

11. The optical sensing system of claim 1, wherein the window comprises an optically transparent material configured to transmit light in at least one of the ultraviolet and visible wavelength ranges.

12. The optical sensing system of claim 1, wherein the window comprises an optically transparent material configured to transmit light in a near infrared and infrared wavelength range.

13. The optical sensing system of claim 1, wherein the window comprises at least one of sapphire and quartz.

14. The optical sensing system of claim 1, further comprising one or more of an inductive sensor, an electrical properties sensor and a viscosity sensor, and wherein at least one of the one or more of an inductive sensor, an electrical properties sensor and a viscosity sensor is housed in the probe.

15. The optical sensing system of claim 1, wherein the processor is configured to determine the remaining useful life of the fluid based on the one or more fluorescence spectra by:

obtaining a secondary dataset comprising one or more fluid parameters of the fluid; and correlating the one or more fluorescence spectra to the secondary dataset.

16. The optical sensing system of claim 15, wherein the one or more fluid parameters comprises an acid number, a base number, an oxidation number, or a viscosity of the fluid.

17. The optical sensing system of claim 1, wherein the fluid comprises one or more of a lubricant oil, a fuel, a hydraulic oil, a transmission oil, a thermal transfer fluid, and a coolant.

18. The system of claim 1, wherein the one or more properties comprises one or more of an additive concentration of the fluid, a contamination level of the fluid, an oxidative stability level of the fluid, a degradation level of the fluid, an acid number associated with the fluid, a base number associated with the fluid, and a thermal stability level of the fluid.

19. The system of claim 5, wherein the non-LED based light source comprises at least one of a gas phase laser, a solid-state laser, a high pressure hollow cathode lamp, a low pressure hollow-cathode lamp, an arc lamp with monochromators and an arc lamp without monochromators.

20. The system of claim 1, wherein the window comprises a multilayer optical element having at least one layer of sapphire and at least one layer of quartz.

* * * * *